US012211230B2

(12) United States Patent
Katsura et al.

(10) Patent No.: US 12,211,230 B2
(45) Date of Patent: Jan. 28, 2025

(54) POSITIONING SYSTEM FOR MEASURING POSITION OF MOVING BODY USING IMAGE CAPTURING APPARATUS

(71) Applicant: Panasonic Intellectual Property Management Co., Ltd., Osaka (JP)

(72) Inventors: Ukyou Katsura, Osaka (JP); Tsukasa Okada, Osaka (JP); Tomohide Ishigami, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 297 days.

(21) Appl. No.: 17/879,127

(22) Filed: Aug. 2, 2022

(65) Prior Publication Data

US 2022/0366596 A1     Nov. 17, 2022

Related U.S. Application Data

(63) Continuation of application No. PCT/JP2020/038644, filed on Oct. 13, 2020.

(30) Foreign Application Priority Data

Feb. 7, 2020   (JP) .................... 2020-019932

(51) Int. Cl.
*G06T 7/70*    (2017.01)
*G05D 1/00*    (2024.01)
*G06V 20/58*   (2022.01)

(52) U.S. Cl.
CPC ............ *G06T 7/70* (2017.01); *G05D 1/0246* (2013.01); *G06V 20/58* (2022.01); *G06T 2207/30252* (2013.01)

(58) Field of Classification Search
CPC ............ G06T 7/70; G06T 2207/30252; G06T 2207/10016; G06T 2207/30208;
(Continued)

(56) References Cited

U.S. PATENT DOCUMENTS 7,782,361 B2* 8/2010 Kotake .................... G06T 7/73
                                                   348/208.4
7,853,359 B2* 12/2010 Ban ...................... G01B 11/002
                                                   700/262

(Continued)

FOREIGN PATENT DOCUMENTS

JP    2008-185454     8/2008
JP    2011-219229    11/2011
(Continued)

OTHER PUBLICATIONS

Extended European search report issued Jun. 30, 2023 in European Patent Application No. 20917998.5.
(Continued)

*Primary Examiner* — Michael S Osinski
(74) *Attorney, Agent, or Firm* — Wenderoth, Lind & Ponack, L.L.P.

(57) ABSTRACT

A relative position calculator calculates relative position and attitude of a vehicle based on images captured by an image capturing apparatus on the vehicle. An absolute position calculator extracts a marker from an image captured by the image capturing apparatus, and calculates absolute position and attitude of the vehicle, based on position and attitude of the one extracted marker. A corrector calculates the corrected position and attitude, not using the absolute position and attitude calculated based on the position and attitude of the marker when a difference or ratio of an apparent height and width of the marker in the image is equal to or smaller than a threshold, but using the absolute position and attitude
(Continued)

US 12,211,230 B2

Page 2 calculated based on the position and attitude of the marker when the difference or ratio is larger than the threshold.

23 Claims, 38 Drawing Sheets

(58) Field of Classification Search
CPC . G06T 7/246; G06T 7/73; G06T 2207/30244; G06T 7/74; G06T 2207/10024; G06T 2207/10028; G06T 2207/30204; G06T 19/006; G05D 1/0246; G05D 1/0234; G05D 1/0274; G05D 1/0016; G05D 1/101; G06V 20/58; G06V 10/46; G06V 20/56; G01C 21/206; B60R 1/27; B64U 2101/30; H04N 23/00
See application file for complete search history.

(56) References Cited

U.S. PATENT DOCUMENTS

| | | | | |
|---|---|---|---|---|
| 8,643,741 | B2* | 2/2014 | Brunner | G06V 10/242 348/222.1 |
| 10,796,446 | B2* | 10/2020 | Rohde | G06T 7/586 |
| 10,930,008 | B2* | 2/2021 | Aratani | G06T 19/006 |
| 10,949,998 | B2* | 3/2021 | Liu | G06T 7/74 |
| 10,957,068 | B2* | 3/2021 | Tomioka | G06V 10/40 |
| 11,244,172 | B2* | 2/2022 | Huang | G08G 1/096791 |
| 11,597,381 | B2* | 3/2023 | Kashiwamura | B60W 10/04 |
| 11,715,229 | B2* | 8/2023 | Miyamoto | G06T 7/20 382/103 |
| 2002/0052709 | A1* | 5/2002 | Akatsuka | G01B 11/24 702/153 |
| 2002/0103617 | A1* | 8/2002 | Uchiyama | G06T 7/74 702/150 |
| 2003/0063292 | A1* | 4/2003 | Mostafavi | A61N 5/1048 356/614 |
| 2003/0144813 | A1* | 7/2003 | Takemoto | G06T 7/80 702/153 |
| 2004/0090444 | A1* | 5/2004 | Satoh | G06T 7/74 345/633 |
| 2005/0008256 | A1* | 1/2005 | Uchiyama | G06T 7/80 382/291 |
| 2005/0069174 | A1* | 3/2005 | Uchiyama | G06T 7/74 382/103 |
| 2005/0069196 | A1* | 3/2005 | Uchiyama | G06T 7/70 382/154 |
| 2005/0159916 | A1* | 7/2005 | Anabuki | G06T 15/20 702/151 |
| 2005/0253870 | A1* | 11/2005 | Kotake | G06T 7/73 345/633 |
| 2005/0261573 | A1* | 11/2005 | Satoh | G06V 10/242 600/407 |
| 2006/0071946 | A1* | 4/2006 | Anabuki | G06T 7/246 345/633 |
| 2006/0094955 | A1* | 5/2006 | Satoh | G01S 5/163 600/414 |
| 2006/0120606 | A1 | 6/2006 | Furuhashi et al. | |
| 2015/0339535 | A1* | 11/2015 | Utagawa | B60R 1/27 348/118 |
| 2016/0153800 | A1* | 6/2016 | Ko | G01C 21/3647 701/436 |
| 2017/0024617 | A1* | 1/2017 | Yamaguchi | G01C 21/28 |
| 2017/0168501 | A1* | 6/2017 | Ogura | G05D 1/0016 |
| 2018/0321364 | A1* | 11/2018 | Sasaki | G01S 17/89 |
| 2019/0080600 | A1* | 3/2019 | Miura | G06V 20/582 |
| 2019/0118712 | A1* | 4/2019 | Shigemura | B60Q 9/00 |
| 2020/0125100 | A1* | 4/2020 | Wu | G06T 7/73 |
| 2020/0126254 | A1* | 4/2020 | Homma | G06T 7/70 |
| 2020/0234573 | A1* | 7/2020 | Fujii | G05D 1/0027 |
| 2020/0286020 | A1* | 9/2020 | Kobayashi | G06Q 50/40 |
| 2020/0317117 | A1 | 10/2020 | Okada et al. | |
| 2021/0150750 | A1* | 5/2021 | Miyamoto | G06T 7/001 |
| 2021/0174539 | A1* | 6/2021 | Duong | G06N 5/01 |
| 2021/0318690 | A1* | 10/2021 | Okada | G06T 7/73 |
| 2022/0080592 | A1* | 3/2022 | Karapetyan | G05D 1/0272 |
| 2022/0092815 | A1* | 3/2022 | Iizuka | B66F 9/24 |
| 2022/0120710 | A1* | 4/2022 | Yamamoto | G06T 7/13 |
| 2022/0324563 | A1* | 10/2022 | Tazume | B64U 60/50 |
| 2022/0348225 | A1* | 11/2022 | Kumano | B60W 60/0015 |
| 2023/0249353 | A1* | 8/2023 | Yan | G01C 21/3837 700/259 |

FOREIGN PATENT DOCUMENTS

| | | |
|---|---|---|
| JP | 2016-024020 | 2/2016 |
| WO | 2005/010817 | 2/2005 |
| WO | 2019/130932 | 7/2019 |

OTHER PUBLICATIONS

English language translation of International Preliminary Report on Patentability issued Aug. 18, 2022 in corresponding International Application No. PCT/JP2020/038644.
Notice of Reasons for Refusal issued Sep. 3, 2024 in corresponding Japanese Application No. 2021-575610, with machine translation.
International Search Report issued Dec. 28, 2020 in corresponding International Application No. PCT/JP2020/038644, with English translation.
Mur-Artal et al., "ORB-SLAM2: an Open-Source SLAM System for Monocular, Stereo and RGB-D Cameras", IEEE Transactions on Robotics, vol. 33, Issue 5, Oct. 2017.
Garrido-Jurado et al., "Automatic generation and detection of highly reliable fiducial markers under occlusion", Department of Computing and Numerical Analysis, University of Córdoba (Spain), Pattern Recognition vol. 47, Issue 6, pp. 2280-2292; Publisher: ELSEVIER, Jun. 2014.

* cited by examiner

| ID | POSITION Xw [m] | POSITION Yw [m] | POSITION Zw [m] | ANGLE θ [rad] | SIZE [m] |
|----|----|----|----|----|----|
| 001 | 50 | 5 | 1 | π/2 | 0.30 |
| 002 | 10 | 30 | 1 | 3π/2 | 0.30 |

FIG. 34

| ID | DATE AND TIME | POSITION Xw [m] | POSITION Yw [m] | POSITION Zw [m] | ANGLE [DEGREES] |
|---|---|---|---|---|---|
| 010 | 2018/01/31 09:13:40.133 | 227.78 | 120.812 | 0.673 | 185.576 |
| 010 | 2018/01/31 09:13:40.199 | 227.854 | 120.952 | 0.75 | 187.25 |
| 010 | 2018/01/31 09:13:40.266 | 228.07 | 120.766 | 0.743 | 184.844 |
| 010 | 2018/01/31 09:13:40.333 | 228.314 | 120.911 | 0.783 | 185.487 |
| 010 | 2018/01/31 09:13:40.399 | 228.517 | 120.997 | 0.705 | 186.235 |
| 668 | 2018/01/31 09:13:40.466 | 233.91 | 559.339 | 3.559 | 73.167 |
| 010 | 2018/01/31 09:13:40.533 | 229.079 | 120.908 | 0.557 | 185.23 |
| 010 | 2018/01/31 09:13:40.599 | 229.081 | 120.982 | 0.705 | 185.425 |
| 010 | 2018/01/31 09:13:40.666 | 229.419 | 121.038 | 0.601 | 184.828 |

→ ERRONEOUS DETECTION

FIG. 38

| ID | DATE AND TIME | POSITION Xm [m] | POSITION Ym [m] | POSITION Zm [m] | ANGLE [DEGREES] |
|---|---|---|---|---|---|
| 011 | 2018/01/31 09:13:40:133 | 2.78 | 0.62 | 1.673 | 185.576 |
| 011 | 2018/01/31 09:13:40:199 | 2.854 | 0.62 | 1.75 | 187.25 |
| 011 | 2018/01/31 09:13:40:266 | -2.07 | 0.56 | 1.743 | 184.844 |
| 011 | 2018/01/31 09:13:40:333 | 2.314 | 0.611 | 1.783 | 185.487 |
| 011 | 2018/01/31 09:13:40:599 | 2.081 | 0.582 | 1.705 | 185.425 |
| 011 | 2018/01/31 09:13:40:666 | 2.419 | 0.638 | 1.601 | 184.828 |

POSITION REVERSE →

POSITIONING SYSTEM FOR MEASURING POSITION OF MOVING BODY USING IMAGE CAPTURING APPARATUS

This is a continuation application of International Application No. PCT/JP2020/038644, with an international filing date of Oct. 13, 2020, which claims priority of Japanese patent application No. 2020-019932 filed on Feb. 7, 2020, the content of which is incorporated herein by reference.

BACKGROUND

1. Technical Field

The present disclosure relates to a positioning apparatus for measuring a position of a moving body, such as a vehicle, a moving body including such a positioning apparatus, and a positioning system including such a moving body.

2. Description of Related Art

When moving cargo within a predetermined area or between predetermined points using a cargo transporting vehicle, it may be required to measure and track a position of the vehicle. For example, Japanese Patent Laid-open Publication No. JP 2011-219229 A discloses a cargo location management device for measuring a position of a vehicle using a positioning technology, such as GPS, wireless LAN positioning, and infrared positioning.

When measuring a position of a vehicle moving outdoors, GPS positioning is typically used. On the other hand, radio waves from GPS satellites can not be received indoors, e.g., inside a warehouse and a factory, etc., and therefore, CPS positioning can not be used. Examples of indoor positioning methods include a method using wireless signals of, for example, ultra wide band (UWB), Wi-Fi, or Bluetooth (registered trademark) Low Energy (BLE), etc. However, the positioning method using wireless signals requires that the a large number of wireless transmitters for transmitting wireless signals are disposed in a moving area of the vehicle, thus requiring high initial costs. In addition, there is an indoor positioning method, called Pedestrian Dead Reckoning (PDR). However, it is difficult to accurately measure positions using the PDR.

For example, there is a technology called Visual Simultaneous Localization and Mapping (Visual-SLAM) as disclosed in R. Mur-Artal, et al., "ORB-SLAM2: an Open-Source SLAM System for Monocular, Stereo and RGB-D Cameras", IEEE Transactions on Robotics, Volume: 33, Issue: 5, October 2017, for accurately measuring and tracking a position of a moving body, such as a vehicle, without requiring a large number of wireless transmitters for transmitting wireless signals. According to Visual-SLAM, a moving body provided with an image capturing apparatus moves and captures images around the moving body, and then, an amount of movement of the moving body is calculated based on amounts of movement of feature points in the captured images. Thus, it is possible to estimate a current position of the moving body, and generate a map based on a trajectory of the moving body.

SUMMARY

In a situation where a background varies day by day, such as in a factory and a warehouse, it is difficult to determine a current position using a map created in advance. In this case, a position of a moving body obtained by the Visual-SLAM is calculated as a relative position with respect to a reference position (for example, a start position from which the moving body travels), and therefore, an errors cumulatively increases with a lapse of time. Hence, there is a demand for a positioning apparatus capable of measuring a position of a moving body using an image capturing apparatus, with a smaller error than that of the prior art.

One non-limiting and exemplary embodiment provides a positioning apparatus capable of measuring a position of a moving body using an image capturing apparatus, with a smaller error than that of the prior art.

According to an aspect of the present disclosure, the positioning apparatus is provided with: a first calculator, a storage apparatus, a second calculator, and a corrector. The first calculator is configured to calculate a first position and a first attitude of a moving body indicating a relative position and a relative attitude of the moving body with respect to a reference position and a reference attitude, based on a plurality of images captured by an image capturing apparatus mounted on the moving body. The storage apparatus is configured to store information on identifiers, positions, and attitudes of a plurality of markers disposed at predetermined positions and visually distinguishable from each other, and information on a map containing a passageway for the moving body. The second calculator is configured to extract one of the plurality of markers from an image captured by the image capturing apparatus, and calculate a second position and a second attitude of the moving body indicating a position and an attitude of the moving body in the map, based on a position and an attitude of the one extracted marker. The corrector is configured to correct the first position and the first attitude based on the second position and the second attitude to calculate a corrected position and a corrected attitude of the moving body. The corrector is configured to calculate the corrected position and the corrected attitude, not using the second position and the second attitude calculated based on the position and the attitude of the marker when a difference or a ratio of an apparent height and an apparent width of the marker in the image is equal to or smaller than a first threshold, but using the second position and the second attitude calculated based on the position and the attitude of the marker when the difference or the ratio of the apparent height and the apparent width of the marker in the image is larger than the first threshold.

These general and specific aspects may be achieved by a system, a method, a computer program, and any combination of the system, the method, and the computer program.

Additional benefits and advantages of the disclosed embodiments will be apparent from the specification and Figures. The benefits and/or advantages may be individually provided by the various embodiments and features of the specification and drawings disclosure, and need not all be provided in order to obtain one or more of the same.

According to the one aspect of the present disclosure, it is possible to accurately measure the position and the attitude of the moving body, by correcting the first position and the first attitude based on the second position and the second attitude. In addition, according to the one aspect of the present disclosure, it is possible to more accurately measure the position and attitude of the moving body, by determining whether or not a recognized marker is reliable, and correcting the position and attitude of the moving body based on the second position and the second attitude only when the marker is reliable.

BRIEF DESCRIPTION OF DRAWINGS

FIG. 34 is a table including a marker 4 detected by an image recognizer 33 of FIG. 3, and including an object erroneously detected as a marker 4.

FIG. 38 is a table showing changes in the position of the image capturing apparatus 11 in the marker coordinate systems, the position being calculated by a position calculator 34 of FIG. 3.

DETAILED DESCRIPTION

Embodiments according to the present disclosure will hereinafter be described with reference to the drawings. Note that similar constituent elements in the following respective embodiments are given identical reference signs.

First Embodiment

At first, a positioning apparatus according to a first embodiment, and a moving body provided with such a positioning apparatus will be described.

Configuration of First Embodiment

[Overall Configuration]

Figure 1:
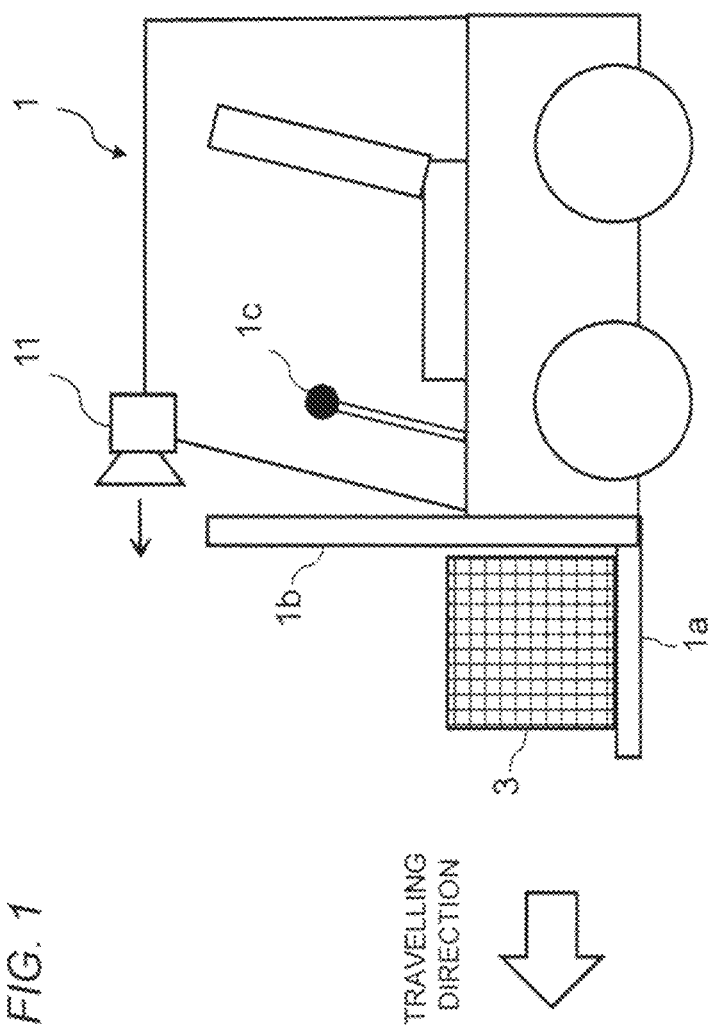
FIG. 1 is a schematic diagram showing a configuration of a vehicle 1 according to a first embodiment.

FIG. 1 is a schematic diagram showing a configuration of a vehicle 1 according to the first embodiment. The vehicle 1 may be, for example, a forklift. In addition, the vehicle 1 is provided with a cargo carrier 1a on which cargo 3 is carried. The vehicle 1 may be further provided with an elevating mechanism 1b for loading and unloading the cargo 3 on the cargo carrier 1a. In addition, the vehicle 1 is provided with a console 1c for receiving user operations, such as forward, backward, steering, and stop. In addition, on a body of the vehicle 1, an image capturing apparatus 11 is mounted for capturing images in a predetermined direction with respect to the vehicle 1 (forward, backward, side, upward, and/or downward directions).

Figure 2:
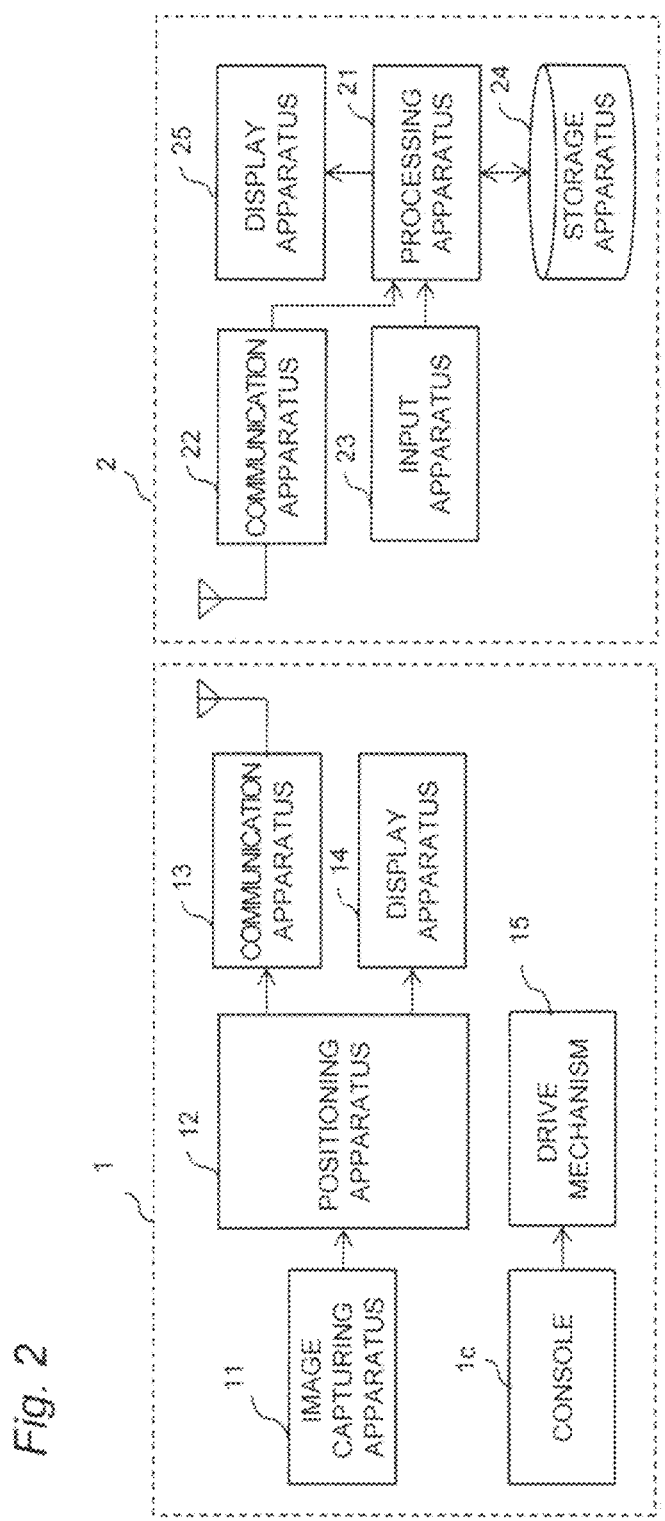
FIG. 2 is a block diagram showing a configuration of a positioning system including the vehicle 1 of FIG. 1.

FIG. 2 is a block diagram showing a configuration of a positioning system including the vehicle 1 of FIG. 1. The positioning system of FIG. 2 includes at least one vehicle 1 and a server apparatus 2. Each vehicle 1 is provided with a positioning apparatus 12 that measures a position of the vehicle 1 based on images captured by the image capturing apparatus 11. The server apparatus 2 obtains positions of the vehicles 1 from the vehicles 1, and records the positions of the vehicles 1.

[Configuration of Vehicle 1]

The vehicle 1 is further provided with the image capturing apparatus 11, the positioning apparatus 12, a communication apparatus 13, a display apparatus 14, and a drive mechanism 15.

The image capturing apparatus 11 generates images of some object in a predetermined direction with respect to the vehicle 1, at certain time intervals, while the vehicle 1 is traveling. For example, the image capturing apparatus 11 includes at least one camera. The image capturing apparatus 11 may capture still images at certain time intervals, or may extract frames from a series of video frames at certain time intervals. The image capturing apparatus 11 sends the captured images to the positioning apparatus 12. The image capturing apparatus 11 provides each image with a timestamp of a time when the image is captured.

The positioning apparatus 12 measures the position and attitude of the vehicle 1 based on the images captured by the image capturing apparatus 11. The positioning apparatus 12 extracts feature points from the images captured by the image capturing apparatus 11, associates the extracted feature points among the images, and calculates a relative position and a relative attitude of the vehicle 1 with respect to a reference position and a reference attitude, based on changes of the feature points among the images. In addition, the positioning apparatus 12 extracts one of a plurality of markers disposed at predetermined positions and visually distinguishable from each other, from an image captured by the image capturing apparatus 11, and calculates an absolute position and an absolute attitude of the vehicle 1 in a map given in advance, based on the one extracted marker. The positioning apparatus 12 further corrects the relative position and the relative attitude based on the absolute position and the absolute attitude.

In the present specification, the "attitude" of the vehicle 1 indicates, for example, angles of a traveling direction of the vehicle 1 with respect to coordinate axes of a certain coordinate system ("world coordinate system" or "marker coordinate system" described below).

The communication apparatus 13 is provided with modules and control programs of Wi-Fi or Bluetooth, etc., to wirelessly communicate with the server apparatus 2. The communication apparatus 13 transmits the position and the attitude of the vehicle 1 calculated by the positioning apparatus 12, to the server apparatus 2.

The display apparatus 14 displays an image indicating the position and attitude of the vehicle 1. The display apparatus 14 may overlay the position of the vehicle 1 on the map. In addition, the display apparatus 14 may display an image captured by the image capturing apparatus 11. In addition, the display apparatus 14 may display information regarding an operation of the vehicle 1 (e.g., an alarm, etc.).

The drive mechanism 15 includes an engine or a motor, a steering device, a braking device, and a control device thereof, for the vehicle 1. The drive mechanism 15 is controlled, for example, through the console 1c by a user.

[Configuration of Server Apparatus 2]

The server apparatus 2 of FIG. 2 is provided with a processing apparatus 21, a communication apparatus 22, an input apparatus 23, a storage apparatus 24, and a display apparatus 25. The processing apparatus 21 is, for example, a general-purpose computer including a processor, a memory, and the like. The communication apparatus 22 is communicatively connected to the communication apparatus 13 of the vehicle(s) 1. The input apparatus 23 includes a keyboard, a pointing device, and the like. The storage apparatus 24 records the position and the attitude of the vehicle(s) 1 received from the vehicle(s) 1. The display apparatus 25 displays the position and the attitude of the vehicle(s) 1 received from the vehicle(s) 1. The processing apparatus 21 obtains the position and attitude of the vehicle (s) 1 from the vehicle(s) 1 via the communication apparatus 22, records the position and attitude of the vehicle(s) 1 in the storage apparatus 24, and displays the position and attitude of the vehicle(s) 1 on the display apparatus 25.

The display apparatus 25 displays the position and the attitude of the vehicle 1 calculated by the positioning apparatus 12 of the vehicle 1. The processing apparatus 21 may obtain in advance a map of a movable range of the vehicle 1 (such as a warehouse or a factory), and display the position and the attitude of the vehicle 1 calculated by the positioning apparatus 12, on the display apparatus 25, such that the position and the attitude are overlaid on this map. Alternatively, the processing apparatus 21 itself may generate a map based on a travelling path of the vehicle 1, and display this map on the display apparatus 25. In addition, the display apparatus 25 may display an image captured by the image capturing apparatus 11.

In the present specification, the display apparatus 14 is also referred to as "first display apparatus", and the display apparatus 25 is also referred to as "second display apparatus",

[Configuration of Positioning Apparatus 12]

Figure 3:
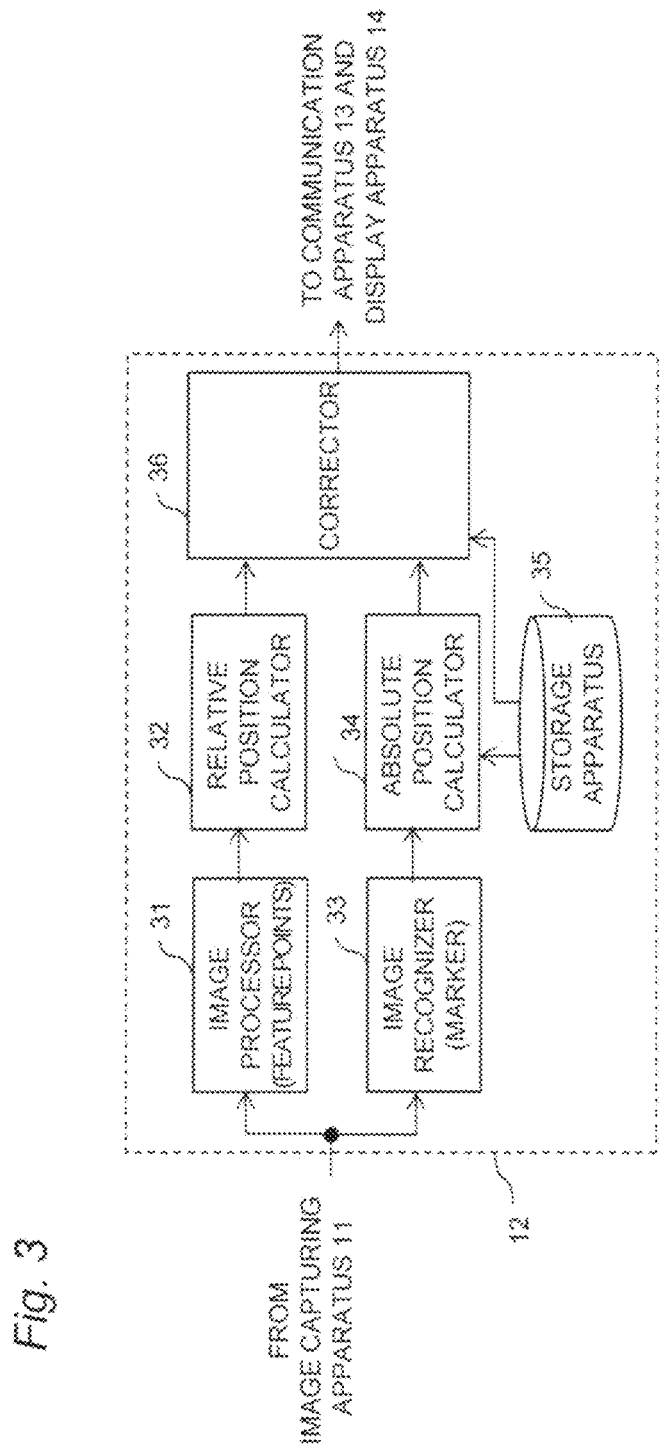
FIG. 3 is a block diagram showing a configuration of a positioning apparatus 12 of FIG. 2.

FIG. 3 is a block diagram showing a configuration of the positioning apparatus 12 of FIG. 2. The positioning apparatus 12 is provided with an image processor 31, a relative position calculator 32, an image recognizer 33, an absolute position calculator 34, a storage apparatus 35, and a corrector 36.

The storage apparatus 35 stores information on identifiers, positions, and attitudes of a plurality of markers 4 disposed at predetermined positions and visually distinguishable from each other, and information on a map including passageways for the vehicle 1 (for example, a map of a warehouse 100 described with reference to FIG. 4). The positions of the markers 4 may be represented as relative positions with respect to a reference position, and/or may be represented in association with the map.

Figure 4:
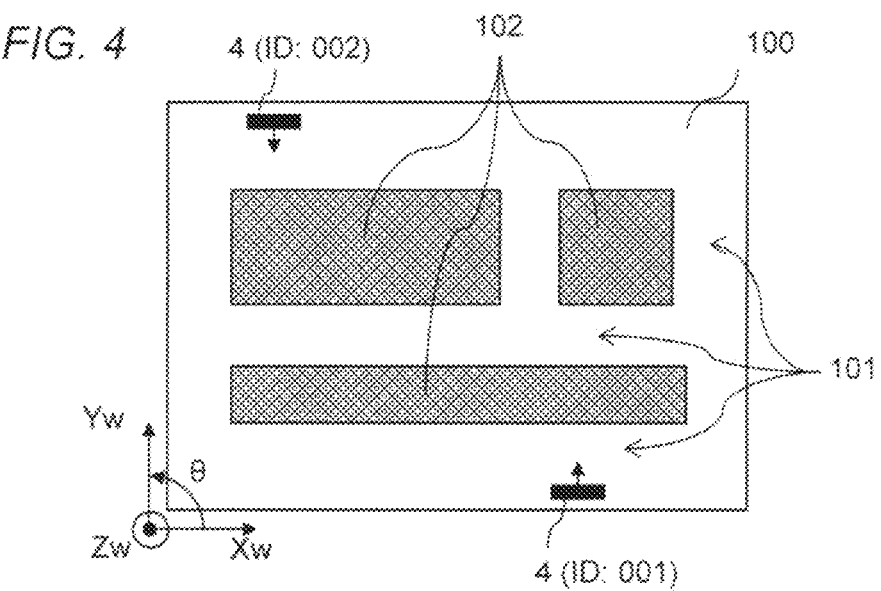
FIG. 4 is a map of a warehouse 100 including passageways 101 through which the vehicle 1 of FIG. 1 travels.

FIG. 4 is a map of a warehouse 100 including passageways 101 through which the vehicle 1 of FIG. 1 travels. The warehouse 100 includes structures, such as a plurality of the passageways 101, and a plurality of shelves 102. The plurality of markers 4 are disposed in advance at a plurality of predetermined positions in the warehouse 100. The vehicle 1 of FIG. 1 travels through the passageways 101 to transport the cargo 3 from one of the shelves 102 to another one of the shelves 102. The positions of the vehicle 1 and the markers 4 are represented using a world coordinate system (Xw, Yw, Zw) determined for the entire warehouse 100.

Figure 5:
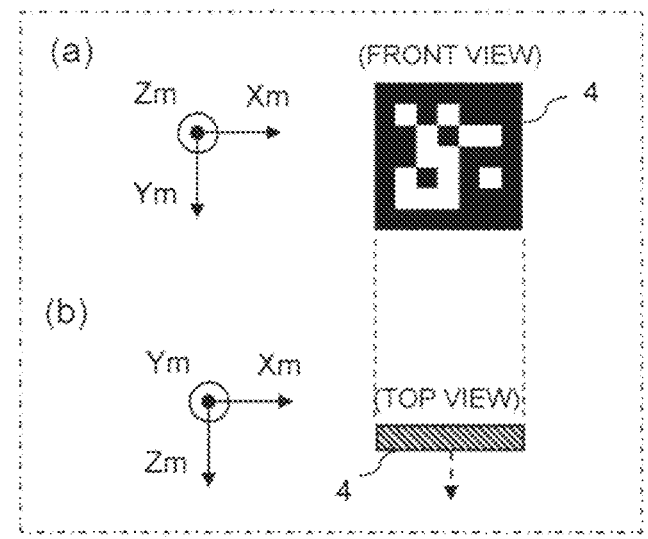
FIG. 5 is a diagram showing an example of a marker 4 of FIG. 4; (a) shows a front view of the marker 4, and (b) shows a top view of the marker 4.

FIG. 5 is a diagram showing an example of the marker 4 of FIG. 4; (a) shows a front view of the marker 4, and (b) shows a top view of the marker 4. In the example of FIG. 5, the marker 4 is configured as a square flat plate. On one side of the marker 4, the marker 4 has a visually distinguishable pattern, into which an identifier of the marker 4 itself is encoded. In the example of FIG. 5, the marker 4 has a pattern constituted of 7×7 white or black square cells in the longitudinal and lateral directions. The pattern of the marker 4 is further configured such that the attitude of the marker 4 itself can be detected from a captured image of the marker 4, such as a marker used in a field of augmented reality (also referred to as a "AR marker"). Each marker 4 has a marker coordinate system (Xm, Ym, Zm) whose origin is located at an arbitrary point of the marker 4 (for example, center, or one vertex). In the lower part of FIG. 5 and other figures, a front surface of the marker 4 (positive direction of Zm axis) is indicated by an arrow at the center of a surface along an Xm-Ym plane.

Figures 6, 7:
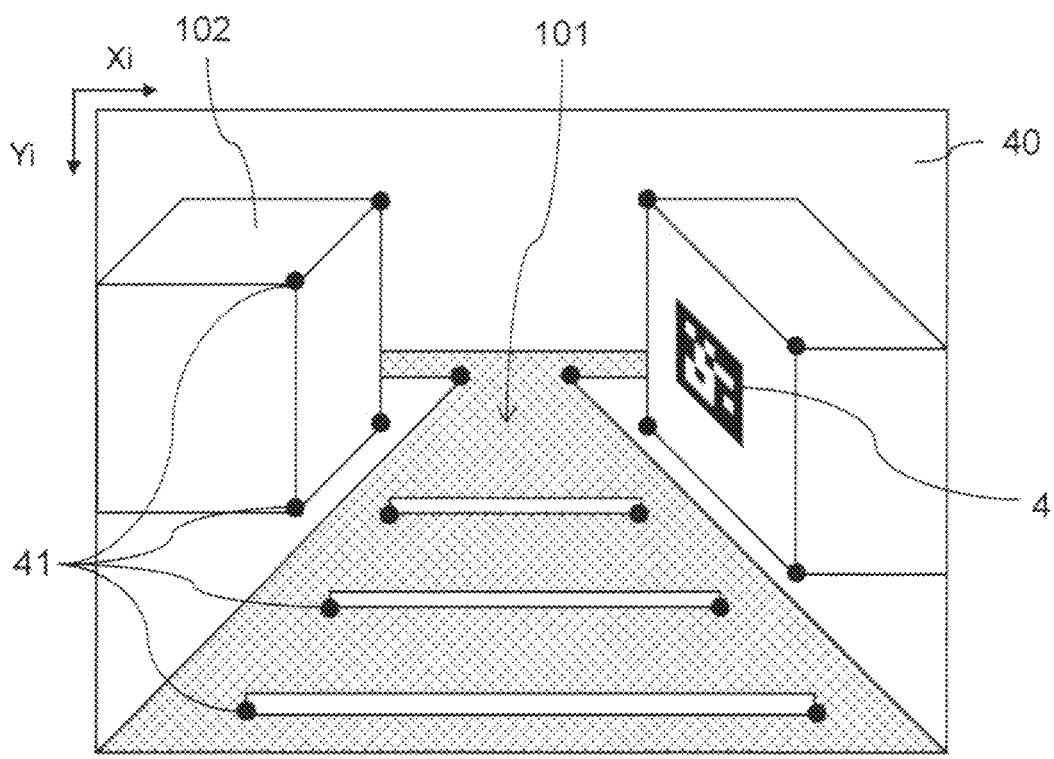
FIG. 6 is a table showing an example of marker information stored in a storage apparatus 35 of FIG. 3.
FIG. 7 is a diagram showing an example of an image 40 captured by an image capturing apparatus 11 of FIG. 1.

FIG. 6 is a table showing an example of marker information stored in the storage apparatus 35 of FIG. 3. The example of FIG. 6 indicates information on the two markers 4 shown in FIG. 4. The markers 4 have identifiers 001 and 002, respectively. Each of the identifiers is encoded into the pattern of the corresponding marker 4. In addition, each of the markers 4 has certain coordinates in the world coordinate system (Xw, Yw, Zw). In addition, each of the markers 4 is disposed in such an attitude that the front surface (positive direction of Zm axis) of the marker 4 has an angle θ with respect to the Xw axis in an Xw-Yw plane (that is, azimuth angle). The attitude of each of the markers 4 may be represented by an azimuth angle and an elevation angle. In addition, each of the markers 4 has a square pattern, and has an actual size of 30 cm×30 cm. The size of the markers 4 indicates a size of the pattern area, and does not include margins and the like (not shown in FIG. 5) around the pattern.

The storage apparatus 35 stores marker information for all the markers 4, for example, including items shown in FIG. 6. In addition, the storage apparatus 35 also stores map information including directions, sizes, and arrangements of all the passageways 101.

FIG. 7 is a diagram showing an example of an image 40 captured by the image capturing apparatus 11 of FIG. 1. The image 40 includes a plurality of feature points 41. Each of the feature points 41 is a point whose luminance or color is distinguishable from those of surrounding pixels, and whose position can be accurately determined. For example, the feature points 41 are detected from vertices or edges of structures, such as the passageways 101 or the shelves 102 through which the vehicle 1 travels, and detected from patterns on a floor, walls, or a ceiling. In addition, when the vehicle 1 passes near any one of the markers 4, the image 40 includes the corresponding marker 4. The positions of the feature points 41 and the marker 4 in the image 40 are represented by, for example, an image coordinate system (Xi, Yi) whose origin is located at any point in the image 40 (for example, upper left corner).

Again referring to FIG. 3, the image processor 31 extracts coordinates of the feature points corresponding to each other, from a plurality of images captured by the image capturing apparatus 11 at a plurality of time moments separated by a certain time length from each other. The relative position calculator 32 calculates an amount of movement of the vehicle 1 based on amounts of movement of the feature points in two images temporary adjacent to each other. Thus, the relative position calculator 32 calculates a relative position and a relative attitude of the vehicle 1 with respect to a reference position and a reference attitude (for example, a position and an attitude from which the vehicle 1 starts to travel), based on the coordinates of the feature points of the plurality of images. The relative position calculator 32 may calculate the relative position and the relative attitude of the vehicle 1 using known techniques for image processing and positioning, such as Visual-SLAM or Visual-Odometry. The reference position and the reference attitude are associated with the map information stored in the storage apparatus 35. In addition, the relative position calculator 32 provides the relative position and the relative attitude with a timestamp of the image associated with calculation of the relative position and the relative attitude (the latter of two images temporary adjacent to each other).

The relative position calculator 32 may represent the calculated position of the vehicle 1, for example, using Cartesian coordinates (XYZ coordinates). The relative position calculator 32 may calculate a velocity and/or an acceleration of the vehicle 1, based on the calculated position of the vehicle 1, and time. The relative position calculator 32 may represent the calculated attitude of the vehicle 1 as roll (left and right inclination), pitch (front and rear inclination), and yaw (rotation around an axis perpendicular to a floor surface (that is, the Zw axis in FIG. 4)). Thus, it is possible to represent not only a direction of the vehicle 1 in a horizontal plane parallel to the ground, but also an inclination of the body of the vehicle 1, and movement of the vehicle 1 in elevation.

In the present specification, the image processor 31 and the relative position calculator 32 are collectively referred to as a "first calculator". In addition, in the present specification, the relative position and relative attitude are referred to as a "first position" and a "first attitude", respectively.

The image recognizer 33 extracts one of the plurality of markers 4 disposed at predetermined positions and visually distinguishable from each other, from an image captured by the image capturing apparatus 11. The absolute position calculator 34 calculates the absolute position and the absolute attitude of the vehicle 1 indicating the position and the attitude of the vehicle 1 in the map (i.e., world coordinate system), by referring to the information on the markers 4 and the map information, both stored in the storage apparatus 35, based on the position and the attitude of the one extracted marker 4. In addition, the absolute position calculator 34 provides the absolute position and the absolute attitude with a timestamp of the image associated with calculation of the absolute position and the absolute attitude.

In the present specification, the image recognizer 33 and the absolute position calculator 34 are collectively referred to as a "second calculator". In addition, in the present specification, the absolute position and absolute attitude are referred to as a "second position" and a "second attitude", respectively.

The corrector 36 corrects the relative position and the relative attitude based on the absolute position and the absolute attitude to calculate a corrected position and a corrected attitude of the vehicle 1. The corrector 36 synchronizes the absolute position and the absolute attitude with the relative position and the relative attitude, based on the timestamp of the relative position and the relative attitude, and the timestamp of the absolute position and the absolute attitude. The corrector 36 may consider the relative position and the relative attitude, and the absolute position and the absolute attitude, as positions and attitudes calculated from the same image, for example, when they have a time difference smaller than a predetermined threshold, and have timestamps closest to each other.

At least some of the components 31 to 36 of the positioning apparatus 12 may be integrated to each other. For example, the image processor 31 and the image recognizer 33 may be integrated to each other. In addition, the components 31 to 36 of the positioning apparatus 12 may be implemented as dedicated circuits, or as programs executed by a general-purpose processor.

Operation of First Embodiment

The corrector 36 corrects the relative position and the relative attitude calculated from on the feature points 41 using Visual-SLAM or the like, based on the absolute position and the absolute attitude calculated from on the marker 4, as described above. This correction process presupposes that the absolute position and the absolute attitude of the vehicle 1 are correct, and therefore, also presupposes that the attitude of the marker 4 is correctly recognized from the captured image the marker 4. However, an object other than the marker 4 may be erroneously detected as the marker 4. In addition, in order to correctly recognize the attitude of the marker 4, it is necessary to capture the marker 4 at an appropriate angle and from an appropriate distance. When there is an error in the position and attitude of the marker 4 itself recognized from the captured image the marker 4, an error also occurs in the absolute position and the absolute attitude of the vehicle 1. This may degrade the accuracy of the position and/or the attitude of the vehicle 1 calculated by the positioning apparatus 12.

Therefore, according to the positioning apparatus 12 of the first embodiment, the absolute position calculator 34 determines whether or not the marker 4 is captured at an appropriate angle and from an appropriate distance, in other words, whether or not the recognized marker 4 is reliable. Only when the marker 4 is reliable, the absolute position calculator 34 sends, to the corrector 36, the absolute position and the absolute attitude of the vehicle 1 calculated based on the position and attitude of the marker 4. As a result, the corrector 36 corrects the position and attitude of the vehicle 1 based on the absolute position and the absolute attitude, only when the marker 4 is reliable. Thus, it is possible to properly correct the position and attitude of the vehicle 1 based on the correctly recognized position and attitude of the marker 4, and therefore, it is possible to accuracy measure the position and attitude of the vehicle 1.

Next, an operation of the positioning apparatus 12 will be described in detail.

[Overall Positioning Process]

Figure 8:
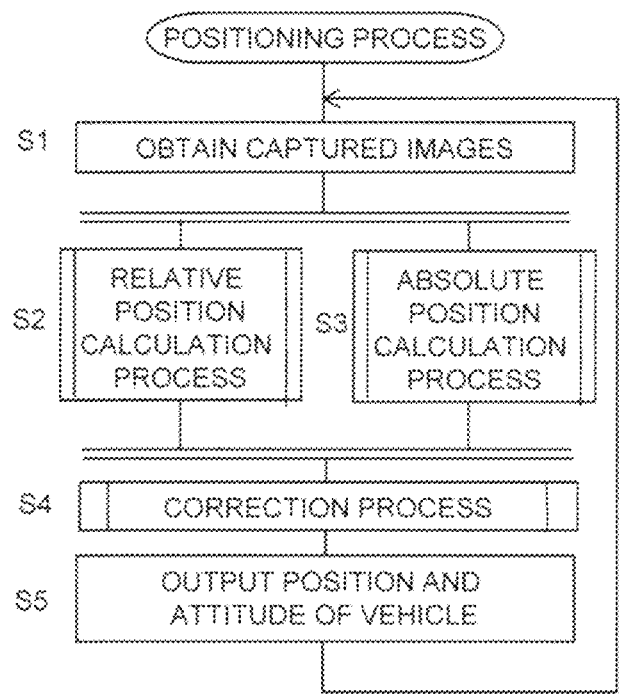
FIG. 8 is a flowchart showing a positioning process executed by the positioning apparatus 12 of FIG. 2.

FIG. 8 is a flowchart showing a positioning process executed by the positioning apparatus 12 of FIG. 2.

In step S1, the positioning apparatus 12 obtains images captured by the image capturing apparatus 11. In step S2, the image processor 31 and the relative position calculator 32 execute a relative position calculation process to calculate a relative position and a relative attitude of the vehicle 1. In step S3, the image recognizer 33 and the absolute position calculator 34 execute an absolute position calculation process to calculate an absolute position and an absolute attitude of the vehicle 1. Steps S2 and S3 may be executed in parallel as shown in FIG. 8, or may be executed sequentially. In step S4, the corrector 36 executes a correction process to correct the relative position and the relative attitude based on the absolute position and the absolute attitude, thus calculating a corrected position and a corrected attitude of the vehicle 1. In step S5, the corrector 36 outputs the corrected position and the corrected attitude of the vehicle 1 to the communication apparatus 13 and the display apparatus 14.

[Relative Position Calculation Process]

Figure 9:
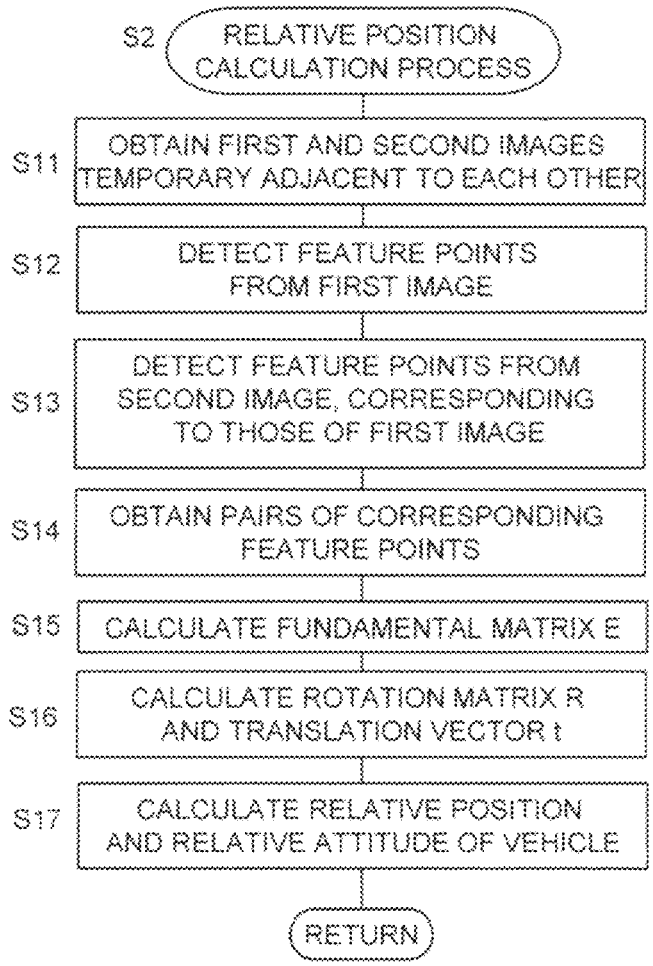
FIG. 9 is a flowchart showing a subroutine of step S2 (relative position calculation process) of FIG. 8.

FIG. 9 is a flowchart showing a subroutine of step S2 (relative position calculation process) of FIG. 8.

In step S11, the image processor 31 obtains first and second images captured at a first and a second time moments separated by a certain time length from each other (for example, first and second images of temporary adjacent frames).

In step S12, the image processor 31 detects feature points from the first image. Image processing techniques, such as the Features from Accelerated Segment Test (FAST), may be used to detect the feature points from the image.

In step S13, the image processor 31 detects feature points from the second image, corresponding to the feature points of the first image. Well-known image processing techniques, such as the Kanade-Lucas-Tomasi (KLT) tracker, may be used to detect the corresponding feature points among the images.

Figure 10:
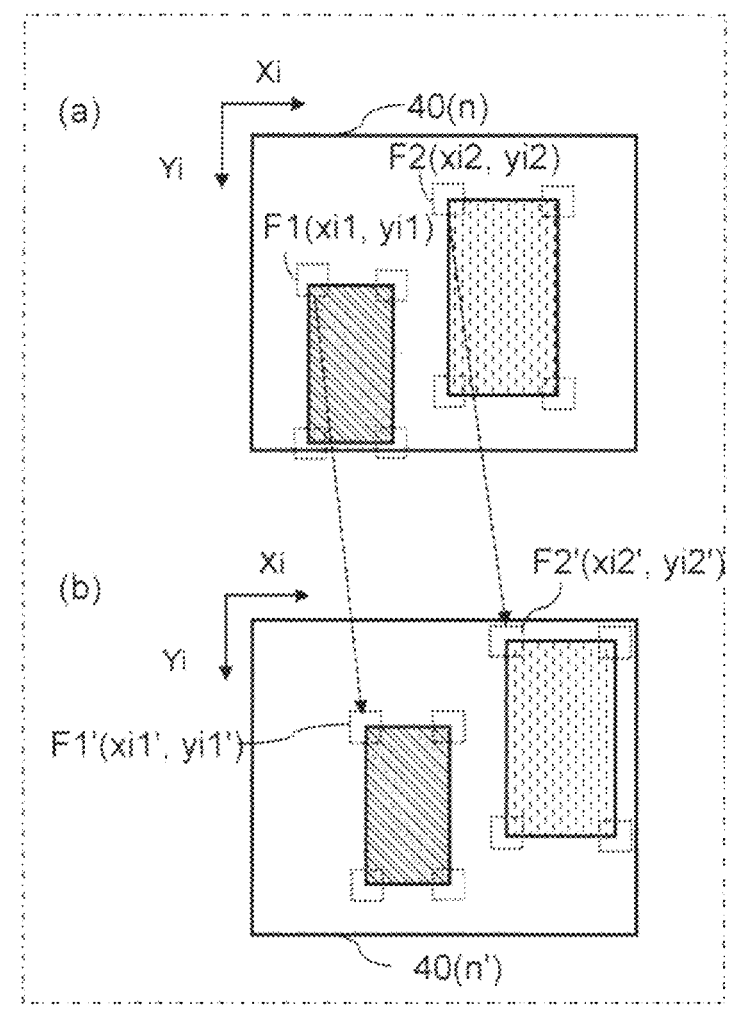
FIG. 10 shows feature points extracted by an image processor 31 of FIG. 3; (a) shows feature points F1 and F2 extracted from an image 40(n) at time moment n; and (b) shows feature points F1' and F2' extracted from an image 40(n') at time moment n'.

FIG. 10 is a diagram showing feature points extracted by the image processor 31 of FIG. 3. FIG. 10(a) shows feature points F1 and F2 extracted from an image 40(n) at time moment n. FIG. 10(b) shows feature points F1' and F2' extracted from an image 40(n') at time moment n'. In the image coordinate system of the image 40(n) of FIG. 10(a), the feature point F1 has coordinates (xi1, yi1), and the feature point F2 has coordinates (xi2, yi2). In the image coordinate system of the image 40(n') of FIG. 10(b), the feature point F1' has coordinates (xi1',yi1'), and the feature point F2' has coordinates (xi2',yi2'). The feature points F1' and F2' of FIG. 10(b) correspond to the feature points F1 and F2 of FIG. 10(a), respectively.

In step S14 of FIG. 9, the image processor 31 obtains pairs of coordinates of the corresponding feature points in the first and second images. For example, the image processor 31 obtains a pair of coordinates (xi1, yi1; xi1', yi1') of the feature points F1 and F1', and a pair of coordinates (xi2, yi2; xi2', yi2') of the feature points F2 and F2'.

In step S15, the relative position calculator 32 calculates a fundamental matrix E having 3×3 elements, based on the coordinates of the feature points obtained in step S14, for example, using a 5-point algorithm.

In step S16, the relative position calculator 32 performs singular value decomposition of the fundamental matrix E to calculate a rotation matrix R and a translation vector t, which represent movement of the vehicle 1 between time moments of capturing the first and second images, respectively. The rotation matrix R indicates a change in the attitude of the vehicle 1 between the time moments of capturing the first and second images, respectively. The translation vector t indicates a change in the position of the vehicle 1 between the time moments of capturing the first and second images, respectively.

For example, calculations of the rotation matrix R and the translation vector t are formulated as follows.

The fundamental matrix E is expressed as $E = U \Sigma V^T$ by performing singular value decomposition. In this case, $\Sigma$ is a diagonal matrix having 3×3 elements, and U and V are orthogonal matrices having 3×3 elements.

The rotation matrix R is calculated as $R = UW^{-1}V^T$, using the following matrix W having 3×3 elements.

$$W = \begin{pmatrix} 0 & -1 & 0 \\ 1 & 0 & 0 \\ 0 & 0 & 1 \end{pmatrix}$$ [Mathematical Expression 1]

In addition, a matrix $T = VW\Sigma V^T$ having 3×3 elements is calculated to obtain the translation vector t. The matrix T satisfies E=TR, and is represented as follows.

$$T = \begin{pmatrix} 0 & -t_z & t_y \\ t_z & 0 & -t_x \\ -t_y & t_x & 0 \end{pmatrix}$$ [Mathematical Expression 2]

The translation vector t is represented as $t = (t_x, t_y, t_z)^T$ using the elements of the matrix T.

In step S17, the relative position calculator 32 calculates the relative position and the relative attitude of the vehicle 1. When the vehicle 1 has a relative position t(n−1) and a relative attitude R(n−1) at an most recent time moment n−1, a relative position t(n) of the vehicle 1 at the current time moment n is represented as t(n)=t(n−1)+tR(n−1), using the translation vector t calculated in step S16. In addition, a relative attitude R(n) of the vehicle 1 at the current time moment n is represented as R(n)=RR(n−1), using the rotation matrix R calculated in step S16. Thus, the relative position calculator 32 calculates the relative position and the relative attitude of the vehicle 1 with respect to the reference position and the reference attitude, by cumulatively adding a plurality of translation vectors, and cumulatively multiplying a plurality of rotation matrices. The relative position calculator 32 send the calculated relative position and the calculated relative attitude of the vehicle 1, to the corrector.

[Absolute Position Calculation Process]

Figure 11:
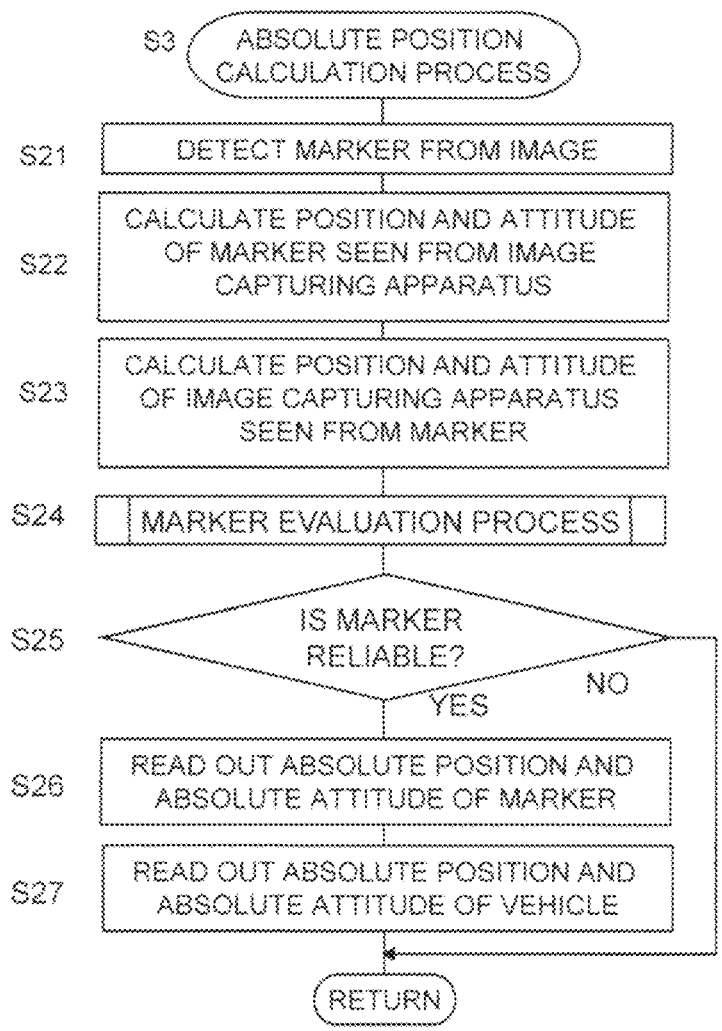
FIG. 11 is a flowchart showing a subroutine of step S3 (absolute position calculation process) of FIG. 8.

FIG. 11 is a flowchart showing a subroutine of step S3 (absolute position calculation process) of FIG. 8.

In step S21, the image recognizer 33 detects the marker 4 from the image. In this case, the image recognizer 33 detects coordinates of four vertices (corners) of the quadrangular marker 4 in the image coordinate system, and decodes the pattern of the marker 4 to obtain the identifier of the marker 4. The image recognizer 33 may detect coordinates of some predetermined points, instead of the four vertices of the marker 4.

Figure 12:
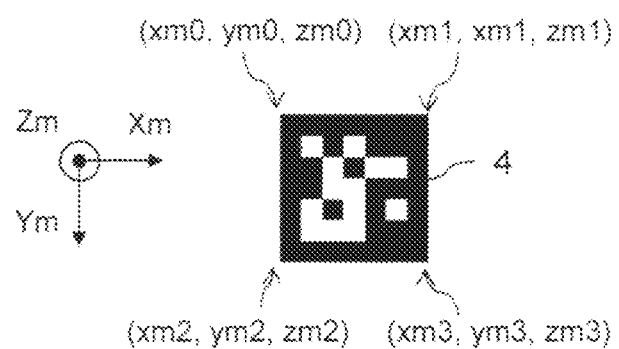
FIG. 12 is a diagram showing coordinates of vertices of the marker 4 in a marker coordinate system.

FIG. 12 is a diagram showing the coordinates of the vertices of the marker 4 in the marker coordinate system. In the marker coordinate system (Xm, Ym, Zm), the four vertices of the marker 4 have coordinates (xm0, ym0, zm0), (xm1, ym1, zm1), (xm2, ym2, zm2), and (xm3, ym3, zm3), respectively. Since the size of the marker 4 is known, the coordinates of the four vertices of the marker 4 in the marker coordinate system are also known. For example, when the upper left vertex of the marker 4 of FIG. 12 is an origin of the marker coordinate system (Xm, Ym, Zm), and the marker 4 has an actual size of 30 cm×30 cm, the vertices of the marker 4 have coordinates, for example, (xm0, ym0, zm0)=(0, 0, 0), (xm1, ym1, zm1)=(0.3, 0, 0), (xm2, ym2, zm2)=(0, 0.3, 0), and (xm3, ym3, zm3)=(0.3, 0.3, 0).

Figure 13:
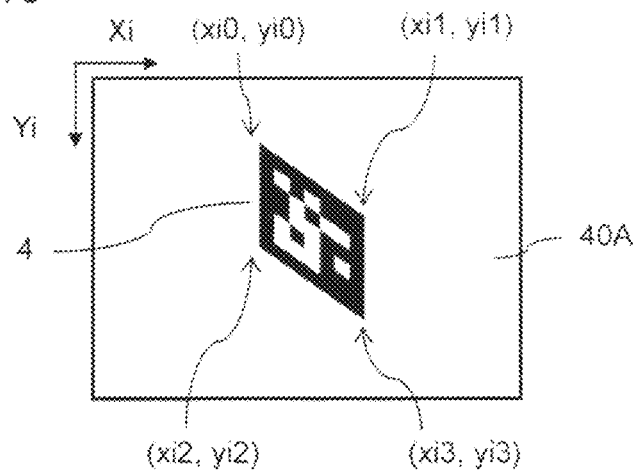
FIG. 13 is a diagram showing coordinates of vertices of the marker 4 in an image 40A captured by the image capturing apparatus 11 of FIG. 1.

FIG. 13 is a diagram showing coordinates of vertices of the marker 4 in an image 40A captured by the image capturing apparatus 11 of FIG. 1. In the image coordinate system (Xi, Yi), the four vertices of the marker 4 have coordinates (xi0, yi0), (xi1, yi1), (xi2, yi2), and (xi3, yi3), respectively.

In step S22 of FIG. 11, the absolute position calculator 34 calculates the position and the attitude of the marker 4 in a three-dimensional coordinate system whose origin is located at the image capturing apparatus 11 (camera coordinate system), based on the coordinates of the marker 4 detected in step S21. That is, the absolute position calculator 34 calculates the position and the attitude of the marker 4 as seen from the image capturing apparatus 11. For example, the absolute position calculator 34 calculates the position and the attitude of the marker 4 as seen from the image capturing apparatus 11, by solving a perspective n point (PnP) problem based on the coordinates of the four vertices of the marker 4 in the two-dimensional image coordinate system, and based on the coordinates of the four vertices of the marker 4 in the three-dimensional marker coordinate system.

In step S23, the absolute position calculator 34 calculates the position and the attitude of the image capturing apparatus 11 in the marker coordinate system (i.e., the position and the attitude of the image capturing apparatus 11 as seen from the marker 4). The position of the marker 4 as seen from the image capturing apparatus 11 is represented by the translation vector t, and the attitude of the marker 4 as seen from the image capturing apparatus 11 is represented by the rotation matrix R. In this case, the attitude of the image capturing apparatus 11 as seen from the marker 4 is represented by $R^{-1}$, and the position of the image capturing apparatus 11 as seen from the marker 4 is represented by $-R^{-1}t$.

In step S24, the absolute position calculator 34 executes a marker evaluation process (described later with reference to FIG. 17 to FIG. 46) to determine whether or not the marker 4 is captured at an appropriate angle and from an appropriate distance, that is, whether or not the recognized marker 4 is reliable. When the recognized marker 4 is determined to be reliable, the process proceeds from step S25 to step S26, otherwise, the process proceeds from step S25 to step S4 of FIG. 8.

In step S26, the absolute position calculator 34 reads out the position and the attitude of the marker 4 in the world coordinate system (i.e., the absolute position and the absolute attitude of the marker 4) from the storage apparatus 35, based on the identifier of the marker 4 detected in step S21.

In step S27, the absolute position calculator 34 calculates the position and the attitude of the vehicle 1 in the world coordinate system (i.e., the absolute position and the absolute attitude of the vehicle 1), based on the position and the attitude of the image capturing apparatus 11 in the marker coordinate system calculated in step S23, and based on the position and the attitude of the marker 4 in the world coordinate system read out in step S26. The position and the attitude of the vehicle 1 in the world coordinate system can be obtained by adding the position and the attitude of the marker 4 in the world coordinate system, as offset values, to the position and the attitude of the image capturing apparatus 11 in the marker coordinate system. The absolute position calculator 34 send the calculated relative position and the calculated relative attitude of the vehicle 1, to the corrector.

[Correction Process]

Figure 14:
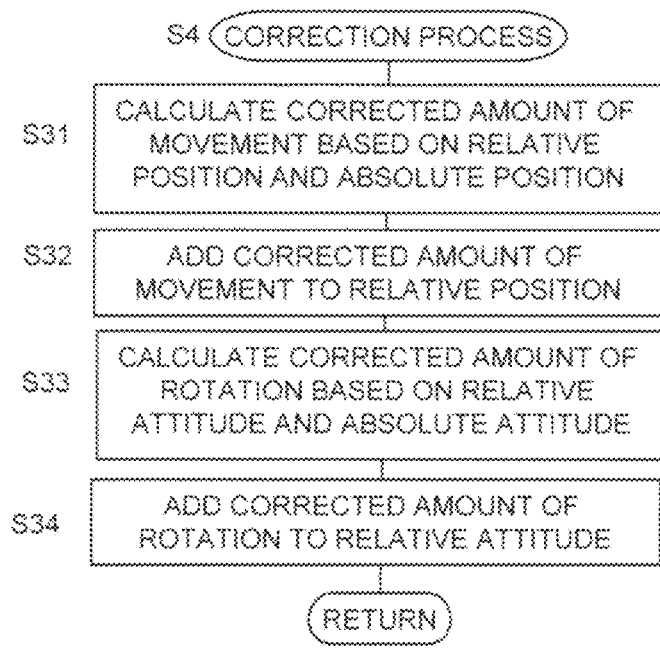
FIG. 14 is a flowchart showing a subroutine of step S4 (correction process) of FIG. 8.

FIG. 14 is a flowchart showing a subroutine of step S4 (correction process) of FIG. 8.

When executing the correction process in FIG. 14, the corrector 36 initially stores therein the latest absolute position and absolute attitude calculated previously.

In step S31, the corrector 36 calculates a corrected amount of movement of the vehicle 1 based on the relative position and the absolute position of the vehicle 1.

Figure 15:
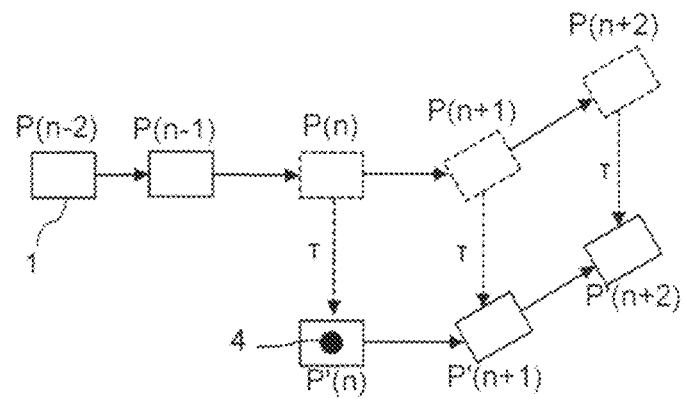
FIG. 15 is a diagram for explaining a corrected amount of movement calculated in step S31 of FIG. 14.

FIG. 15 is a diagram for explaining the corrected amount of movement calculated in step S31 of FIG. 14. FIG. 15 shows a position of the vehicle 1 calculated by the positioning apparatus 12. At time moments n−2 to n+2, the vehicle 1 has relative positions P(n−2) to P(n+2). When the vehicle 1 arrives at the relative position P(n), the positioning apparatus 12 detects the marker 4. At this time, even if the relative position P(n) is remote from the marker 4 on the map, it is considered that the vehicle 1 is actually located near the marker 4. Therefore, the positioning apparatus 12 calculates a difference between the relative position P(n) and the position of the marker 4 as a corrected amount of movement τ. The positioning apparatus 12 adds the corrected amount of movement τ to the relative position P(n) to obtain a corrected position P'(n). Thereafter, the positioning apparatus 12 similarly adds the corrected amount of movement τ to the relative positions P(n+1), P(n+2), and so on, to obtain corrected positions P'(n+1), P'(n+2), and so on.

In step S32 of FIG. 14, the corrector 36 adds the corrected amount of movement of the vehicle 1 to the relative position of the vehicle 1.

In step S33, the corrector 36 calculates a corrected amount of rotation of the vehicle 1 based on the relative attitude and the absolute attitude of the vehicle 1.

Figure 16:
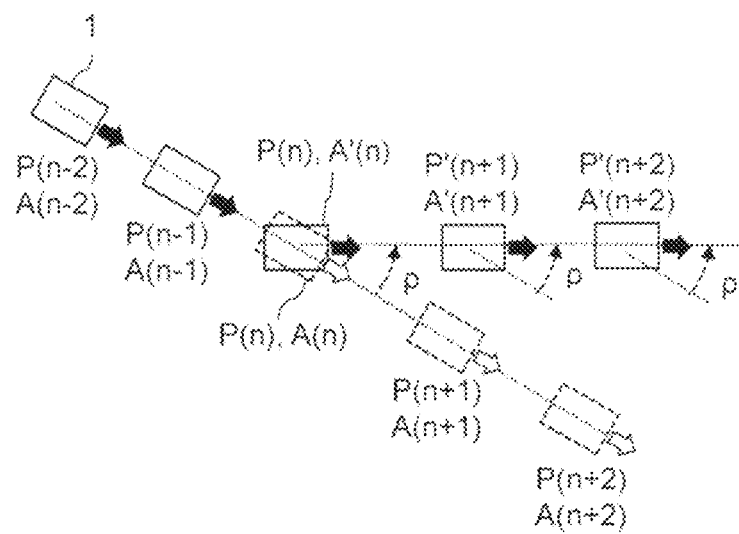
FIG. 16 is a diagram for explaining a corrected amount of rotation calculated in step S33 of FIG. 14.

FIG. 16 is a diagram for explaining the corrected amount of rotation calculated in step S33 of FIG. 14. FIG. 16 shows positions P and P' and attitudes A and A' of the vehicle 1 calculated by the positioning apparatus 12. At the time moments n−2 to n+2, the vehicle 1 has relative positions P(n−2) to P(n+2) and relative attitudes A(n−2) to A(n+2). In FIG. 16, each of thick arrows indicates an attitude of the vehicle 1. When the vehicle 1 arrives at the relative position P(n), the positioning apparatus 12 detects the marker 4, and calculates an absolute attitude of the vehicle 1. The positioning apparatus 12 calculates a difference between the relative attitude A(n) and the absolute attitude, as a corrected amount of rotation ρ, while setting the relative position P(n) at the center of rotation. The positioning apparatus 12 adds the corrected amount of rotation ρ to the relative attitude A(n) to obtain a corrected attitude A'(n). Thereafter, the positioning apparatus 12 similarly adds the corrected amount of rotation ρ to the relative attitudes A(n+1), A(n+2), and so on, to obtain corrected attitudes A'(n+1), A'(n+2), and so on.

In step S33, the corrector 36 may calculate, as the corrected amount of rotation of the vehicle 1, a difference between the absolute attitude and an average of a plurality of relative attitudes calculated over a predetermined time length (or in correspondence with a predetermined number of consecutive images). It is difficult to determine the actual traveling direction of the vehicle 1 (for example, whether or not the vehicle 1 is travelling along the passageway 101), based on only an instantaneous value of the relative attitude of the vehicle 1. In addition, the relative attitude of the vehicle 1 may include an error. Accordingly, it is possible to accurately determine the actual traveling direction of the vehicle 1 using the average of the plurality of relative attitudes.

In step S34 of FIG. 14, the corrector 36 adds the corrected amount of rotation of the vehicle 1 to the relative attitude of the vehicle 1.

[Marker Evaluation Process]

Figure 17:
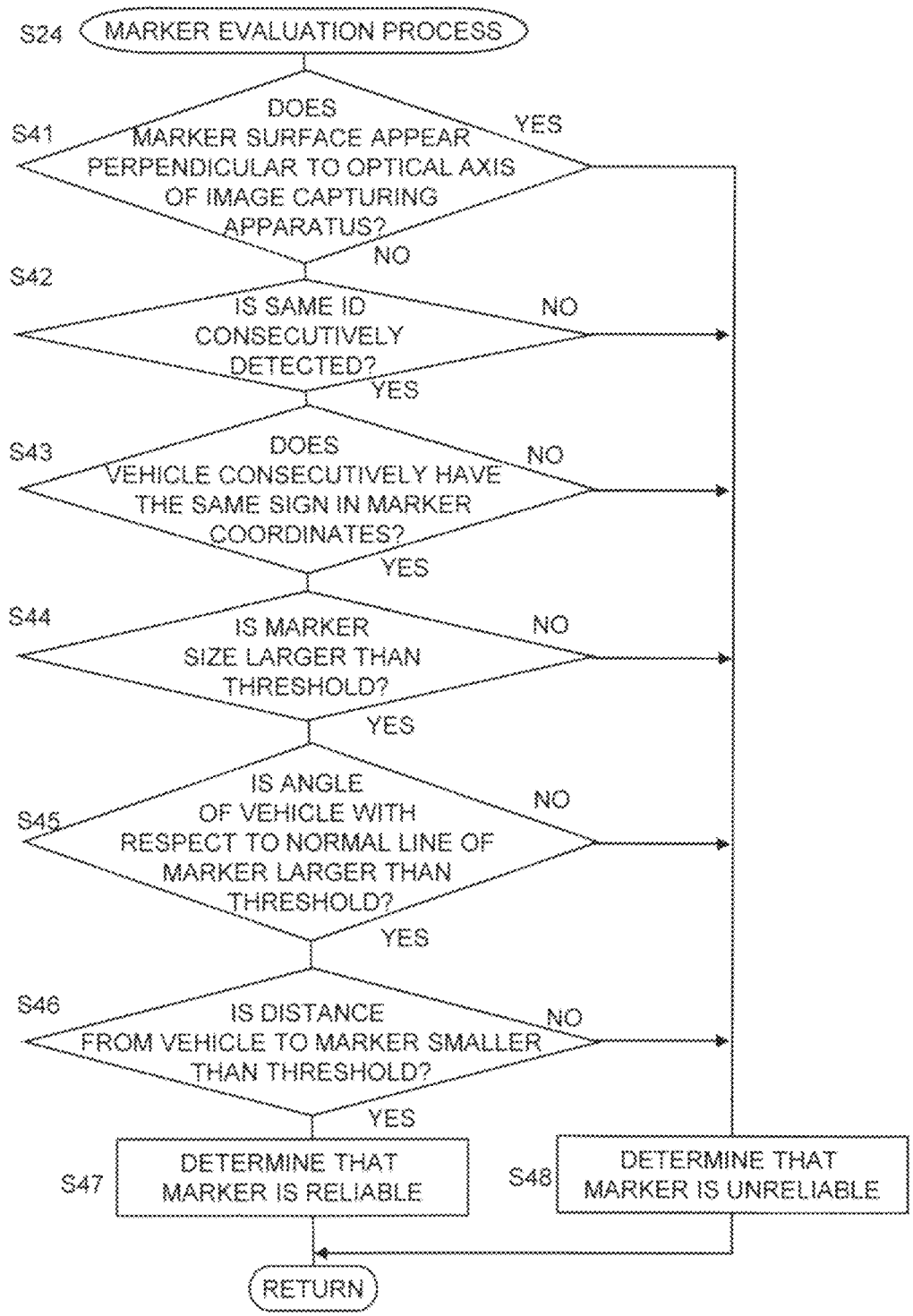
FIG. 17 is a flowchart showing a subroutine of step S24 (marker evaluation process) of FIG. 11.

FIG. 17 is a flowchart showing a subroutine of step S24 (marker evaluation process) of FIG. 11.

[Step S41]

In step S41 of FIG. 17, the absolute position calculator 34 determines whether or not a surface of the marker 4 appears perpendicular to the optical axis of the image capturing apparatus 11, in the image captured by the image capturing apparatus 11; if YES, the process proceeds to step 948, and if NO, the process proceeds to step S42.

Depending on the position of the marker 4 in the image captured by the image capturing apparatus 11, it may be difficult to distinguish the markers 4 whose surfaces have different angles with respect to the optical axis of the image capturing apparatus 11. For example, at edges of the image captured by the image capturing apparatus 11, it is difficult to distinguish between the marker 4 having a surface perpendicular to the optical axis of the image capturing apparatus 11, and the marker 4 having a surface parallel to the optical axis of the image capturing apparatus 11.

Figure 18:
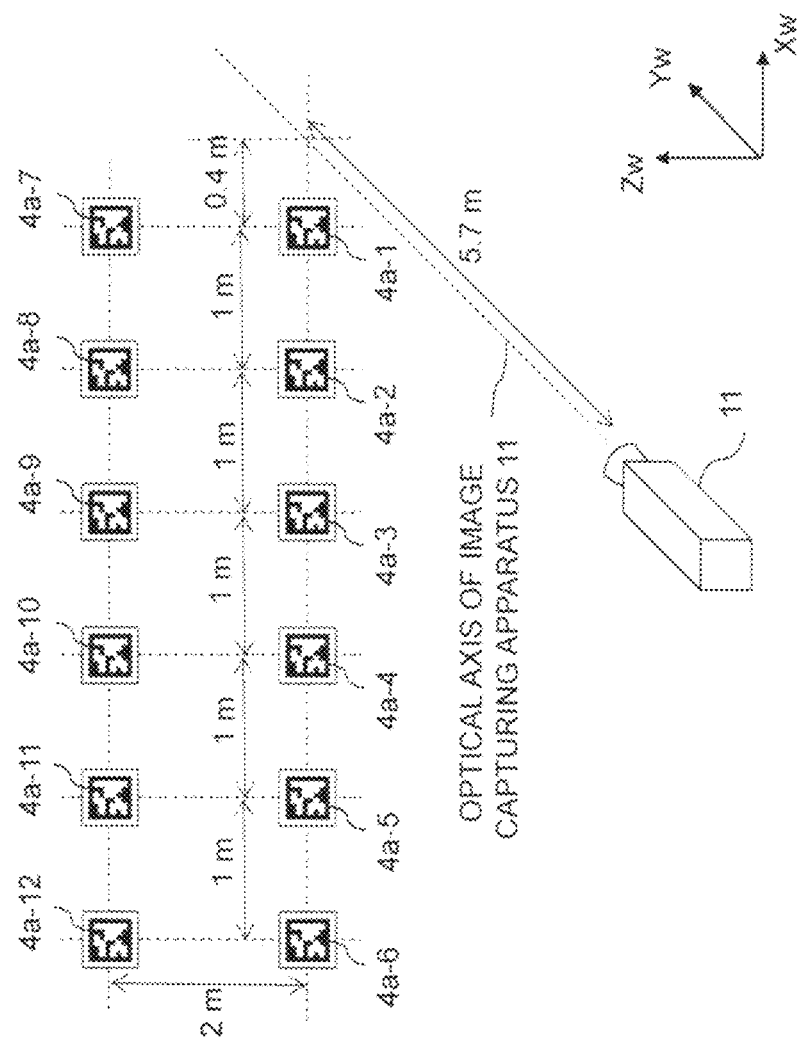
FIG. 18 is a diagram showing an exemplary arrangement of markers 4a-1 to 4a-12 to be captured by the image capturing apparatus 11 of FIG. 1.
Figure 19:
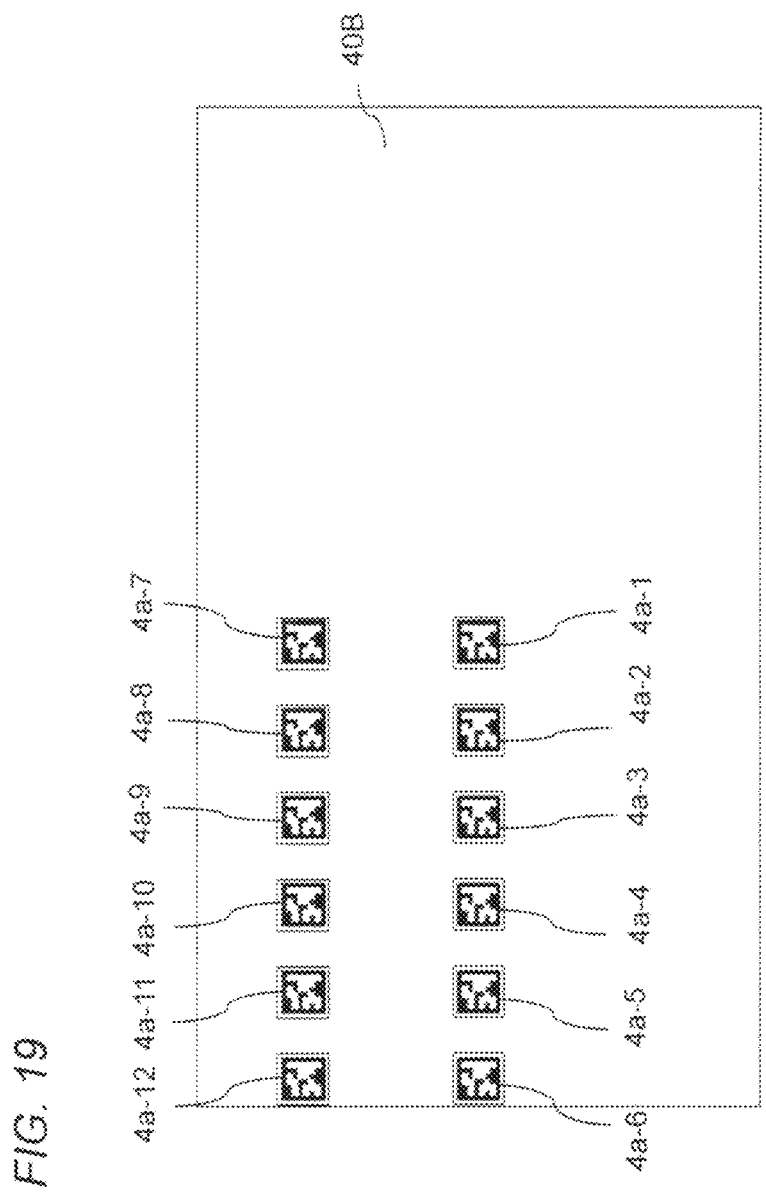
FIG. 19 is a diagram showing an example of an image 40B of the markers 4a-1 to 4a-12 of FIG. 18 captured by the image capturing apparatus 11.

FIG. 18 is a diagram showing an exemplary arrangement of markers 4a-1 to 4a-12 to be captured by the image capturing apparatus 11 of FIG. 1. Each of the markers 4a-1 to 4a-12 has a square pattern and an actual size (not including margins around the pattern) of 0.6 m by 0.6 m. In addition, the markers 4*a*-1 to 4*a*-12 are arranged such that their surfaces are perpendicular to the optical axis of the image capturing apparatus 11, that is, parallel to the Xw-Zw plane. FIG. 19 is a diagram showing an example of an image 40B of the markers 4*a*-1 to 4*a*-12 of FIG. 18 captured by the image capturing apparatus 11.

Figure 20:
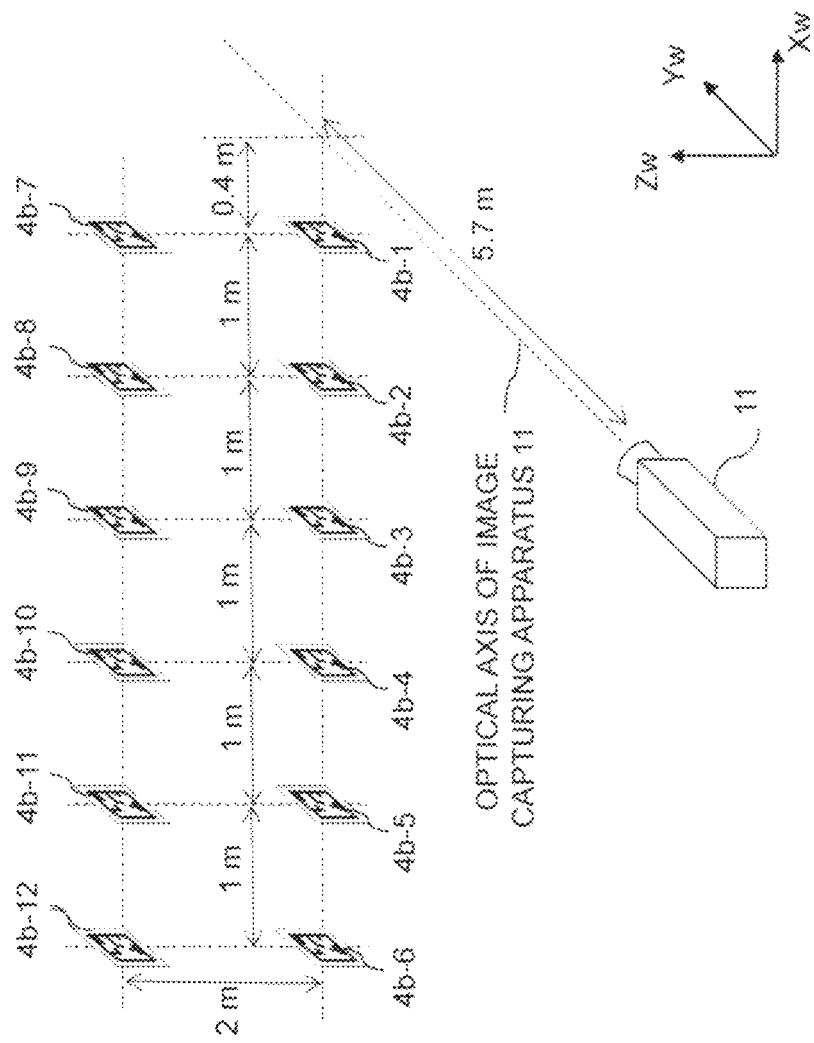
FIG. 20 is a diagram showing an exemplary arrangement of markers 4b-1 to 4b-12 to be captured by the image capturing apparatus 11 of FIG. 1.
Figure 21:
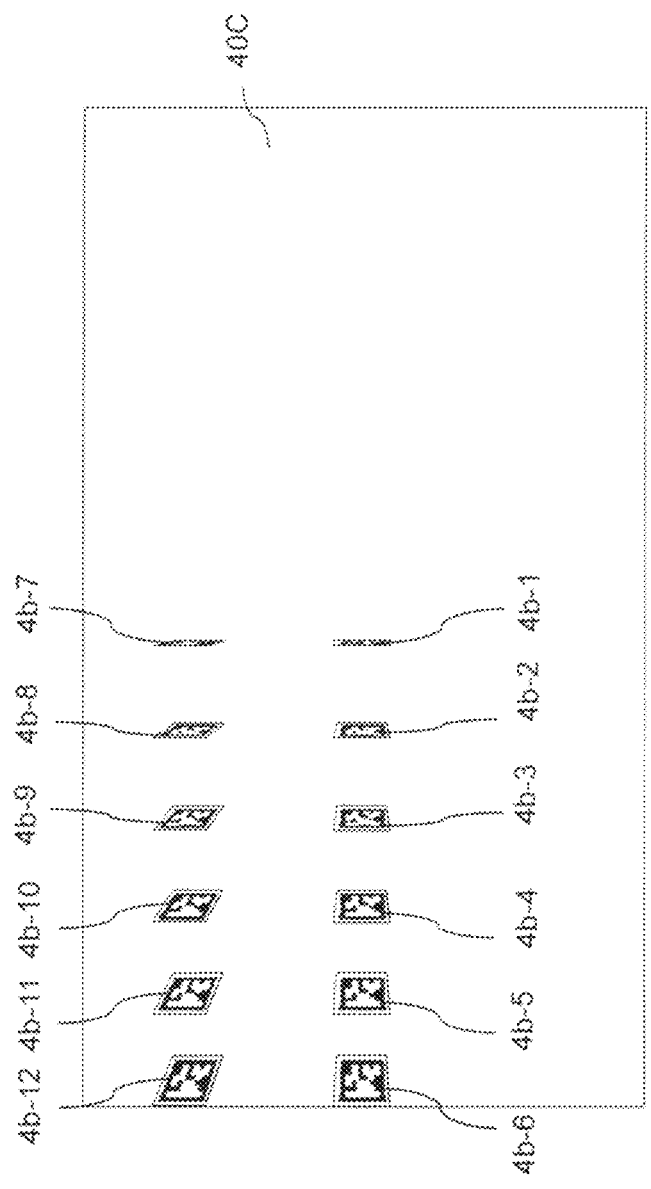
FIG. 21 is a diagram showing an example of an image 40C of the markers 4b-1 to 4b-12 of FIG. 20 captured by the image capturing apparatus 11.

FIG. 20 is a diagram showing an exemplary arrangement of markers 4*b*-1 to 4*b*-12 to be captured by the image capturing apparatus 11 of FIG. 1. Each of the markers 4*b-1* to 4*b*-12 has a square pattern and an actual size (not including margins around the pattern) of 0.6 m by 0.6 m. In addition, the markers 4*b*-1 to 4*b*-12 are arranged such that their surfaces are parallel to the optical axis of the image capturing apparatus 11, that is, parallel to the Yw-Zw plane. FIG. 21 is a diagram showing an example of an image 40C of the markers 4*b*-1 to 4*b*-12 of FIG. 20 captured by the image capturing apparatus 11. Comparing FIG. 21 with FIG. 19, it can be seen that the marker 4*b*-6 in the image 40C of FIG. 21 looks almost the same size and shape as those of the markers 4*a*-1 to 4*a*-12 of FIG. 19, even though the orientations of their surfaces are different by 90 degrees.

Figure 22:
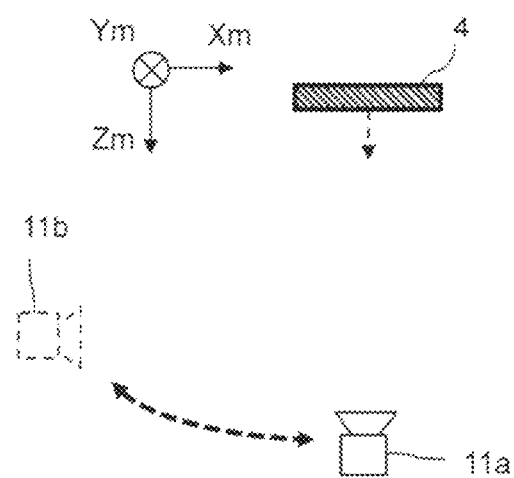
FIG. 22 is a diagram explaining a change in position of the image capturing apparatus 11 of FIG. 1 in the marker coordinate system, the change being caused by erroneous detection of an angle of a surface of the marker 4 with respect to an optical axis of the image capturing apparatus 11.

FIG. 22 is a diagram explaining a change in position of the image capturing apparatus 11 of FIG. 1 in the marker coordinate system, the change being caused by erroneous detection of an angle of a surface of the marker 4 with respect to an optical axis of the image capturing apparatus 11. As described above, the markers 4*a*-1 to 4*a*-12 of FIG. 19 and the marker 4*b*-6 of FIG. 21 are apparently not distinguishable from each other. Therefore, although the image capturing apparatus 11 should have the position and attitude of "11*a*" in the marker coordinate system of FIG. 22, it may be erroneously determined to have the position and attitude of "11*b*", and vice versa. As will be described later with reference to FIGS. 35 to 38, in a case where the optical axis of the image capturing apparatus 11 passes through a substantial center of the surface of the marker 4, and is substantially perpendicular to the surface of the marker 4, it is difficult to determine the position of the image capturing apparatus 11 in the marker coordinate system with an origin at the marker 4, and such a marker 4 is not suitable to calculate the absolute position and the absolute attitude of the vehicle 1. Therefore, in step S41 of FIG. 17, the absolute position calculator 34 treats the markers 4 that appear to have a surface perpendicular to the optical axis of the image capturing apparatus 11, so as not to be used for calculating the absolute position and the absolute attitude of the vehicle 1. Here, the markers 4 that appear to have a surface perpendicular to the optical axis of the image capturing apparatus 11 includes the markers 4 having a surface actually perpendicular to the optical axis of the image capturing apparatus 11 (markers 4-1 to 4*a*-12 of FIG. 18), and the markers 4 that are apparently not distinguishable from the markers 4 having a surface perpendicular to the optical axis of the image capturing apparatus 11 (marker 4*b*-6 of FIG. 20).

Figure 23:
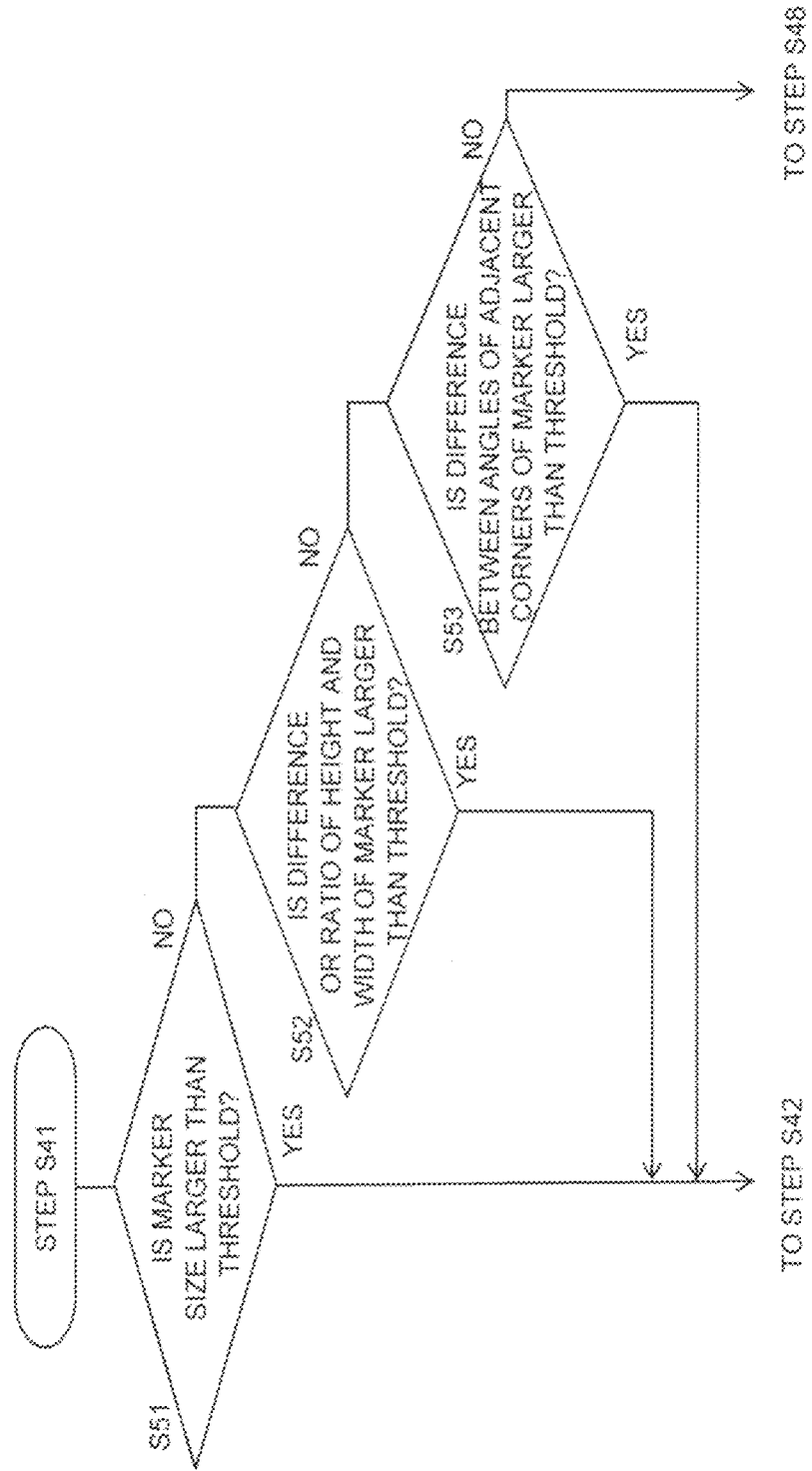
FIG. 23 is a flowchart showing a subroutine of step S41 of FIG. 17.

FIG. 23 is a flowchart showing a subroutine of step S41 of FIG. 17. Step S41 may include, for example, the following steps.

In step S51, the absolute position calculator 34 determines whether or not the apparent size of the marker 4 in the image captured by the image capturing apparatus 11 is larger than a threshold; if YES, the process proceeds to step S42 of FIG. 17, and if NO, the process proceeds to step S52. The apparent size of the marker 4 in the image is, for example, an apparent height and an apparent width of the marker 4 in the image, and they are represented by, for example, the number of pixels. The threshold of step S51 is, for example, 30 pixels. The marker 4 occupying a small area in the image may be erroneously recognized. On the other hand, it is considered to be less likely to erroneously recognize the marker 4 occupying a large area in the image.

In step S52, the absolute position calculator 34 determines whether or not a difference or a ratio of the apparent height and the apparent width of the marker 4 in the image captured by the image capturing apparatus 11 is larger than a threshold; if YES, the process proceeds to step S42 of FIG. 17, and if NO, the process proceeds to step S53. The apparent height and the apparent width of the marker 4 in the image are represented by, for example, the number of pixels. In step S52, when the difference of the apparent height and the apparent width of the marker 4 in the image is compared with the threshold, the threshold is, for example, 3 pixels. The marker 4 having the apparent height and the apparent width of approximately the same length in the image may appear to have a surface perpendicular to the optical axis of the image capturing apparatus 11. On the other hand, it is considered that the marker 4 having the apparent height and the apparent width of substantially different lengths in the image has a surface inclined with respect to the optical axis of the image capturing apparatus 11.

In step S53, the absolute position calculator 34 determines whether or not an apparent difference between angles of adjacent corners of the marker 4 in the image captured by the image capturing apparatus 11 is larger than a threshold; if YES, the process proceeds to step S42 of FIG. 17, and if NO, the process proceeds to step 348 of FIG. 17. The threshold of step S53 is, for example, 30 degrees. The markers 4 whose adjacent corners have angles substantially equal to each other in the image may appear to have a surface perpendicular to the optical axis of the image capturing apparatus 11. On the other hand, it is considered that the marker 4 whose adjacent corners have angles substantially different from each other in the image has a surface inclined with respect to the optical axis of the image capturing apparatus 11.

Figure 24:
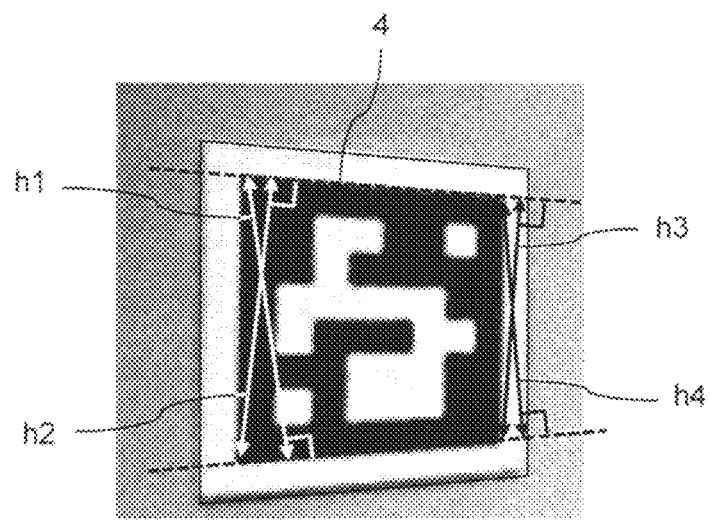
FIG. 24 is a diagram explaining an apparent height of the marker 4 in the image in conjunction with steps S51 and S52 of FIG. 23.
Figure 25:
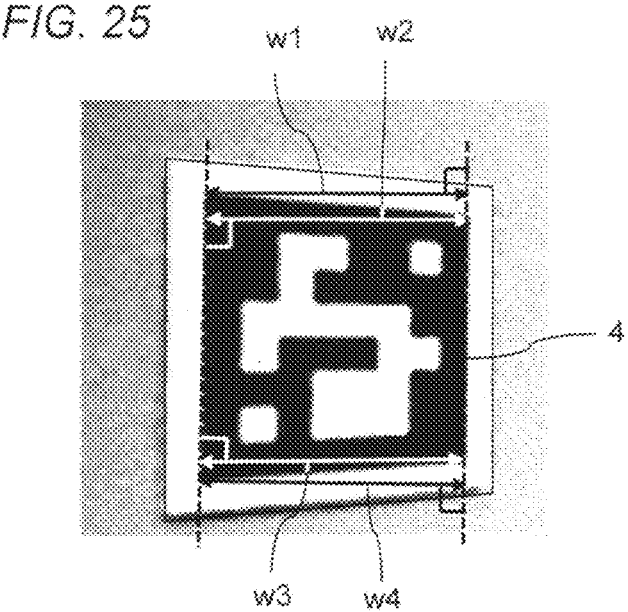
FIG. 25 is a diagram explaining an apparent width of the marker 4 in the image in conjunction with steps S51 and S52 of FIG. 23.

FIG. 24 is a diagram explaining an apparent height of the marker 4 in the image in conjunction with steps S51 and S52 of FIG. 23. FIG. 25 is a diagram explaining an apparent width of the marker 4 in the image in conjunction with steps S51 and S52 of FIG. 23. In the image, the pattern of the marker 4 has a quadrangular shape. Referring to FIG. 24, the apparent height of the marker 4 in the image is represented by the length of the shortest perpendicular line among perpendicular lines h1 to h4 from four vertices to opposite sides. Similarly, referring to FIG. 25, the apparent width of the marker 4 in the image is represented by the length of the shortest perpendicular line among perpendicular lines w1 to w4 from four vertices to opposite sides. The apparent height and the apparent width of the marker 4 in the image indicate the apparent height and the apparent width of the pattern in the image, and do not include margins and the like around the pattern.

Figure 26:
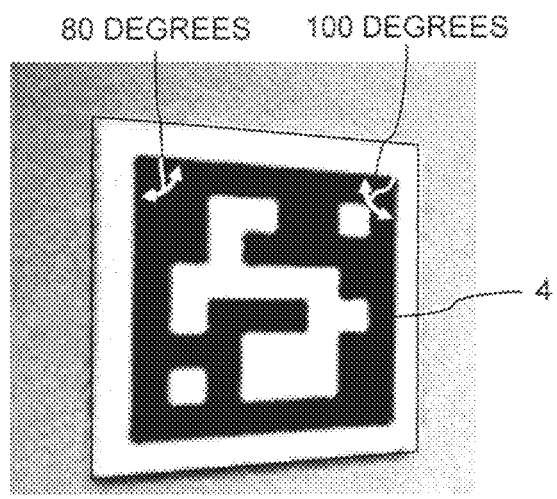
FIG. 26 is a diagram explaining an apparent difference between angles of adjacent corners of the marker 4 in the image in conjunction with step S53 of FIG. 23.

FIG. 26 is a diagram explaining an apparent difference between angles of adjacent corners of the marker 4 in the image in conjunction with step S53 of FIG. 23. The apparent difference between the angles of the adjacent corners of the marker 4 in the image indicates an apparent difference between angles of adjacent corners of the pattern in the image, and does not include margins and the like around the pattern. In the example of FIG. 26, the apparent angle of the upper left corner of the marker 4 is 80 degrees, and the apparent angle of the upper right corner of the marker 4 is 100 degrees. Therefore, the apparent difference between the angles of the upper left corner and the upper right corner of the marker 4 in the image is 20 degrees.

Figure 27:
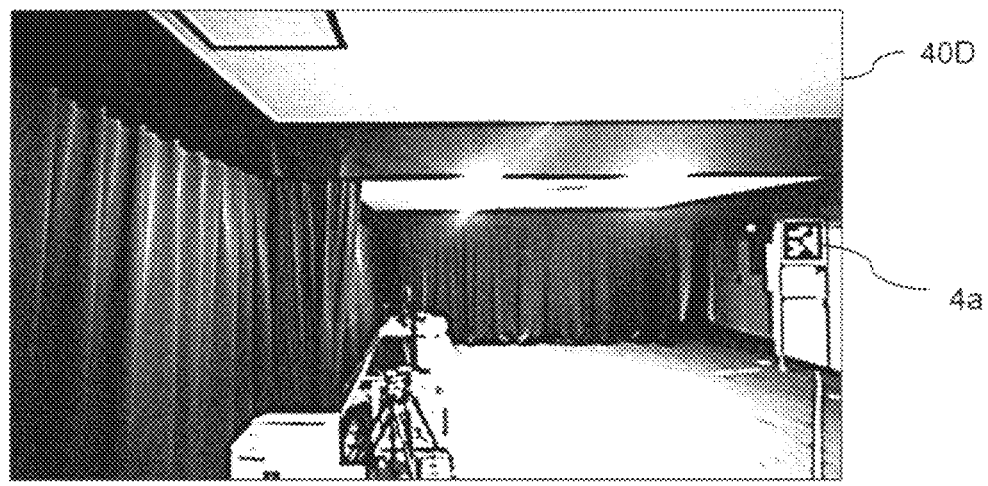
FIG. 27 is a diagram showing an image 4D including a marker 4a having a surface perpendicular to the optical axis of the image capturing apparatus 11 of FIG. 1.
Figure 28:
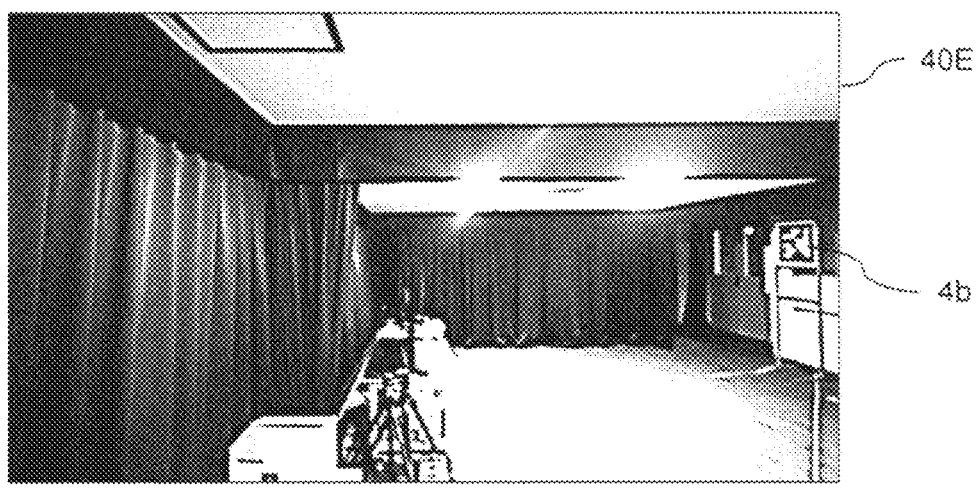
FIG. 28 is a diagram showing an image 4E including a marker 4b having a surface parallel to the optical axis of the image capturing apparatus 11 of FIG. 1, with a difference between height and width of the marker 4b in the image 4E being one pixel.

FIG. 27 is a diagram showing an image 4D including a marker 4a having a surface perpendicular to the optical axis of the image capturing apparatus 11 of FIG. 1. FIG. 28 is a diagram showing an image 4E including a marker 4b having a surface parallel to the optical axis of the image capturing apparatus 11 of FIG. 1, with a difference between height and width of the marker 4b in the image 4E being one pixel. Comparing FIG. 27 with FIG. 28, it can be seen that in a case where the difference of the height and the width of the marker 4b in the image is smaller than the threshold, i.e., 3 pixels, it is difficult to distinguish the marker 4b having a surface perpendicular to the optical axis of the image capturing apparatus 11 (FIG. 28), from the marker 4a having a surface parallel to the optical axis of the image capturing apparatus 11 (FIG. 27).

Figure 29:
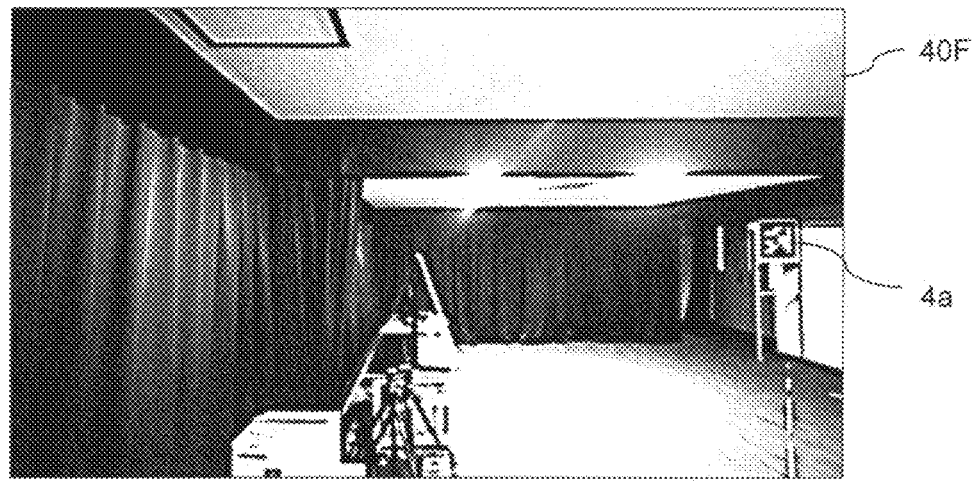
FIG. 29 is a diagram showing an image 4F including a marker 4a having a surface perpendicular to the optical axis of the image capturing apparatus 11 of FIG. 1.
Figure 30:
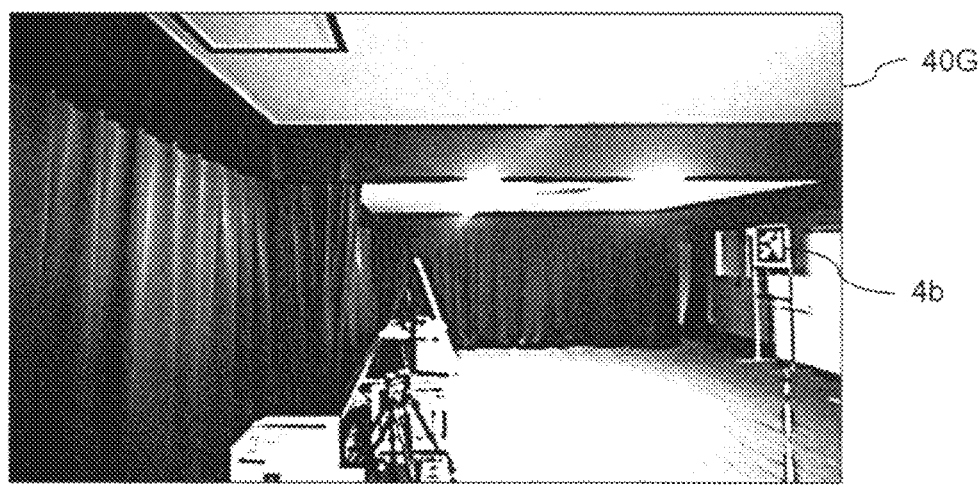
FIG. 30 is a diagram showing an image 40 including a marker 4b having a surface parallel to the optical axis of the image capturing apparatus 11 of FIG. 1, with a difference between height and width of the marker 4b in the image 4G being four pixels.

FIG. 29 is a diagram showing an image 4F including a marker 4a having a surface perpendicular to the optical axis of the image capturing apparatus 11 of FIG. 1. FIG. 30 is a diagram showing an image 40 including a marker 4b having a surface parallel to the optical axis of the image capturing apparatus 11 of FIG. 1, with a difference between height and width of the marker 4b in the image 4G being four pixels. Comparing FIG. 29 with FIG. 30, it can be seen that in a case where the difference of the height and the width of the marker 4b in the image is larger than the threshold, i.e., 3 pixels, the marker 4b having a surface perpendicular to the optical axis of the image capturing apparatus 11 (FIG. 30) can be distinguished from the marker 4a having a surface parallel to the optical axis of the image capturing apparatus 11 (FIG. 29).

Figure 31:
FIG. 31 is a diagram showing an image 4H including a marker 4a having a surface perpendicular to the optical axis of the image capturing apparatus 11 of FIG. 1.
Figure 32:
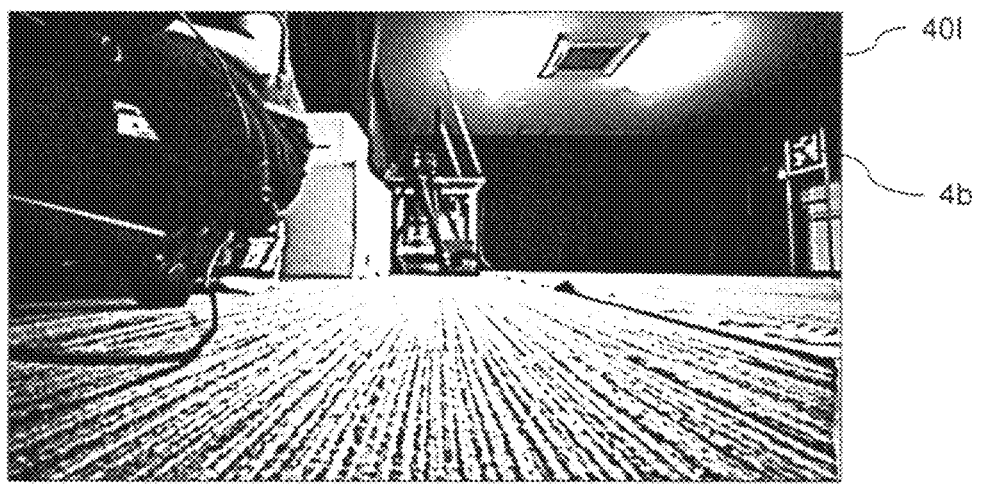
FIG. 32 is a diagram showing an image 4I including a marker 4b having a surface parallel to the optical axis of the image capturing apparatus 11 of FIG. 1, with a difference between angles of adjacent corners of the marker 4b in the image 4I being 35 degrees.

FIG. 31 is a diagram showing an image 4H including a marker 4a having a surface perpendicular to the optical axis of the image capturing apparatus 11 of FIG. 1. FIG. 32 is a diagram showing an image 4I including a marker 4b having a surface parallel to the optical axis of the image capturing apparatus 11 of FIG. 1, with a difference between angles of adjacent corners of the marker 4b in the image 4I being 35 degrees. Comparing FIG. 31 with FIG. 32, it can be seen that in a case where the difference between the angles of the adjacent corners of the marker 4b in the image is larger than the threshold, i.e., 30 degrees, the marker 4b having a surface perpendicular to the optical axis of the image capturing apparatus 11 (FIG. 32) can be distinguished from the marker 4a having a surface parallel to the optical axis of the image capturing apparatus 11 (FIG. 31).

According to step S41 of FIG. 17, it is possible to detect and remove the markers 4 apparently not distinguishable although having surfaces at different angles with respect to the optical axis of the image capturing apparatus 11, that is, the marker 4 not suitable to calculate the absolute position and the absolute attitude of the vehicle 1.

[Step S43]}

In step S42 of FIG. 17, the absolute position calculator 34 counts the number of images from which the marker 4 having the same identifier is extracted, among the images consecutively captured by the image capturing apparatus 11. Further, in step S42, the absolute position calculator 34 determines whether or not a predetermined number of markers 4 extracted from a predetermined number of images consecutively captured by the image capturing apparatus 11 has the same identifier; If YES, the process proceeds to step S43, and if NO, the process proceeds to step S48.

Figure 33:
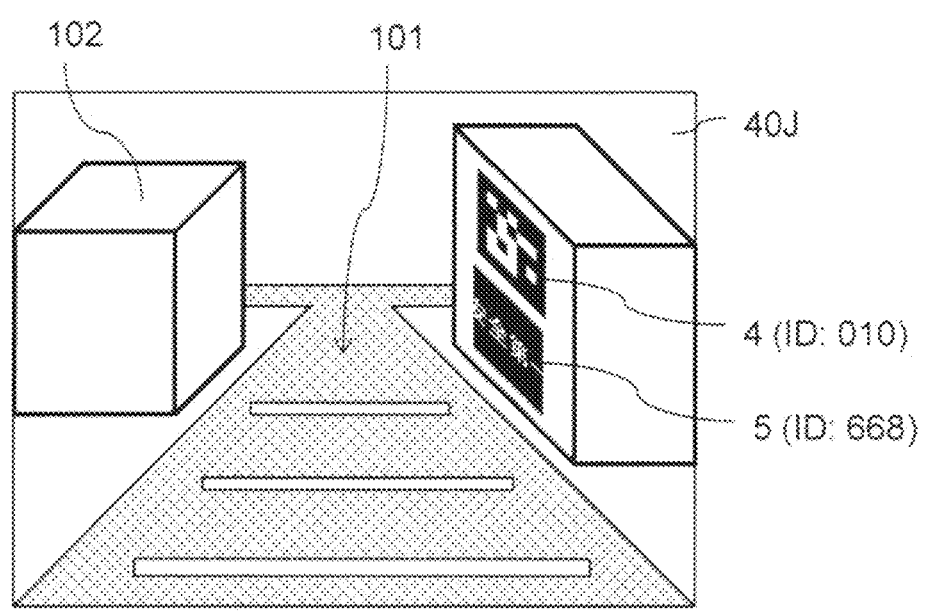
FIG. 33 is a diagram showing an example of an image 40J captured by an image capturing apparatus 11 of FIG. 1.

FIG. 33 is a diagram showing an example of an image 40J captured by the image capturing apparatus 11 of FIG. 1. When capturing the marker 4 in an environment including a complex background, such as a warehouse or factory, an object 5 may be erroneously recognized as a marker, i.e., a visually distinguishable area having a marker identifier (for example, ID: 668). In particular, when the marker 4 has a simple pattern, a different object 5 is likely to be erroneously recognized as a marker.

FIG. 34 is a table including a markers 4 detected by the image recognizer 33 of FIG. 3, and including an object erroneously detected as a marker 4. Each row of the table in FIG. 34 indicates a candidate for the marker 4 (marker 4 or erroneously detected object) extracted from each of the images captured by the image capturing apparatus 11. One or more candidates of the marker 4 may be detected in one image. Conversely, no candidate of the marker 4 may be detected in an image. The table in FIG. 34 indicates the identifier (ID) (first column), the time moment when capturing the image including the candidate of the marker 4 (second column), the position (third to fifth columns), and the angle (sixth column) of each candidate of the marker 4. When the image recognizer 33 detects a marker 4, the object 5 near the marker 4 may be temporarily erroneously recognized as a marker. However, even when the object 5 in a certain image is erroneously detected as the marker 4, there would be a very low possibility that the object 5 is erroneously detected as the marker 4 similarly over a plurality of consecutive images. Therefore, even when the object 5 having a certain identifier (for example, ID: 668) is detected in a certain image, it is possible to determine that the object 5 is not the marker 4 when the object 5 is not detected over a plurality of consecutive images. On the other hand, when the markers 4 having the same identifier (for example, ID: 010) are detected over the plurality of images consecutively captured by the image capturing apparatus 11, it is possible to determine that the markers 4 are detected.

A threshold (predetermined number) of step S42 of FIG. 17 is set to, for example, "3," but may be set to any other value.

[Step S43]

In step S43 in FIG. 17, the absolute position calculator 34 calculates the position and attitude of the image capturing apparatus 11 (i.e., the vehicle 1) in each of a predetermined number of marker coordinate systems with origins at markers 4 having the same identifier and extracted from a predetermined number of images consecutively captured by the image capturing apparatus 11. Further, in step S43, the absolute position calculator 34 determines whether or not the coordinates of the image capturing apparatus 11 (i.e., the vehicle 1) in the marker coordinate systems have the same sign over a predetermined number (threshold) of images; if YES, the process proceeds to step S44, and if NO, the process proceeds to step S48.

Figure 35:
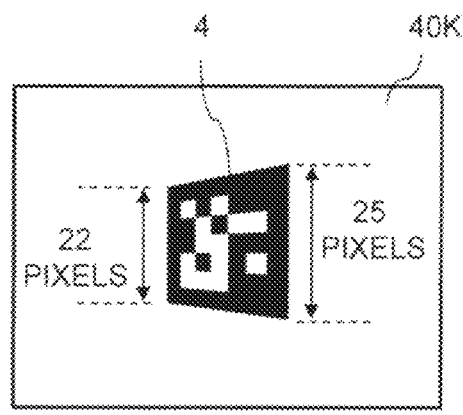
FIG. 35 is a diagram showing an example of an image 40K captured by the image capturing apparatus 11 of FIG. 1, the image 40K including the marker 4 suitable to calculate an absolute position and an absolute attitude of the vehicle 1.
Figure 36:
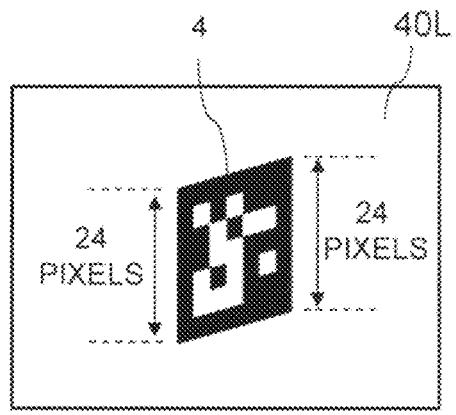
FIG. 36 is a diagram showing an example of an image 40L captured by the image capturing apparatus 11 of FIG. 1, the image 40L including the marker 4 not suitable to calculate the absolute position and the absolute attitude of the vehicle 1.

FIG. 35 is a diagram showing an example of an image 40K captured by the image capturing apparatus 11 of FIG. 1, the image 40K including the marker 4 suitable to calculate the absolute position and the absolute attitude of the vehicle 1. FIG. 36 is a diagram showing an example of an image 40L captured by the image capturing apparatus 11 of FIG. 1, the image 40L including the marker 4 not suitable to calculate the absolute position and the absolute attitude of the vehicle 1. In the image, for example, when opposite sides of a rectangular marker 4 have different lengths, it is possible to definitely determine from where the image capturing apparatus 11 is capturing the marker 4, i.e., definitely determine the position of the image capturing apparatus 11 in the marker coordinate system. For example, as shown in FIG. 35, when the right side of the marker 4 is longer than the left side of the marker 4, it is possible to determine that the marker 4 is captured from the right side of the marker 4. On the other hand, in the image, for example, when the opposite sides of the rectangular marker 4 have the same length, it is difficult to determine the position of the image capturing apparatus 11 in the marker coordinate system. For example, as shown in FIG. 36, when the right side and the left side of the marker 4 have the same length, it is not possible to determine whether the marker 4 is captured from the right side of the marker 4, or from the left side of the marker 4.

Figure 37:
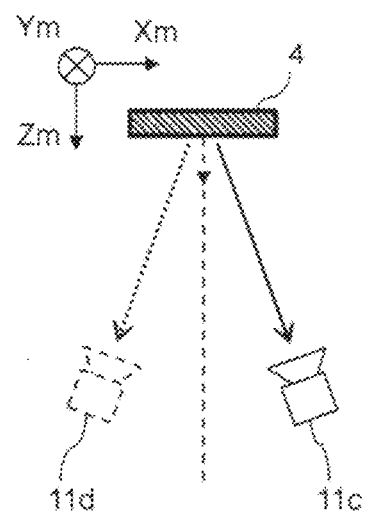
FIG. 37 is a diagram illustrating inversion of the position of the image capturing apparatus 11 in a marker coordinate system, in a case where the optical axis of the image capturing apparatus 11 of FIG. 1 passes through a substantial center of the surface of the marker 4, and is substantially perpendicular to the surface of the marker 4.

FIG. 37 is a diagram illustrating inversion of the position of the image capturing apparatus 11 in a marker coordinate system, in a case where the optical axis of the image capturing apparatus 11 of FIG. 1 passes through a substantial center of the surface of the marker 4, and is substantially perpendicular to the surface of the marker 4. In the example in FIG. 38, an image capturing apparatus 11c located on the right side with respect to a normal line of the marker 4 has a positive Xm coordinate, and an image capturing apparatus 11d located on the left side with respect to the normal line of the marker 4 has an negative Xm coordinate.

FIG. 38 is a table showing changes in the position of the image capturing apparatus 11 in the marker coordinate systems, the position being calculated by the position calculator 34 of FIG. 3. Each row of the table in FIG. 38 corresponds to each image captured by the image capturing apparatus 11, and indicates the identifier of one marker 4 included in each image, and the position and attitude of the image capturing apparatus 11 in a marker coordinate system with an origin at this marker 4. When the opposite sides of a square marker 4 have the same length to each other, and it is difficult to determine the position of the image capturing apparatus 11 in the marker coordinate system, the sign of the coordinate of the image capturing apparatus 11 in the marker coordinate system is likely to vary. Therefore, when the sign of the coordinate of the image capturing apparatus 11 in the marker coordinate systems changes frequently, it is possible to determine that the images including the marker 4 are not suitable to calculate the absolute position and the absolute attitude of the vehicle 1. On the other hand, when the coordinates of the image capturing apparatus 11 in the marker coordinate systems consecutively have the same sign over the predetermined number of images, it is possible to determine that the images including the marker 4 are suitable to calculate the absolute position and the absolute attitude of the vehicle 1.

In an example in FIG. 38, since the sign of the Xm coordinate alternates over the 2nd to 4th rows, corresponding images are not suitable to calculate the absolute position and the absolute attitude of the vehicle 1. On the other hand, since the Xm, Ym, and Zm coordinates have the same signs over the 4th to 6th row, corresponding images are suitable to calculate the absolute position and the absolute attitude of the vehicle 1.

A threshold (predetermined number) of step S43 in FIG. 17 is set to, for example, "3", but may be set to any other value.

[Step S44]

Of step S44 in FIG. 17, the absolute position calculator 34 calculates an apparent size of the marker 4 in the image captured by the image capturing apparatus 11. Further, in step S44, the absolute position calculator 34 determines whether or not the apparent size of the marker 4 in the image is larger than a predetermined threshold; if YES, the process proceeds to step S45, and if NO, the process proceeds to step S48.

Figure 39:
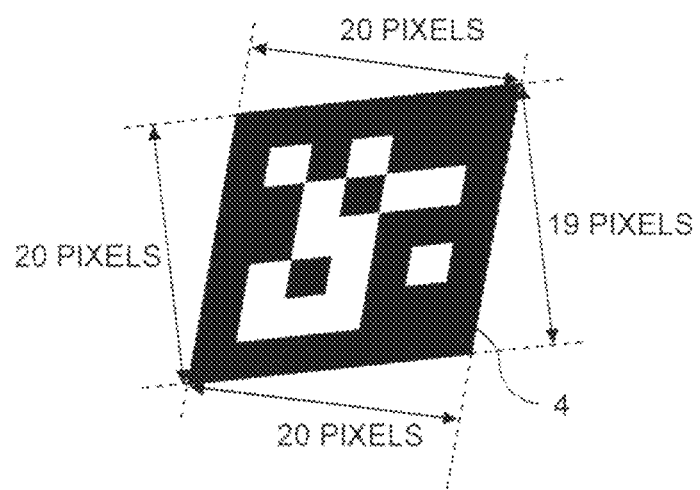
FIG. 39 is a diagram showing an example of an image of the marker 4 captured by the image capturing apparatus 11 of FIG. 1, the image having a width suitable to calculate the absolute position and the absolute attitude of the vehicle 1.
Figure 40:
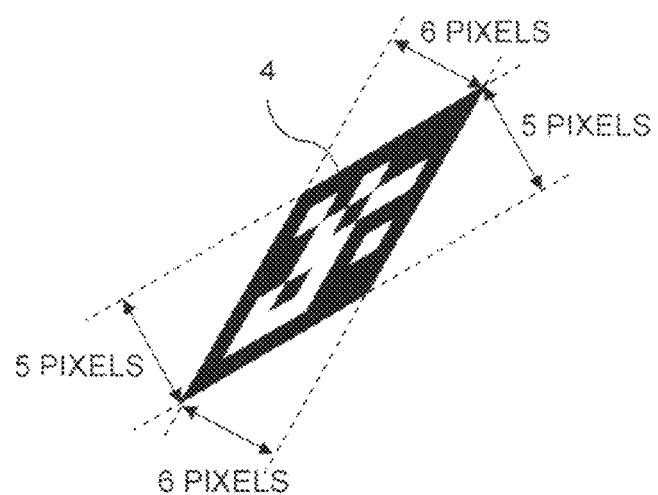
FIG. 40 is a diagram showing an example of an image of the marker 4 captured by the image capturing apparatus 11 of FIG. 1, the image not having a width suitable to calculate the absolute position and the absolute attitude of the vehicle 1.

FIG. 39 is a diagram showing an example of an image of the marker 4 captured by the image capturing apparatus 11 of FIG. 1, the image having a width suitable to calculate the absolute position and the absolute attitude of the vehicle 1. FIG. 40 is a diagram showing an example of an image of the marker 4 captured by the image capturing apparatus 11 of FIG. 1, the image not having a width suitable to calculate the absolute position and the absolute attitude of the vehicle 1. FIG. 39 and FIG. 40 show apparent sizes (numbers of pixels) of the markers 4 in the images captured by the image capturing apparatus 11. In the examples in FIG. 39 and FIG. 40, the apparent size of the marker 4 in the image is represented by the number of pixels from each vertex to its opposite side. In order to correctly recognize the pattern of the marker 4, the marker 4 needs to have a sufficiently large apparent size (number of pixels) in the image captured by the image capturing apparatus 11. For example, the marker 4 shown in FIG. 5 has a pattern consisting of 7×7 white or black square cells in the vertical and horizontal directions. In this case, the number of pixels of the marker 4 as shown in FIG. 39 is sufficient for recognizing the cells of the pattern. On the other hand, the number of pixels of the marker 4 as shown in FIG. 40 is apparently insufficient for recognizing the cells of the pattern.

Figure 41:
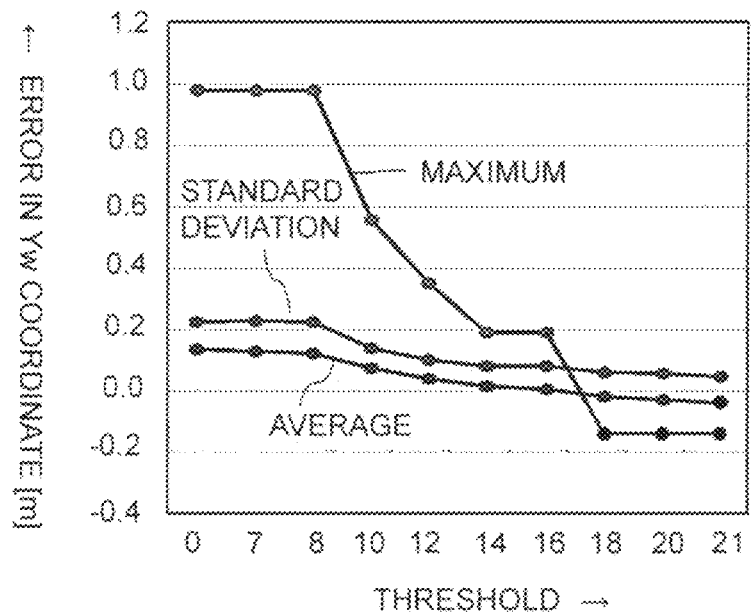
FIG. 41 is a graph showing an error in the absolute position of the vehicle 1 with a threshold of step S44 in FIG. 17 being changed.

FIG. 41 is a graph showing an error in the absolute position of the vehicle 1 with the threshold in the step S44 of FIG. 17 being changed. Referring to FIG. 41, it can be seen that the error is reduced when the threshold is set to 14 or larger. Therefore, when the apparent size of the marker 4 in the image captured by the image capturing apparatus 11 is smaller than the predetermined threshold, it is possible to determine that the image including the marker 4 is not suitable to calculate the absolute position and the absolute attitude of the vehicle 1. On the other hand, when the apparent size of the marker 4 in the image is larger than the predetermined threshold, it is possible to determine that the image including the marker 4 is suitable to calculate the absolute position and the absolute attitude of the vehicle 1.

The threshold of step S44 of FIG. 17 may be set to a value different from the threshold of step S51 of FIG. 23. In the example described herein, the threshold of step S51 of FIG. 23 is set to a relatively large value (30 pixels) so as to detect and extract the marker 4 having an apparent size suitable to calculate the absolute position and the absolute attitude of the vehicle 1 (that is, YES in step S51). On the other hand, the threshold of step S44 of FIG. 17 is set to a relatively small value (14 pixels) so as to detect and remove the marker 4 having an apparent size not suitable to calculate the absolute position and the absolute attitude of the vehicle 1 (that is, NO in step S44).

The apparent size of the marker 4 in the image may be represented by a length of each side, a total length of sides, a length of a diagonal line, or an area of the marker 4, instead of the distance (number of pixels) from each vertex to the opposite side.

[Step S45]

In step S45 in FIG. 17, the absolute position calculator 34 calculates an angle of a direction of the vehicle 1 with respect to a normal line to a surface of one marker 4, based on the position and attitude of the vehicle 1 in the marker coordinate system with an origin at the one marker 4. Further, in step S45, the absolute position calculator 34 determines whether or not the angle of a direction of the image capturing apparatus 11 (i.e., vehicle 1) with respect to the normal line to the surface of the one marker 4 in the marker coordinate system is larger than a predetermined threshold $\alpha$th; if YES, the process proceeds to step S46, and if NO, the process proceeds to step S48. When directions of the image capturing apparatus 11 and the vehicle 1 are different from each other, the absolute position calculator 34 determines whether or not an angle between the image capturing apparatus 11 and the normal line to the surface of the marker 4 is larger than the threshold αth; if YES, the process proceeds to step S46, and if NO, the process proceeds to step S48.

Figure 42:
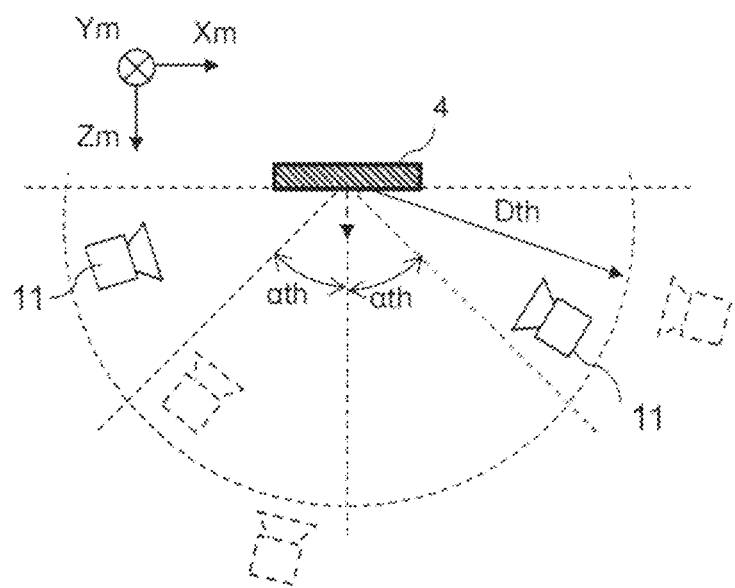
FIG. 42 is a diagram showing angles and distances in the marker coordinate system, at which an image of the marker 4 suitable to calculate the absolute position and the absolute attitude of the vehicle 1 can be captured.

FIG. 42 is a diagram explaining an angle and a distance in the marker coordinate system, at which an image of the marker 4 suitable to calculate the absolute position and the absolute attitude of the vehicle 1 can be captured. As described above in connection with step S43, in the image, for example, when the opposite sides of the rectangular marker 4 have different lengths from each other, it is possible to definitely determine the position of the image capturing apparatus 11 in the marker coordinate system. Therefore, the image capturing apparatus 11 captures the marker 4 not from the normal direction (front) of the marker 4, but from a direction sufficiently inclined from the normal direction of the marker 4.

Figure 43:
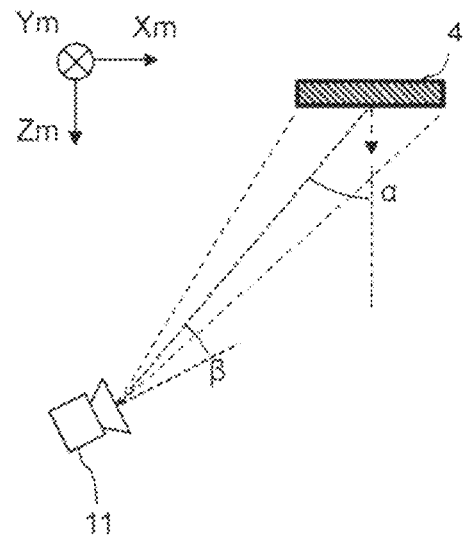
FIG. 43 is a diagram illustrating angular conditions to capture an image of the marker 4 suitable to calculate the absolute position and the absolute attitude of the vehicle 1.
Figure 44:
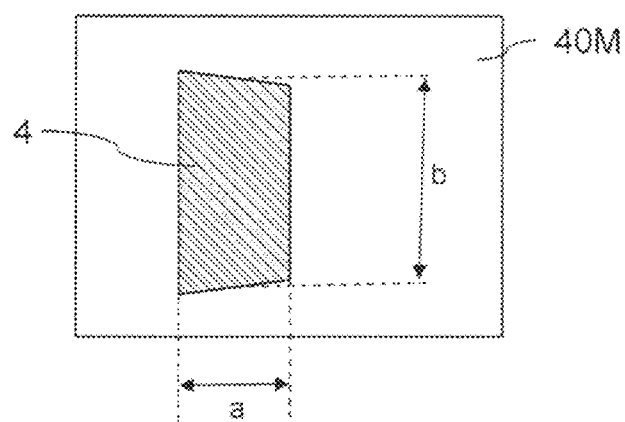
FIG. 44 is a diagram showing an example of an image 40M including the marker 4 captured by the image capturing apparatus 11 of FIG. 43.

FIG. 43 is a diagram for illustrating angular conditions to capture an image of the marker 4 suitable to calculate the absolute position and the absolute attitude of the vehicle 1. FIG. 44 is a diagram showing an example of an image 40M including the marker 4 captured by the image capturing apparatus 11 of FIG. 43. In FIG. 43, α denotes an angle of the direction of the image capturing apparatus 11 with respect to the normal line to the surface of the marker 4. The angle α satisfies α=arccos(a/b). In this case, a and b denote the apparent size of the marker 4 in the image 40M captured by the image capturing apparatus 11, as shown in FIG. 44. As the size becomes close to a:b=1:1, an accuracy degrades. The positive or negative of the angle α can be determined from an orientation of a trapezoid in FIG. 44. However, when the image capturing apparatus 11 captures the marker 4 from the front, or when a distance d from the image capturing apparatus 11 to the marker 4 increases, the determination on positive or negative of the angle α becomes unstable. β denotes an angle of a direction of the marker 4 with respect to an optical axis of the image capturing apparatus 11. In other words, the angle β indicates the position of the marker 4 in the image 40M captured by the image capturing apparatus 11. The distance d from the image capturing apparatus 11 to the marker 4 satisfies d=1/b. As a result, the accuracy is in the order of β>d>α.

The threshold αth of step S45 of FIG. 17 is act to, for example, "45 degrees", but may be set to any other value. In addition, the threshold αth may vary depending on the distance from the image capturing apparatus 11 to the marker 4.

When the angle of the direction of the image capturing apparatus 11 with respect to the normal line to the surface of the marker 4 becomes closer to 90 degrees, the apparent size a of the marker 4 in the image captured by the image capturing apparatus 11 decreases, and it becomes difficult to satisfy the conditions of step S44. The angle of the direction of the image capturing apparatus 11 with respect to the normal line to the surface of the marker 4 needs to satisfy both the conditions of steps S44 and S45.

[Step S46]

In step S46 in FIG. 17, the absolute position calculator 34 calculates a distance from the vehicle 1 to the marker 4 based on the image captured by the image capturing apparatus 11. Further, in step S46, the absolute position calculator 34 determines whether or not the distance from the image capturing apparatus 11 (i.e., vehicle 1) to the marker 4 is smaller than a predetermined threshold; if YES, the process proceeds to step S47, and if NO, the process proceeds to step 348.

Referring again to FIG. 42, the image capturing apparatus 11 captures the marker 4 at a position in a distance shorter than a distance Dth from the marker 4. When the image capturing apparatus 11 is remote from the marker 4, the accuracy of the position and attitude of the vehicle 1 calculated by the positioning apparatus 12 degrades.

The threshold Dth of step S46 of FIG. 17 is set to, for example, "6 m" when the marker 4 has, for example, an A2 size (420×594 mm), but the threshold Dth may be set to any other value. In addition, the threshold Dth may vary depending on the size of the marker 4.

[Steps S47 and S48]

In step S47 in FIG. 17, the absolute position calculator 34 determines that the marker 4 is reliable. In this case, the absolute position calculator 34 sends the absolute position and the absolute attitude calculated based on the position and attitude of the marker 4, to the corrector 36. On the other hand, in step S48, the absolute position calculator 34 determines that the marker 4 is unreliable. In this case, the absolute position calculator 34 does not send the absolute position and the absolute attitude calculated based on the position and attitude of the marker 4.

Thus, by executing the marker evaluation process in FIG. 17, the absolute position calculator 34 determines whether or not the marker 4 is captured at an appropriate angle and from an appropriate distance, i.e., whether or not the recognized marker 4 is reliable. As a result, in the correction process of step S4 in FIG. 8, the corrector 36 operates as follows.

In a case where the surface of the marker 4 appears perpendicular to the optical axis of the image capturing apparatus 11 in the image captured by the image capturing apparatus 11 (YES in step S41), the corrector 36 does not use the absolute position and the absolute attitude calculated based on the position and the attitude of the marker 4, in order to correct the position and the attitude of the vehicle 1. In a case where the surface of the marker 4 does not appear perpendicular to the optical axis of the image capturing apparatus 11 in the image captured by the image capturing apparatus 11 (NO in step S41), the corrector 36 can use the absolute position and the absolute attitude calculated based on the position and the attitude of the marker 4, in order to correct the position and the attitude of the vehicle 1.

In a case where the marker 4 does not have the same identifier over the number of images equal to the predetermined threshold (NO in step S42), the corrector 36 does not use the absolute position and the absolute attitude calculated based on the position and the attitude of the marker 4, in order to correct the position and the attitude of the vehicle 1. On the other hand, in a case where the marker 4 has the same identifier over the number of images equal to or larger than the threshold (YES in step S42), the corrector 36 can use the absolute position and the absolute attitude calculated based on the position and the attitude of the marker 4, in order to correct the position and the attitude of the vehicle 1.

In a case where the coordinates of the vehicle 1 in the marker coordinate systems do not have the same sign over the number of images equal to the predetermined threshold (NO in step S43), the corrector 36 does not use the absolute position and the absolute attitude calculated based on the position and the attitude of the marker 4, in order to correct the position and the attitude of the vehicle 1. On the other hand, in a case where the coordinates of the vehicle 1 in the marker coordinate systems have the same sign over the number of images equal to or larger than the threshold (YES in step S43), the corrector 36 can use the absolute position and the absolute attitude calculated based on the position and the attitude of the marker 4, in order to correct the position and the attitude of the vehicle 1.

In a case where the apparent size of the marker 4 in the image is equal to or smaller than the predetermined threshold (NO in step S44), the corrector 36 does not use the absolute position and the absolute attitude calculated based on the position and the attitude of the marker 4, in order to correct the position and the attitude of the vehicle 1. On the other hand, in a case where the apparent size of the marker 4 in the image is larger than the threshold (YES in step S44), the corrector 36 can use the absolute position and the absolute attitude calculated based on the position and the attitude of the marker 4, in order to correct the position and the attitude of the vehicle 1.

In a case where the angle to the direction of the vehicle 1 with respect to the normal line of the surface of one marker 4 is equal to or smaller than the predetermined threshold (NO in step S45), the corrector 36 does not use the absolute position and the absolute attitude calculated based on the position and the attitude of the marker 4, in order to correct the position and the attitude of the vehicle 1. On the other hand, in a case where the angle to the direction of the vehicle 1 with respect to the normal line of the surface of one marker 4 is larger than the threshold (YES in step S45), the corrector 36 can use the absolute position and the absolute attitude calculated based on the position and the attitude of the marker 4, in order to correct the position and the attitude of the vehicle 1.

In a case where the distance from the vehicle 1 to the marker 4 is equal to or larger than the predetermined threshold (NO in step S46), the corrector 36 does not use the absolute position and the absolute attitude calculated based on the position and the attitude of the marker 4, in order to correct the position and the attitude of the vehicle 1. On the other hand, in a case where the distance from the vehicle 1 to the marker 4 is smaller than the threshold (YES in step S46), the corrector 36 can use the absolute position and the absolute attitude calculated based on the position and the attitude of the marker 4, in order to correct the position and the attitude of the vehicle 1.

In the example of FIG. 17, when all the conditions of steps S41 to S46 are satisfied, the corrector 36 uses the absolute position and the absolute attitude calculated based on the position and the attitude of the marker 4, in order to correct the position and the attitude of the vehicle 1.

In the present specification, the threshold of step S52 of FIG. 23 is also referred to as a "first threshold", the threshold of step S53 is also referred to as a "second threshold", and the threshold of step S51 is also referred to as a "third threshold". In addition, in the present specification, the threshold of step S45 is also referred to as a "fourth threshold", the threshold of step S42 is also referred to as a "fifth threshold", the threshold of step S43 is also referred to as a "sixth threshold", and the threshold of step S46 is also referred to as a "seventh threshold".

Figure 45:
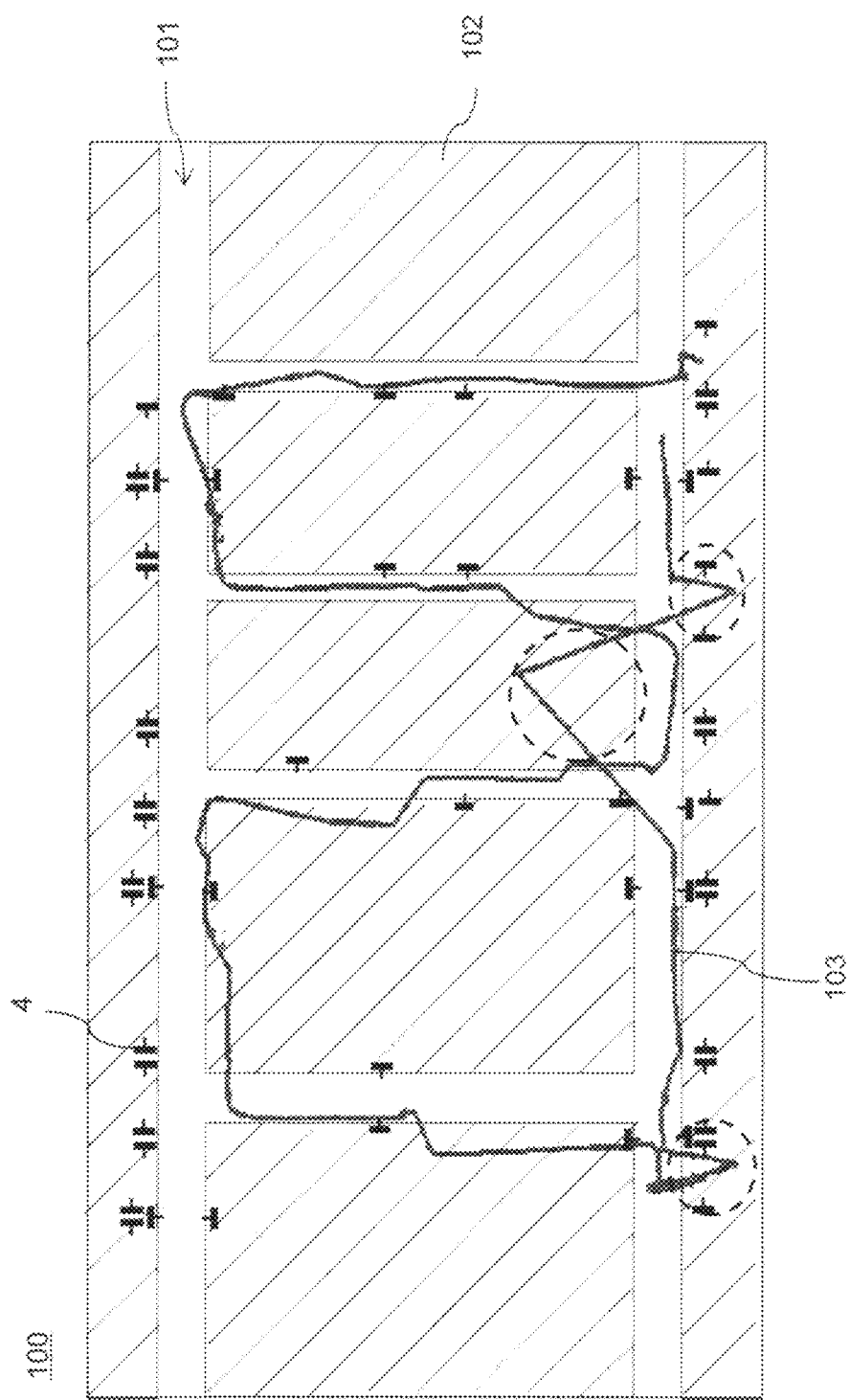
FIG. 45 is a diagram showing a trajectory 103 of the vehicle 1 calculated by executing a correction process according to a comparison example of the first embodiment.
Figure 46:
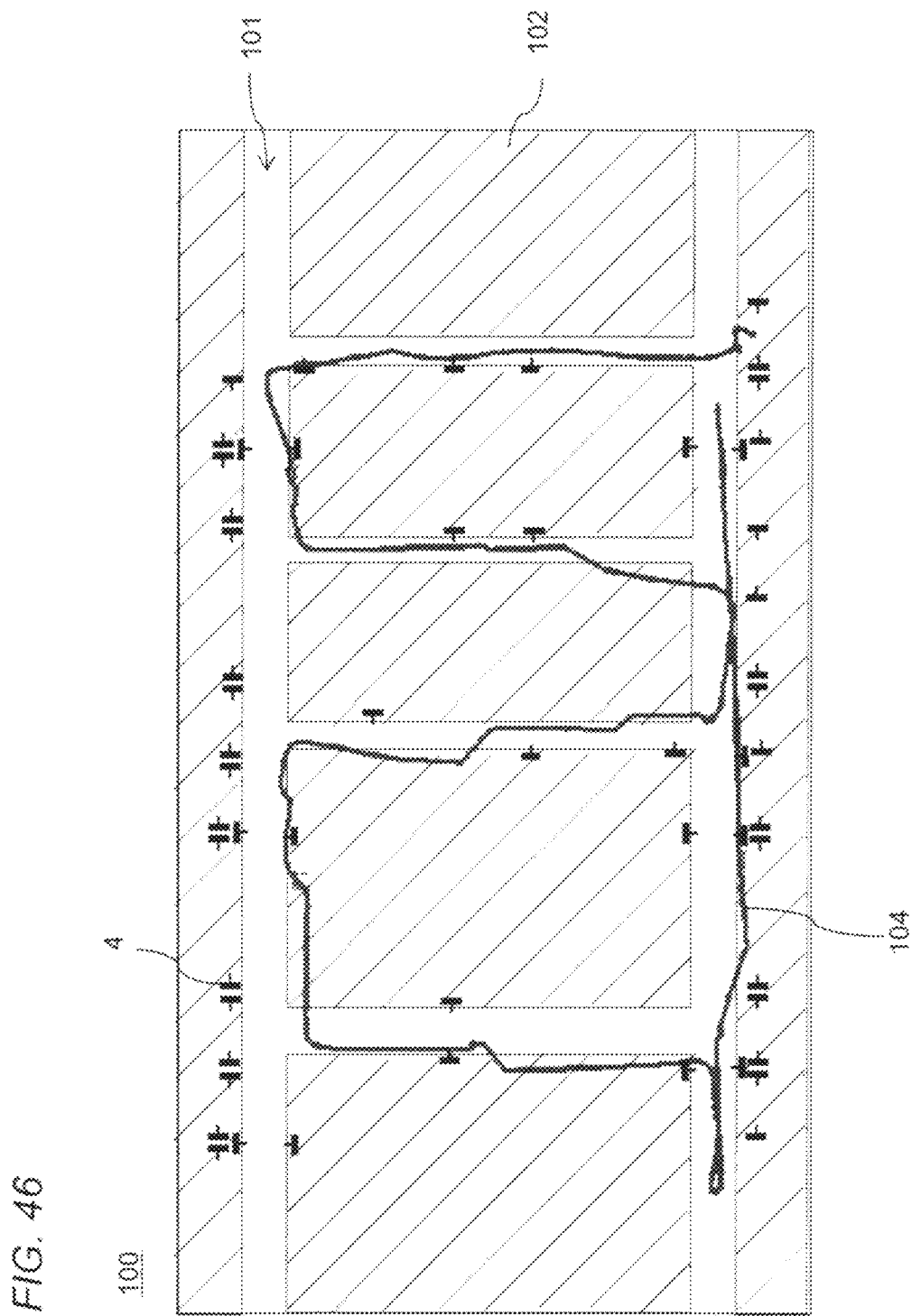
FIG. 46 is a diagram showing a trajectory 104 of the vehicle 1 calculated by executing the marker evaluation process of FIG. 17.

FIG. 45 is a diagram showing a trajectory 103 of the vehicle 1 calculated by executing a correction process according to a comparison example of the first embodiment. FIG. 46 is a diagram showing a trajectory 104 of the vehicle 1 calculated by executing the marker evaluation process of FIG. 17. Each of FIGS. 45 and 46 shows a protrusion provided on one side of each of the markers 4 to indicate a front surface of the marker 4 (Zm axis in FIG. 5) for convenience of explanation. Actually, such protrusion is not provided. Referring to FIG. 45, since the markers 4 having surfaces at different angles with respect to the optical axis of the image capturing apparatus 11 are not correctly recognized, an error in the calculated position of the vehicle 1 occurs at a position surrounded by a broken line. On the other hand, referring to FIG. 46, since the positioning apparatus 12 does not use the marker 4 that appears to have a surface perpendicular to the optical axis of the image capturing apparatus 11 for calculating the absolute position and the absolute attitude of the vehicle 1, it is possible to accurately measure the position and the attitude of the vehicle 1.

[Display of Position and Attitude of Vehicle]

Figure 47:
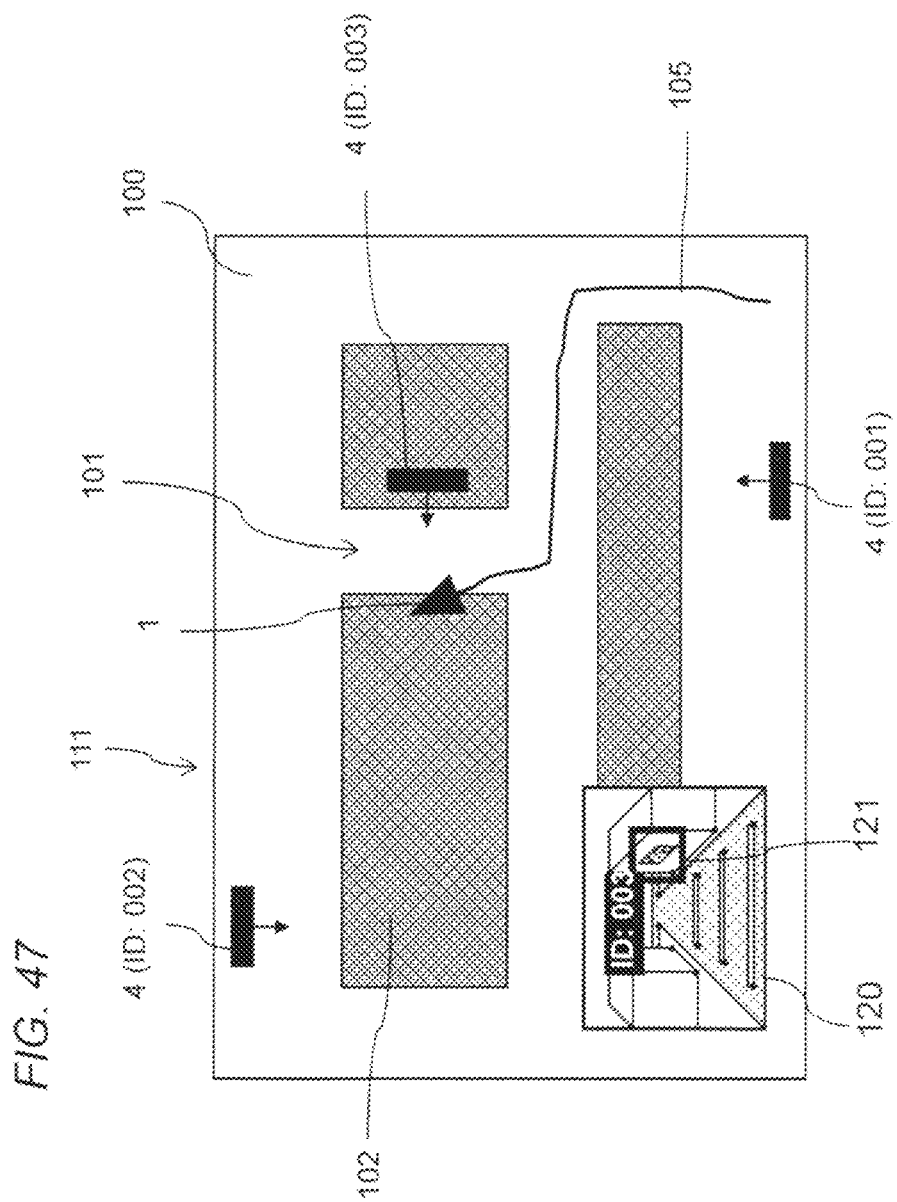
FIG. 47 is a diagram showing a first example of an image displayed on a display apparatus 14 or 25 of FIG. 2.
Figure 48:
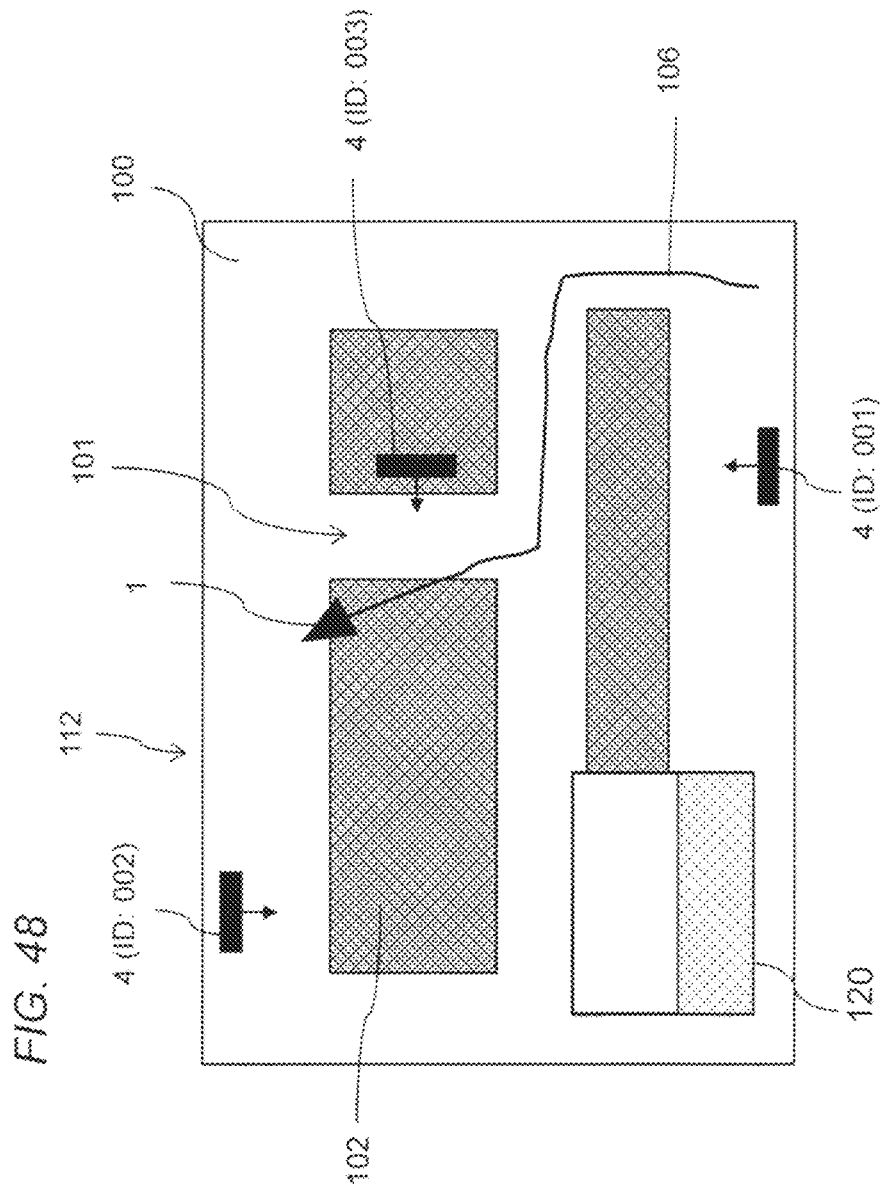
FIG. 48 is a diagram showing a second example of the image displayed on the display apparatus 14 or 25 of FIG. 2.
Figure 49:
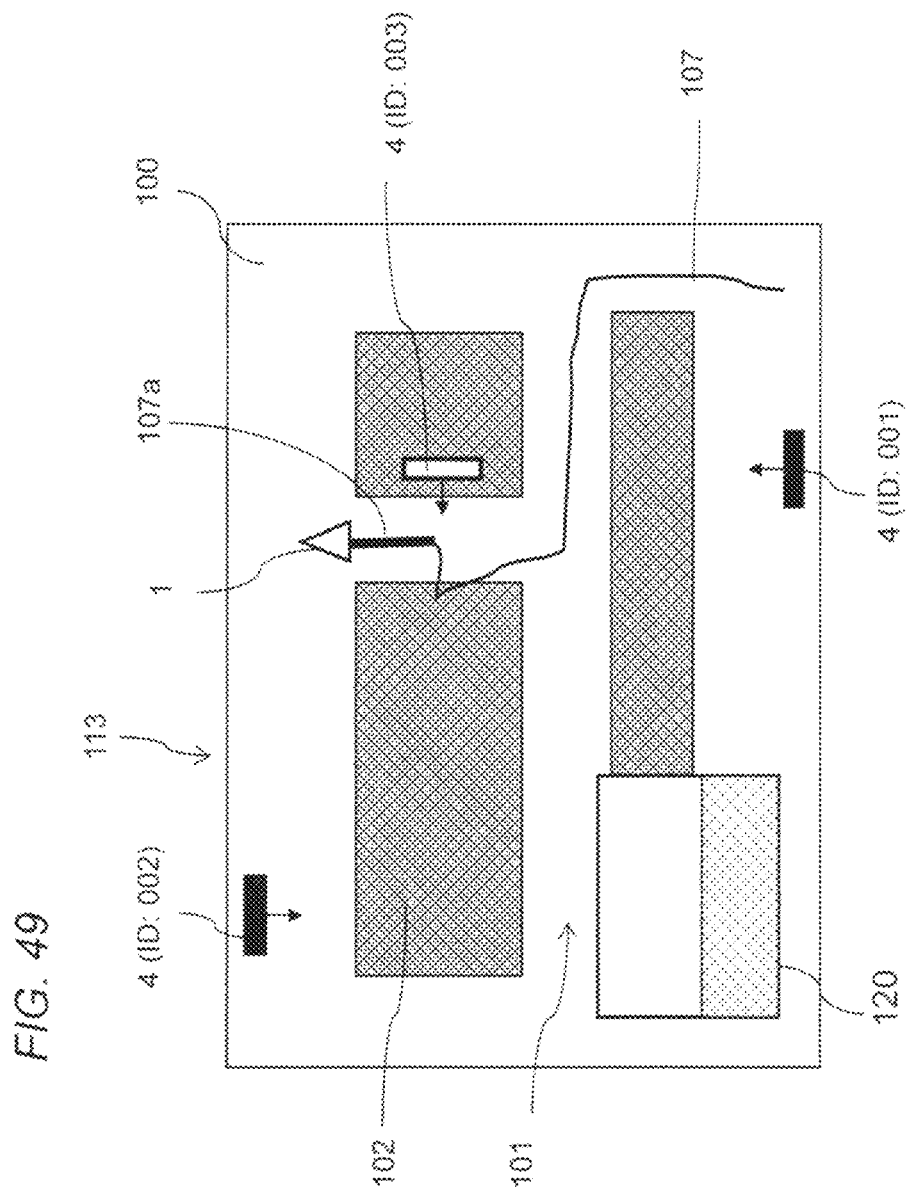
FIG. 49 is a diagram showing a third example of the image displayed on the display apparatus 14 or 25 of FIG. 2.

FIG. 47 is a diagram showing a first example of an image displayed on the display apparatus 14 or 25 of FIG. 2. FIG. 48 is a diagram showing a second example of an image displayed on the display apparatus 14 or 25 of FIG. 2. FIG. 49 is a diagram showing a third example of an image displayed on the display apparatus 14 or 25 of FIG. 2. As described above, the display apparatuses 14 and 25 display the image indicating the position and the attitude of the vehicle 1. The image indicating the position and the attitude of the vehicle 1 may be an image in which the position and the attitude of the vehicle 1 are overlaid on a map, or an image captured by the image capturing apparatus 11. Referring to the examples of FIGS. 47 to 49, in each of images 111 to 113 displayed on the display apparatus 14 or 25, a window 120 including the image captured by the image capturing apparatus 11 is overlaid on the map.

FIGS. 47 and 48 show the current relative position and relative attitude of the vehicle 1 calculated by the relative position calculator 32, as a position and an orientation of a triangle. Further, FIGS. 47 and 48 show trajectories 105 and 106 of the vehicle 1 based on the relative position and the relative attitude, respectively. Here, the trajectory 106 is a continuation of the trajectory 105. In the examples of FIGS. 47 and 48, although the vehicle 1 actually travels straight upward along the passageway 101 in front of the marker 4 having an identifier "003", the vehicle 1 is displayed as if the vehicle 1 enters the shelf 102 due to a calculation error.

FIG. 49 shows the current position and attitude of the vehicle 1 corrected based on the absolute position and the absolute attitude calculated based on the marker 4 having the identifier "003", as a position and an orientation of a triangle. Further, FIG. 49 shows a trajectory 107 of the vehicle 1 including a section 107a based on the corrected position and attitude. The trajectory 107 is also a continuation of the trajectory 105.

The marker 4 having the identifier "003" is captured as shown in the window 120 of FIG. 47. The absolute position calculator 34 calculates the absolute position and the absolute attitude of the vehicle 1 based on the marker 4 having the identifier "003". The corrector 36 corrects the relative position and the relative attitude based on the absolute position and the absolute attitude. In this case, the display apparatuses 14 and 25 may overlay the marker 4, and the corrected position and the corrected attitude, on the map, so as to associate the corrected position and the corrected attitude with the marker 4 used for calculating the absolute position and the absolute attitude. In the example of FIG. 49, the colors of the vehicle 1 and the marker 4 are changed from black to white, in order to associate the corrected position and the corrected attitude with the marker 4 used for calculating the absolute position and the absolute attitude. Here, instead of changing the colors of the vehicle 1 and the marker 4, the patterns of the vehicle 1 and the marker 4 may be changed, the sizes of the vehicle 1 and the marker 4 may be increased, and each of the vehicle 1 and the marker 4 may be surrounded by a frame.

Further, in the example of FIG. 49, the thickness of a section 107a of the trajectory 107 of the vehicle 1 is changed to indicate that the position and the attitude of the vehicle 1 are corrected, the section 107a being based on the corrected position and attitude. In order to indicate that the position and the attitude of the vehicle 1 have been corrected, instead of changing the thickness of the section 107a, the color of the section 107a may be changed from black to gray, for example, and the section 107a may be changed from a solid line to a dotted line. Thus, the user can checks which section of the trajectory of the vehicle 1 has been corrected based on the marker 4.

As shown in FIG. 49, it is possible to accurately display the current position and attitude of the vehicle 1 by correcting the relative position and the relative attitude based on the absolute position and the absolute attitude.

In addition, as shown in the window 120 of FIG. 47, the recognized marker 4, or the marker 4 used for calculating the absolute position and the absolute attitude may be highlighted, for example, by surrounding the marker 4 by a frame 121. Further, the identifier (ID: 003) of the marker 4 may be displayed near the recognized marker 4, or the marker 4 used for calculating the absolute position and the absolute attitude.

In addition, the display apparatuses 14 and 25 may selectively display one of a first image in which the relative position and the relative attitude of the vehicle 1 are overlaid on the map (see FIG. 48), and a second image in which the corrected position and the corrected attitude are overlaid on the map (see FIG. 49), without overlaying the window 120 including the image captured by the image capturing apparatus 11, on the map.

In addition, the display apparatuses 14 and 25 may selectively display one of an image in which the position and the attitude of the vehicle 1 are overlaid on the map, and an image captured by the image capturing apparatus 11.

In addition, the display apparatuses 14 and 25 may display an image indicating one of the position and the attitude of the vehicle 1, instead of both the position and the attitude of the vehicle 1.

Summary of First Embodiment

According to the first embodiment, the relative position and the relative attitude calculated from the feature points 41 using Visual-SLAM or the like are corrected based on the absolute position and absolute attitude calculated from the markers 4, and therefore, it is possible to accurately measure the position and the attitude of the vehicle 1. In addition, according to the first embodiment, it is possible to more accurately measure the position and attitude of the vehicle 1, by determining whether or not a recognized marker 4 is reliable, and correcting the position and attitude of the vehicle 1 based on the absolute position and the absolute attitude only when the marker 4 is reliable.

According to the first embodiment, it is possible to measure the position of the vehicle 1 at a low cost using the image capturing apparatus 11, even in an indoor place where radio waves from GPS satellites can not be received, such as a warehouse or a factory. Since it is not necessary to dispose a large number of wireless transmitters for transmitting wireless signals, initial costs can be reduced.

According to the first embodiment, it is possible to improve work based on the travelling path of the vehicle 1 obtained from positioning results.

According to the first embodiment, it can be utilized for determining the necessity of maintenance, the necessity of renewal of lease contracts, and the like, based on the travelled distance of the vehicle 1.

According to the first embodiment, it is possible to optimize a layout of passageways, shelves, and the like in a warehouse or a factory, based on a heat map of movement of the vehicle 1.

According to the first embodiment, it is possible to visualize a place where the vehicles 1 passes by each other during movement, based on differences among trajectories of the vehicles 1, and therefore, review paths and width of passageways to improve safety.

Modified Embodiment of First Embodiment

Referring to FIGS. 18 to 24, we have described a case where it is difficult to distinguish between the marker 4 having a surface perpendicular to the optical axis of the image capturing apparatus 11, and the marker 4 having a surface parallel to the optical axis of the image capturing apparatus 11, However, it may be difficult to distinguish a marker having a surface having another angle (45 degrees or the like) with respect to the optical axis of the image capturing apparatus 11. In this case as well, the absolute position calculator 34 treats the markers 4 that appear to have a surface perpendicular to the optical axis of the image capturing apparatus 11, so as not to be used for calculating the absolute position and the absolute attitude of the vehicle 1.

Steps S41 to S46 of FIG. 17 may be executed in any other order. The result does not differ due to the order of steps, but the process speed varies. For example, by executing step S43 before step S45, it is possible to efficiently avoid the case where the image capturing apparatus 11 is located in front of the marker 4. In addition, only a part of the steps S42 to S46 may be executed.

Steps S24 to S25 of FIG. 11 may be executed by the corrector 36, instead of by the absolute position calculator 34. In this case, the absolute position calculator 34 always sends the absolute position and the absolute attitude calculated based on the position and attitude of the marker 4, to the corrector 36. The corrector 36 corrects the position and attitude of the vehicle 1 based on the absolute position and the absolute attitude, only when the marker 4 is reliable.

In the example described above, the corrector 36 manages the absolute position and the absolute attitude separately from the relative position and the relative attitude, without replacing the relative position and the relative attitude with the absolute position and the absolute attitude. Alternatively, the corrector 36 may replace the relative position and the relative attitude with the absolute position and the absolute attitude, and then, calculate the relative position and the relative attitude using the absolute position and the absolute attitude as a new reference position and a new reference attitude.

The image capturing apparatus 11 may be configured to generate an image of an object, and also detect distances from the image capturing apparatus 11 to points of the object. The image capturing apparatus 11 may include a depth sensor, such as an RGB-D camera, or a Time of Flight (ToF) sensor, in order to detect a distance to the object. Alternatively, the image capturing apparatus 11 may be a stereo camera including two cameras disposed apart from each other by a certain distance, in order to detect a distance to the object.

When the image capturing apparatus 13 detects the distance, the relative position calculator 32 may calculate the relative position and the relative attitude of the vehicle 1 using a well-known iterative closest point (ICP) algorithm or the like.

While the relative position calculation process of FIG. 9 using FAST and KLT trackers is described by way of example, other methods may be used. For example, feature point detection, feature point matching, or the like, using Scale Invariant Feature Transform (SIFT) or Oriented FAST and Rotated BRIEF (ORB), which are typically used for image processing, may be used.

When the marker 4 is disposed at the middle of the straight section of the passageway 101, it is expected that the absolute position and the absolute attitude can be calculated accurately. On the other hand, when the marker 4 is disposed near an intersection of the passageways 101, or near an entrance and exit of the passageways 101, the vehicle 1 does not always go straightforward near the marker 4, and therefore, errors may increase in the absolute position and the absolute attitude calculated. Therefore, some of the plurality of markers 4 may be provided as an auxiliary marker not used for calculating the absolute position and the absolute attitude (i.e., for correcting the position and the attitude). The auxiliary marker is disposed near, for example, origination or destination of the vehicle 1, or certain structures which may be other checkpoints (an entrance and exit of the warehouse 100, an intersection of the passageways 101, a specific one of the shelves 102, and the like). The auxiliary marker need not be disposed along the passageway 101, as long as the auxiliary marker can be captured from the vehicle 1. The positioning apparatus 12 can recognize that the vehicle 1 has arrived at a specific checkpoint, by detecting the auxiliary marker. In this case, a marker information table stored in the storage apparatus 35 further includes an item indicating whether or not each of the markers 4 is an auxiliary marker. In addition, in this case, the marker information table may not include information on the position and the attitude of the auxiliary marker. In addition, the marker information table may include an item indicating reliability of the absolute position and the absolute attitude calculated based on each of the markers 4, instead of the item indicating whether or not the marker 4 is an auxiliary marker.

The vehicle 1 and the server apparatus 2 may use a removable storage medium, such as an SD card, instead of the communication apparatuses 13 and 22. The position and the attitude of the vehicle calculated at the vehicle may be written into the storage medium, and the server apparatus 2 may read out the position and the attitude of the vehicle from the storage medium.

The vehicle 1 may be a manned vehicle, such as a truck or tractor, instead of a forklift. The vehicle 1 may be an unmanned cargo carrying apparatus, such as an automated guided vehicle (AGV) and a pallet transport robot. In this case, the vehicle 1 travels by controlling the drive mechanism 15 under control of the server apparatus 2. In addition, the vehicle 1 may be a human-powered vehicle without a drive mechanism, such as a dolly.

The positioning apparatus 12 may be provided in the server apparatus 2, instead in the vehicle 1. In this case, the image captured by the image capturing apparatus 11 is transmitted from the vehicle 1 to the server apparatus 2 by the communication apparatus 13 (or through a removable storage medium). The positioning apparatus 12 of the server apparatus 2 calculates the position and the attitude of the vehicle 1 based on the images obtained from the vehicle 1, in a manner similar to that of the positioning apparatus 12 of FIG. 2.

Advantageous Effects, Etc. of First Embodiment

According to the first embodiment, the positioning apparatus 12 is provided with: a relative position calculator 32, a storage apparatus 35, an absolute position calculator 34, and a corrector 36. The relative position calculator 32 is configured to calculate a first position and a first attitude of a vehicle 1 indicating a relative position and a relative attitude of the vehicle 1 with respect to a reference position and a reference attitude, based on a plurality of images captured by an image capturing apparatus 11 mounted on the vehicle 1. The storage apparatus 35 is configured to store information on identifiers, positions, and attitudes of a plurality of markers 4 disposed at predetermined positions and visually distinguishable from each other, and information on a map containing a passageway for the vehicle 1. The absolute position calculator 34 is configured to extract one of the plurality of markers 4 from an image captured by the image capturing apparatus 11, and calculate a second position and a second attitude of the vehicle 1 indicating a position and an attitude of the vehicle 1 in the map, based on a position and an attitude of the one extracted marker 4. The corrector 36 is configured to correct the first position and the first attitude based on the second position and the second attitude to calculate a corrected position and a corrected attitude of the vehicle 1. The corrector 36 is configured to calculate the corrected position and the corrected attitude, not using the second position and the second attitude calculated based on the position and the attitude of the marker 4 when a difference or a ratio of an apparent height and an apparent width of the marker 4 in the image is equal to or smaller than a first threshold, but using the second position and the second attitude calculated based on the position and the attitude of the marker 4 when the difference or the ratio of the apparent height and the apparent width of the marker 4 in the image is larger than the first threshold.

According to the first embodiment, the corrector 36 may be configured to calculate the corrected position and the corrected attitude, not using the second position and the second attitude calculated based on the position and the attitude of the marker 4 when an apparent difference between angles of adjacent corners of the marker 4 in the image is equal to or smaller than a second threshold, but using the second position and the second attitude calculated based on the position and the attitude of the marker 4 when the apparent difference between the angles of the adjacent corners of the marker 4 in the image is larger than the second threshold.

According to the first embodiment, the positioning apparatus 12 is provided with: a relative position calculator 32, a storage apparatus 35, an absolute position calculator 34, and a corrector 36. The relative position calculator 32 is configured to calculate a first position and a first attitude of a vehicle 1 indicating a relative position and a relative attitude of the vehicle 1 with respect to a reference position and a reference attitude, based on a plurality of images captured by an image capturing apparatus 11 mounted on the vehicle 1. The storage apparatus 35 is configured to store information on identifiers, positions, and attitudes of a plurality of markers 4 disposed at predetermined positions and visually distinguishable from each other, and information on a map containing a passageway for the vehicle 1. The absolute position calculator 34 is configured to extract one of the plurality of markers 4 from an image captured by the image capturing apparatus 11, and calculate a second position and a second attitude of the vehicle 1 indicating a position and an attitude of the vehicle 1 in the map, based on a position and an attitude of the one extracted marker 4. The corrector 36 is configured to correct the first position and the first attitude based on the second position and the second attitude to calculate a corrected position and a corrected attitude of the vehicle 1. The corrector 36 is configured to calculate the corrected position and the corrected attitude, not using the second position and the second attitude calculated based on the position and the attitude of the marker 4 when an apparent difference between angles of adjacent corners of the marker 4 in the image is equal to or smaller than a second threshold, but using the second position and the second attitude calculated based on the position and the attitude of the marker 4 when the apparent difference between the angles of the adjacent corners of the marker 4 in the image is larger than the second threshold.

According to the first embodiment, the absolute position calculator 34 may be configured to calculate an apparent size of the marker 4 in the image captured by the image capturing apparatus 11. The corrector 36 is configured to calculate the corrected position and the corrected attitude, not using the second position and the second attitude calculated based on the position and the attitude of the marker 4 when the apparent size of the marker 4 in the image is equal to or smaller than a third threshold, but using the second position and the second attitude calculated based on the position and the attitude of the marker 4 when the apparent size of the marker 4 in the image is larger than the third threshold.

With this configuration, the corrector 36 corrects the position and the attitude of the vehicle 1 based on the position and the attitude of the marker 4, without using the marker 4 that appears to have a surface perpendicular to the optical axis of the image capturing apparatus 11.

According to the first embodiment, the absolute position calculator 34 may be configured to calculate an angle of a direction of the vehicle 1 with respect to a normal line to a surface of the one marker 4, based on a position and an attitude of the vehicle 1 in a marker 4 coordinate system with an origin at the one marker 4. The corrector 36 is configured to calculate the corrected position and the corrected attitude, not using the second position and the second attitude calculated based on the position and the attitude of the marker 4 when the angle is equal to or smaller than a fourth but using the second position and the second attitude calculated based on the position and the attitude of the marker 4 when the angle is larger than the fourth threshold.

With this configuration, the corrector 36 corrects the position and attitude of the vehicle 1 based on the position and attitude of the marker 4, only when the angle of the direction of the vehicle 1 with respect to the normal line to the surface of the one marker 4 is larger than the fourth threshold.

According to the first embodiment, the absolute position calculator 34 may be configured to count a number of images consecutively captured by the image capturing apparatus 11 and from which the marker 4 having the same identifier is extracted. The corrector 36 is configured to calculate the corrected position and the corrected attitude, not using the second position and the second attitude calculated based on the position and the attitude of the marker 4 when the marker 4 does not have the same identifier over a number of images equal to a fifth threshold, but using the second position and the second attitude calculated based on the position and the attitude of the marker 4 when the marker 4 has the same identifier over the number of images equal to or larger than the fifth threshold.

With this configuration, the corrector 36 corrects the position and attitude of the vehicle 1 based on the position and attitude of the marker 4, only when the marker 4 having the same identifier appears over the number of images equal to or more than the fifth threshold.

According to the first embodiment, the absolute position calculator 34 may be configured to calculate the position and the attitude of the vehicle 1 in each of a plurality of marker 4 coordinate systems with origins at a plurality of markers 4 having a same identifier and extracted from a plurality of images consecutively captured by the image capturing apparatus 11. The corrector 36 is configured to calculate the corrected position and the corrected attitude, not using the second position and the second attitude calculated based on the position and the attitude of the marker 4 when coordinates of the vehicle 1 in the marker 4 coordinate systems do not have a same sign over a number of images equal to a sixth threshold, but using the second position and the second attitude calculated based on the position and the attitude of the marker 4 when coordinates of the vehicle 1 in the marker 4 coordinate systems have a same sign over a number of images equal to or more than the sixth threshold.

With this configuration, the corrector 36 corrects the position and attitude of the vehicle 1 based on the position and attitude of the marker 4, only when coordinates of the vehicle 1 in the marker coordinate systems have a same sign over a number of images equal to or more than the sixth threshold.

According to the first embodiment, the absolute position calculator 34 may be configured to calculate a distance from the vehicle 1 to the marker 4 based on the image captured by the image capturing apparatus 11. The corrector 36 is configured to calculate the corrected position and the corrected attitude, not using the second position and the second attitude calculated based on the position and the attitude of the marker 4 when the distance from the vehicle 1 to the marker 4 is equal to or larger than a seventh threshold, but using the second position and the second attitude calculated based on the position and the attitude of the marker 4 when the distance from the vehicle 1 to the marker 4 is smaller than the seventh threshold.

With this configuration, the corrector 36 corrects the position and attitude of the vehicle 1 based on the position and attitude of the marker 4, only when the distance from the vehicle 1 to the marker 4 is less than the seventh threshold.

According to the first embodiment, a vehicle 1 may be provided with: an image capturing apparatus 11; and the positioning apparatus 12.

According to the first embodiment, the positioning system is provided with: the at least one vehicle 1 as mentioned above; and a server apparatus 2, The server apparatus 2 is provided with: a communication apparatus 22 communicably connected to each of the at least one vehicle 1; a processing apparatus 21 configured to obtain information indicating at least one of a position and an attitude of each of the at least one vehicle 1 from each of the at least one vehicle 1 via the communication apparatus 22; and a storage apparatus 24 configured to store information indicating at least one of the position and the attitude of each of the at least one vehicle 1.

With this configuration, for example, the server apparatus 2 can obtain and record information indicative of positions and attitudes of a plurality of vehicles 1 from the plurality of vehicles 1, and generate an accurate map based on travelling paths of the plurality of vehicles 1.

According to the first embodiment, the server apparatus 2 may be further provided with a display apparatus 25 configured to display an image indicating at least one of the position and the attitude of the vehicle 1. In a case where the corrector 36 corrects the first position and the first attitude based on the second position and the second attitude, the display apparatus 25 is configured to overlays the marker 4, and at least one of the corrected position and the corrected attitude, on the map, so as to associate at least one of the corrected position and the corrected attitude with the marker 4 used for calculating the second position and the second attitude.

With this configuration, the user can readily recognize that the position and attitude of the vehicle 1 are corrected based on the marker 4

According to the first embodiment, the server apparatus 2 may be further provided with a display apparatus 25 configured to display an image indicating at least one of the position and the attitude of the vehicle 1. The display apparatus 25 is configured to display the image captured by the image capturing apparatus 11, and in a case where the corrector 36 corrects the first position and the first attitude based on the second position and the second attitude, the display apparatus 25 is configured to highlight the marker 4 used for calculating the second position and the second attitude, in the image.

With this configuration, the user can readily recognize the marker 4 used for correcting the position and attitude of the vehicle 1.

According to the first embodiment, the relative position and the relative attitude calculated from the feature points 41 using Visual-SLAM or the like are corrected based on the absolute position and absolute attitude calculated from the markers 4, and therefore, it is possible to accurately measure the position and the attitude of the vehicle 1. In addition, according to the first embodiment, it is possible to more accurately measure the position and attitude of the vehicle 1, by determining whether or not a recognized marker 4 is reliable, and correcting the position and attitude of the vehicle 1 based on the absolute position and the absolute attitude only when the marker 4 is reliable.

Second Embodiment

Configuration of Second Embodiment

Figure 50:
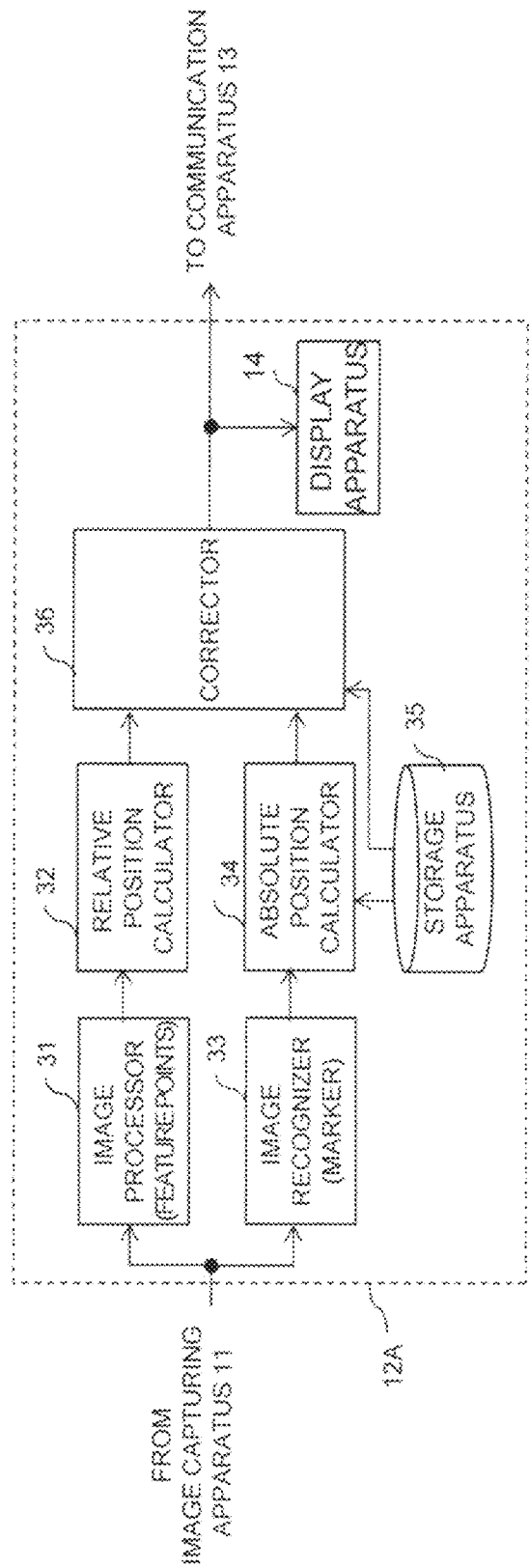
FIG. 50 is a block diagram showing a configuration of a positioning apparatus 12A according to a second embodiment.

FIG. 50 is a block diagram showing a configuration of a positioning apparatus 12A according to a second embodiment. The positioning apparatus 12A is further provided with a display apparatus 14 for displaying an image indicating at least one of the position and the attitude of a vehicle 1, in addition to the components of the positioning apparatus 12 of FIG. 3.

When the corrector 36 corrects the relative position and the relative attitude based on the absolute position and the absolute attitude, the display apparatus 14 may overlay the marker 4, and at least one of the corrected position and the corrected attitude, on the map, so as to associate at least one of the corrected position and the corrected attitude with the marker 4 used for calculating the absolute position and the absolute attitude.

The display apparatus 14 may selectively display one of a first image in which at least one of the relative position and the relative attitude of the vehicle 1 is overlaid on the map, and a second image in which at least one of the corrected position and the corrected attitude is overlaid on the map.

The display apparatus 14 may display the image captured by the image capturing apparatus, and when the corrector 36 corrects the relative position and the relative attitude based on the absolute position and the absolute attitude, the display apparatus 14 may highlight the marker 4 used for calculating the absolute position and the absolute attitude.

The components of the positioning apparatus 12A other than the display apparatus 14 are configured and operate in a manner similar to that of the first embodiment.

Advantageous Effects, Etc. of Second Embodiment

According to the first embodiment, the positioning apparatus 12A is provided with: a relative position calculator 32, a storage apparatus 35, an absolute position calculator 34, a corrector 36, and a display apparatus 14. The relative position calculator 32 is configured to calculate a first position and a first attitude of a vehicle 1 indicating a relative position and a relative attitude of the vehicle 1 with respect to a reference position and a reference attitude, based on a plurality of images captured by an image capturing apparatus 11 mounted on the vehicle 1. The storage apparatus 35 is configured to store information on identifiers, positions, and attitudes of a plurality of markers 4 disposed at predetermined positions and visually distinguishable from each other, and information on a map containing a passageway for the vehicle 1. The absolute position calculator 34 is configured to extract one of the plurality of markers 4 from an image captured by the image capturing apparatus 11, and calculate a second position and a second attitude of the vehicle 1 indicating a position and an attitude of the vehicle 1 in the map, based on a position and an attitude of the one extracted marker 4. The corrector 36 is configured to correct the first position and the first attitude based on the second position and the second attitude to calculate a corrected position and a corrected attitude of the vehicle 1. The display apparatus 14 is configured to display an image indicating at least one of the position and the attitude of the vehicle 1. In a case where the corrector 36 corrects the first position and the first attitude based on the second position and the second attitude, the display apparatus 14 is configured to overlays the marker 4, and at least one of the corrected position and the corrected attitude, on the map, so as to associate at least one of the corrected position and the corrected attitude with the marker 4 used for calculating the second position and the second attitude.

With this configuration, the user can readily recognize that the position and attitude of the vehicle 1 are corrected based on the marker 4

According to the first embodiment, the display apparatus 14 may selectively display one of a first image in which at least one of the relative position and the relative attitude of the vehicle 1 is overlaid on the map, and a second image in which at least one of the corrected position and the corrected attitude is overlaid on the map.

With this configuration, the user can readily recognize effects of correcting the position and attitude of the vehicle 1.

According to the first embodiment, the positioning apparatus 12A is provided with: a relative position calculator 32, a storage apparatus 35, an absolute position calculator 34, a corrector 36, and a display apparatus 14. The relative position calculator 32 is configured to calculate a first position and a first attitude of a vehicle 1 indicating a relative position and a relative attitude of the vehicle 1 with respect to a reference position and a reference attitude, based on a plurality of images captured by an image capturing apparatus 11 mounted on the vehicle 1. The storage apparatus 35 is configured to store information on identifiers, positions, and attitudes of a plurality of markers 4 disposed at predetermined positions and visually distinguishable from each other, and information on a map containing a passageway for the vehicle 1. The absolute position calculator 34 is configured to extract one of the plurality of markers 4 from an image captured by the image capturing apparatus 11, and calculate a second position and a second attitude of the vehicle 1 indicating a position and an attitude of the vehicle 1 in the map, based on a position and an attitude of the one extracted marker 4. The corrector 36 is configured to correct the first position and the first attitude based on the second position and the second attitude to calculate a corrected position and a corrected attitude of the vehicle 1. The display apparatus 14 is configured to display an image indicating at least one of the position and the attitude of the vehicle 1. The display apparatus 14 is configured to display the image captured by the image capturing apparatus 11, and, in a case where the corrector 36 corrects the first position and the first attitude based on the second position and the second attitude, the display apparatus 14 is configured to highlight the marker 4 used for calculating the second position and the second attitude, in the image.

With this configuration, the user can readily recognize the marker 4 used for correcting the position and attitude of the vehicle 1.

Third Embodiment

Figure 51:
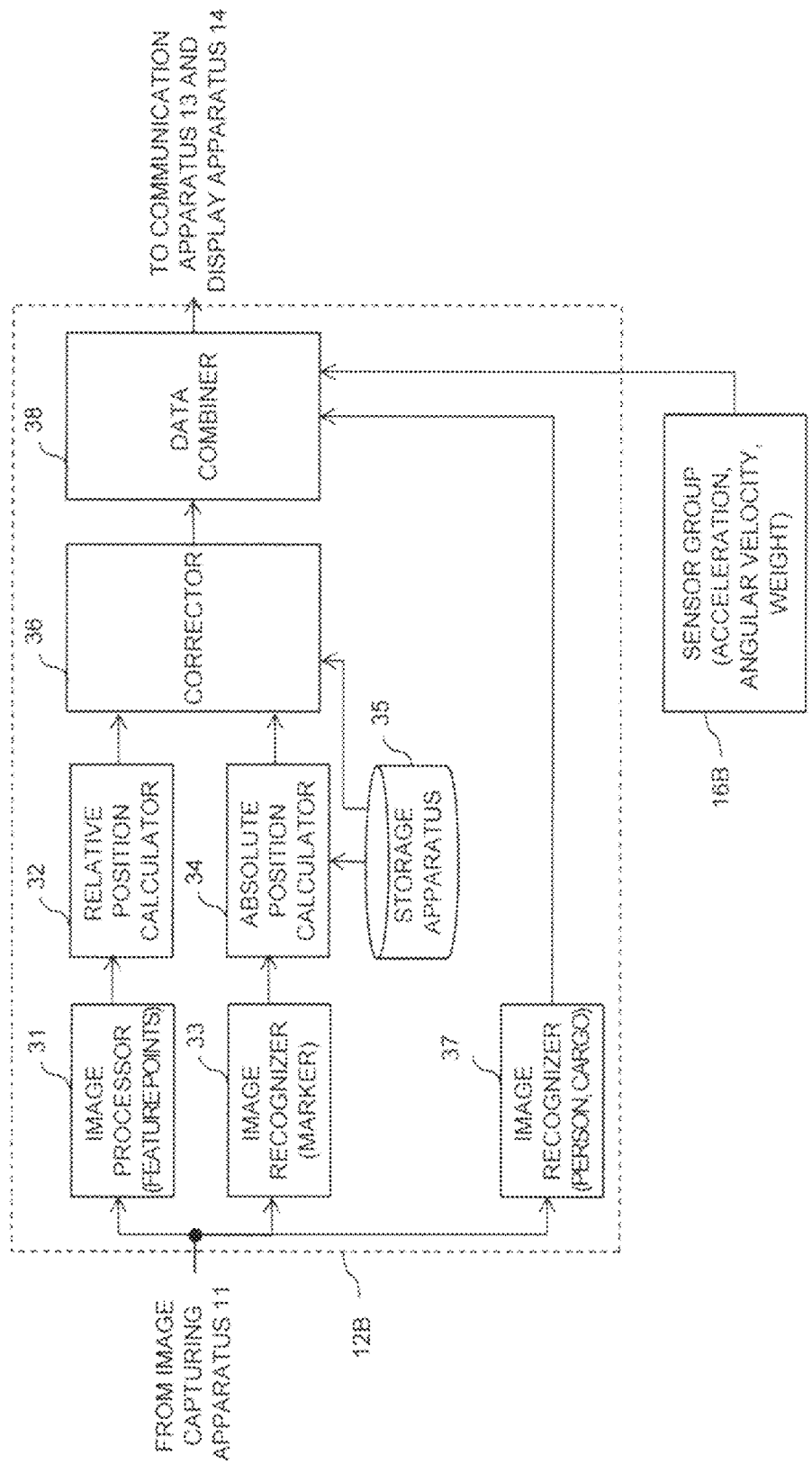
FIG. 51 is a block diagram showing a configuration of a positioning apparatus 12B according to a third embodiment.

With reference to FIG. 51, a positioning apparatus according to a third embodiment, and a moving body provided with such a positioning apparatus will be described.

Configuration of Third Embodiment

FIG. 51 is a block diagram showing a configuration of a positioning apparatus 12B according to a third embodiment. The vehicle 1 according to the first embodiment may be provided with a positioning apparatus 12B, instead of the positioning apparatus 12 of FIG. 3. The positioning apparatus 12B is provided with an image recognizer 37 and a data combiner 38, in addition to the components of the positioning apparatus 12 of FIG. 3.

The image recognizer 37 recognizes a predetermined target object from an image captured by the image capturing apparatus 11. The image recognizer 37 may recognize a person (for example, a driver of the vehicle 1, or a person around the vehicle 1). The image recognizer 37 may recognize specific cargo 3 learned in advance. The image processor 31, the image recognizer 33, and the image recognizer 37 may obtain images from the same image capturing apparatus 11. Alternatively, the image recognizer 37 may capture an image including a person and/or the cargo 3, using an image capturing apparatus different from the image capturing apparatus 11 for capturing images to be supplied to the image processor 31 and the image recognizer 33 (i.e., images for measuring the position and the attitude of the vehicle 1). In this case, the image capturing apparatus 11 may be provided, for example, so as to capture images of the passageway 101 in front of the vehicle 1, while the other image capturing apparatus may be provided, for example, so as to capture a driver's seat or a cargo carrier of the vehicle 1. The image capturing apparatus 11 and the other image capturing apparatus are synchronized with each other in advance.

The data combiner 38 obtains data of the corrected position and the corrected attitude of the vehicle 1 from the corrector 36, together with a timestamp indicating a time moment at which an image corresponding to the position and the attitude is captured by the image capturing apparatus 11 (or a time moment at which the position and the attitude are calculated). The data combiner 38 combines image recognition data of the target object recognized by the image recognizer 37, with the data of the position and the attitude of the vehicle 1. In addition, the data combiner 38 obtains sensor data generated by a sensor group 16B including one or more sensors mounted on the vehicle 1, and combines the sensor data with the data of the position and the attitude of the vehicle 1. The data combiner 38 may obtains sensor data including at least one of an acceleration and an angular velocity of the vehicle 1. In addition, the data combiner 38 may also obtain sensor data including a weight of the cargo 3 carried by the vehicle 1. Sensors of the sensor group 16B provide sensor data with a timestamp indicating a time moment when the sensor data is obtained. The data combiner 38 combines these data in synchronization with each other, based on the timestamp of the data of the position and the attitude of the vehicle 1, the timestamp of the image recognition data, and the timestamp of the sensor data.

When the timestamps of these data differ from each other, the data combiner 38 may associate the image recognition data or the sensor data, with the position and attitude data of the vehicle 1 having a timestamp closest to that of the image recognition data or the sensor data. In addition, when the timestamps of these data differ from each other, the data combiner 38 may interpolate the data of the position and the attitude of the vehicle 1 using linear interpolation, internal division, or the like, and associate the image recognition data or the sensor data, with the position data and the attitude data of the vehicle 1 interpolated and having a timestamp corresponding to the image recognition data or the sensor data.

Since the data combiner 38 is provided, it is possible to record various data associated with work of the vehicle 1 in association with the position and the trajectory of the vehicle 1. For example, a person associated with the work of the vehicle 1 can be tracked by recording a person recognized by image recognition. The cargo 3 carried by the vehicle 1 can be tracked by recording the cargo 3 recognized by image recognition. A rough road surface of a warehouse or the like can be detected by recording the acceleration and the angular velocity of the vehicle 1. A workload of the vehicle 1 can be monitored by recording a weight of the cargo 3.

Advantageous Effects, Etc. of Third Embodiment

According to the third embodiment, the data combiner 38 may be further provided for obtaining sensor data generated by one or more sensors mounted on the vehicle 1, and combines sensor data with data of the corrected position and the corrected attitude.

According to the third embodiment, the data combiner 38 may obtain sensor data including at least one of an acceleration and an angular velocity of the vehicle 1.

According to the third embodiment, the data combiner 38 may obtain sensor data including a weight of the cargo 3 carried by the vehicle 1.

According to the third embodiment, the positioning apparatus 12B may be further provided with the image recognizer 37 that recognizes a predetermined target object from an image captured by the image capturing apparatus 11. In this case, the data combiner 38 combines information on the target object recognized by the image recognizer 37, with the data of the corrected position and the corrected attitude.

According to the third embodiment, the image recognizer 37 may recognize a person.

According to the third embodiment, the image recognizer 37 may recognize the specific cargo 3 learned in advance.

According to the third embodiment, various data associated with work of the vehicle 1 can be recorded in association with the position and the trajectory of the vehicle 1.

According to the third embodiment, the vehicle 1 may be provided with the image capturing apparatus 11 that captures images for measuring the position and the attitude of the vehicle 1, and a different image capturing apparatus that captures a further target object. In this case, the data combiner 38 can associate data of the position and the attitude data of the vehicle 1 generated based on images captured by the image capturing apparatus 11, with image recognition data generated based on the image captured by the further image capturing apparatus. When the data of the position and the attitude of the vehicle 1 is associated with the image recognition data of the different target object captured during movement of the vehicle 1, this association is considerably useful for work analysis performed based on the position and the trajectory of the vehicle 1 on the map. For example, when a person's suspicious activity is detected by visual inspection or the like, the person's position is determined on the map, and therefore, it is possible to search and retrieve an image or a video captured in the past in the vicinity of the person's position, and/or in association with the person.

Other Embodiments

In the respective embodiments, the positioning apparatus may be provided on a four-wheel vehicle, such as a forklift or a truck, or may be provided on vehicles with one to three, five or more wheel. In addition, in the respective embodiments, the positioning apparatus may be provided on a moving body without wheels, such as an airplane, a helicopter, a drone, and a hovercraft, regardless of the number of wheels and/or the presence/absence of wheels. The positioning apparatus according to the present embodiments can estimate a position of a moving body not based on a number of rotation of wheels, but based on an image captured by an image capturing apparatus.

The marker is not limited to a square flat plate, but may be formed with other polygonal or curved contour, or may be formed as a curved surface, as long as it has a visually identifiable pattern, and it is formed so that the attitude of the marker itself can be detected from a captured image of the marker.

According to the positioning apparatus of aspects of the present disclosure, it is possible to measure a position of a moving body in a warehouse, a factory, or the like. Accordingly, it is possible to track a trajectory (flow) of the moving body, route the moving body, optimize an arrangement of cargo or the like in a warehouse or a factory, monitor an operating rate, improving work efficiency, and the like are achievable.

The invention claimed is:

1. A positioning apparatus comprising:
a circuit that calculates a first position and a first attitude of a moving body indicating a relative position and a relative attitude of the moving body with respect to a reference position and a reference attitude, based on a plurality of images captured by a camera mounted on the moving body;
a memory that stores information on identifiers, positions, and attitudes of a plurality of markers disposed at predetermined positions and visually distinguishable from each other, and information on a map containing a passageway for the moving body;
wherein the circuit extracts one of the plurality of markers from an image captured by the image capturing apparatus, and calculates a second position and a second attitude of the moving body indicating a position and an attitude of the moving body in the map, based on a position and an attitude of the one extracted marker; and
the circuit corrects the first position and the first attitude based on the second position and the second attitude to calculate a corrected position and a corrected attitude of the moving body; and
the circuit calculates the corrected position and the corrected attitude, not using the second position and the second attitude calculated based on the position and the attitude of the marker when a difference or a ratio of an apparent height and an apparent width of the marker in the image is equal to or smaller than a first threshold, but using the second position and the second attitude calculated based on the position and the attitude of the marker when the difference or the ratio of the apparent height and the apparent width of the marker in the image is larger than the first threshold.

2. The positioning apparatus as claimed in claim 1, wherein the circuit calculates the corrected position and the corrected attitude, not using the second position and the second attitude calculated based on the position and the attitude of the marker when an apparent difference between angles of adjacent corners of the marker in the image is equal to or smaller than a second threshold, but using the second position and the second attitude calculated based on the position and the attitude of the marker when the apparent difference between the angles of the adjacent corners of the marker in the image is larger than the second threshold.

3. The positioning apparatus as claimed in claim 1, wherein the circuit calculates an apparent size of the marker in the image captured by the camera, and the circuit calculates the corrected position and the corrected attitude, not using the second position and the second attitude calculated based on the position and the attitude of the marker when the apparent size of the marker in the image is equal to or smaller than a third threshold, but using the second position and the second attitude calculated based on the position and the attitude of the marker when the apparent size of the marker in the image is larger than the third threshold.

4. The positioning apparatus as claimed in claim 1, wherein the circuit calculates an angle of a direction of the moving body with respect to a normal line to a surface of the one marker, based on a position and an attitude of the moving body in a marker coordinate system with an origin at the one marker, and
the circuit calculates the corrected position and the corrected attitude, not using the second position and the second attitude calculated based on the position and the attitude of the marker when the angle is equal to or smaller than a fourth but using the second position and the second attitude calculated based on the position and the attitude of the marker when the angle is larger than the fourth threshold.

5. The positioning apparatus as claimed in claim 1,
wherein the circuit counts a number of images consecutively captured by the camera and from which the marker having the same identifier is extracted, and
the circuit calculates the corrected position and the corrected attitude, not using the second position and the second attitude calculated based on the position and the attitude of the marker when the marker does not have the same identifier over a number of images equal to a fifth threshold, but using the second position and the second attitude calculated based on the position and the attitude of the marker when the marker has the same identifier over the number of images equal to or larger than the fifth threshold.

6. The positioning apparatus as claimed in claim 1,
wherein the circuit calculates the position and the attitude of the moving body in each of a plurality of marker coordinate systems with origins at a plurality of markers having a same identifier and extracted from a plurality of images consecutively captured by the camera, and
the circuit calculates the corrected position and the corrected attitude, not using the second position and the second attitude calculated based on the position and the attitude of the marker when coordinates of the moving body in the marker coordinate systems do not have a same sign over a number of images equal to a sixth threshold, but using the second position and the second attitude calculated based on the position and the attitude of the marker when coordinates of the moving body in the marker coordinate systems have a same sign over a number of images equal to or more than the sixth threshold.

7. The positioning apparatus as claimed in claim 1,
wherein the circuit calculates a distance from the moving body to the marker based on the image captured by the camera, and
the circuit calculates the corrected position and the corrected attitude, not using the second position and the second attitude calculated based on the position and the attitude of the marker when the distance from the moving body to the marker is equal to or larger than a seventh threshold, but using the second position and the second attitude calculated based on the position and the attitude of the marker when the distance from the moving body to the marker is smaller than the seventh threshold.

8. The positioning apparatus as claimed in claim 1, wherein the circuit obtains sensor data generated by one or more sensors mounted on the moving body, and combines data of the corrected position and the corrected attitude, with the sensor data.

9. The positioning apparatus as claimed in claim 8,
wherein the circuit obtains sensor data including at least one of an acceleration and an angular velocity of the moving body.

10. The positioning apparatus as claimed in claim 8,
wherein the circuit obtains sensor data including a weight of cargo carried by the moving body.

11. The positioning apparatus as claimed in claim 8, wherein the circuit recognizes a predetermined target object from the image captured by the camera, and
the circuit combines the data of the corrected position and the corrected attitude, with information on the target object recognized.

12. The positioning apparatus as claimed in claim 11,
wherein the circuit recognizes a person.

13. The positioning apparatus as claimed in claim 11,
wherein the circuit recognizes specific cargo learned in advance.

14. The positioning apparatus as claimed in claim 1, further comprising a first display that displays an image indicating at least one of the position and the attitude of the moving body,
wherein, in a case where the circuit corrects the first position and the first attitude based on the second position and the second attitude, the first display overlays the marker, and at least one of the corrected position and the corrected attitude, on the map, so as to associate at least one of the corrected position and the corrected attitude with the marker used for calculating the second position and the second attitude.

15. The positioning apparatus as claimed in claim 14,
wherein the first display selectively displays one of a first image in which at least one of the first position and the first attitude of the moving body is overlaid on the map, and a second image in which at least one of the corrected position and the corrected attitude is overlaid on the map.

16. The positioning apparatus as claimed in claim 1, further comprising a first display that displays an image indicating at least one of the position and the attitude of the moving body,
wherein the first display displays the image captured by the camera, and in a case where the corrector corrects the first position and the first attitude based on the second position and the second attitude, the first display highlights the marker used for calculating the second position and the second attitude, in the image.

17. A positioning apparatus comprising:
a circuit that calculates a first position and a first attitude of a moving body indicating a relative position and a relative attitude of the moving body with respect to a reference position and a reference attitude, based on a plurality of images captured by an image capturing apparatus mounted on the moving body;
a memory that stores information on identifiers, positions, and attitudes of a plurality of markers disposed at predetermined positions and visually distinguishable from each other, and information on a map containing a passageway for the moving body;
wherein the circuit extracts one of the plurality of markers from an image captured by the image capturing apparatus, and calculates a second position and a second attitude of the moving body indicating a position and an attitude of the moving body in the map, based on a position and an attitude of the one extracted marker; and
the circuit corrects the first position and the first attitude based on the second position and the second attitude to calculate a corrected position and a corrected attitude of the moving body; and
the circuit calculates the corrected position and the corrected attitude, not using the second position and the second attitude calculated based on the position and the attitude of the marker when an apparent difference between angles of adjacent corners of the marker in the image is equal to or smaller than a second threshold, but using the second position and the second attitude calculated based on the position and the attitude of the marker when the apparent difference between the angles of the adjacent corners of the marker in the image is larger than the second threshold.

18. A positioning apparatus comprising:

a circuit that calculates a first position and a first attitude of a moving body indicating a relative position and a relative attitude of the moving body with respect to a reference position and a reference attitude, based on a plurality of images captured by a camera mounted on the moving body;

a memory that stores information on identifiers, positions, and attitudes of a plurality of markers disposed at predetermined positions and visually distinguishable from each other, and information on a map containing a passageway for the moving body;

wherein the circuit extracts one of the plurality of markers from an image captured by the camera, and calculates a second position and a second attitude of the moving body indicating a position and an attitude of the moving body in the map, based on a position and an attitude of the one extracted marker; and the circuit corrects the first position and the first attitude based on the second position and the second attitude to calculate a corrected position and a corrected attitude of the moving body; and a first display that displays an image indicating at least one of the position and the attitude of the moving body, wherein, in a case where the circuit corrects the first position and the first attitude based on the second position and the second attitude, the first display overlays the marker, and at least one of the corrected position and the corrected attitude, on the map, so as to associate at least one of the corrected position and the corrected attitude with the marker used for calculating the second position and the second attitude.

19. A positioning apparatus comprising:

a circuit that calculate a first position and a first attitude of a moving body indicating a relative position and a relative attitude of the moving body with respect to a reference position and a reference attitude, based on a plurality of images captured by a camera mounted on the moving body;

a memory that store information on identifiers, positions, and attitudes of a plurality of markers disposed at predetermined positions and visually distinguishable from each other, and information on a map containing a passageway for the moving body;

wherein the circuit extracts one of the plurality of markers from an image captured by the camera, and calculates a second position and a second attitude of the moving body indicating a position and an attitude of the moving body in the map, based on a position and an attitude of the one extracted marker;

the circuit corrects the first position and the first attitude based on the second position and the second attitude to calculate a corrected position and a corrected attitude of the moving body; and a first display that displays an image indicating at least one of the position and the attitude of the moving body, wherein the first display displays the image captured by the camera, and, in a case where the circuit corrects the first position and the first attitude based on the second position and the second attitude, the first display highlights the marker used for calculating the second position and the second attitude, in the image.

20. A moving body comprising:

a camera; and a positioning apparatus, wherein the positioning apparatus comprises:

a circuit that calculates a first position and a first attitude of a moving body indicating a relative position and a relative attitude of the moving body with respect to a reference position and a reference attitude, based on a plurality of images captured by an camera mounted on the moving body;

a memory that stores information on identifiers, positions, and attitudes of a plurality of markers disposed at predetermined positions and visually distinguishable from each other, and information on a map containing a passageway for the moving body;

wherein the circuit extracts one of the plurality of markers from an image captured by the camera, and calculate a second position and a second attitude of the moving body indicating a position and an attitude of the moving body in the map, based on a position and an attitude of the one extracted marker; and the circuit corrects the first position and the first attitude based on the second position and the second attitude to calculate a corrected position and a corrected attitude of the moving body, and the circuit calculates the corrected position and the corrected attitude, not using the second position and the second attitude calculated based on the position and the attitude of the marker when a difference or a ratio of an apparent height and an apparent width of the marker in the image is equal to or smaller than a first threshold, but using the second position and the second attitude calculated based on the position and the attitude of the marker when the difference or the ratio of the apparent height and the apparent width of the marker in the image is larger than the first threshold.

21. A positioning system comprising:

at least one moving body; and a server, wherein the moving body comprises:

a camera; and a positioning apparatus, wherein the positioning apparatus comprises:

a circuit that calculates a first position and a first attitude of a moving body indicating a relative position and a relative attitude of the moving body with respect to a reference position and a reference attitude, based on a plurality of images captured by an image capturing apparatus mounted on the moving body;

a memory that stores information on identifiers, positions, and attitudes of a plurality of markers disposed at predetermined positions and visually distinguishable from each other, and information on a map containing a passageway for the moving body;

wherein the circuit extracts one of the plurality of markers from an image captured by the camera, and calculate a second position and a second attitude of the moving body indicating a position and an attitude of the moving body in the map, based on a position and an attitude of the one extracted marker; and the circuit corrects the first position and the first attitude based on the second position and the second attitude to calculate a corrected position and a corrected attitude of the moving body, and the circuit calculates the corrected position and the corrected attitude, not using the second position and the second attitude calculated based on the position and the attitude of the marker when a difference or a ratio of an apparent height and an apparent width of the marker in the image is equal to or smaller than a first threshold, but using the second position and the second attitude calculated based on the position and the attitude of the marker when the difference or the ratio of the apparent height and the apparent width of the marker in the image is larger than the first threshold, wherein the server comprise:

a circuit communicably connected to each of the at least one moving body;

wherein the circuit obtains information indicating at least one of a position and an attitude of each of the at least one moving body from each of the at least one moving body; and a memory that stores information indicating at least one of the position and the attitude of each of the at least one moving body.

22. The positioning system as claimed in claim 21, wherein the server further comprises a second display that displays an image indicating at least one of the position and the attitude of the moving body, wherein, in a case where the circuit corrects the first position and the first attitude based on the second position and the second attitude, the second display apparatus is configured to overlays the marker, and at least one of the corrected position and the corrected attitude, on the map, so as to associate at least one of the corrected position and the corrected attitude with the marker used for calculating the second position and the second attitude.

23. The positioning system as claimed in claim 21, wherein the server further comprising a second display that displays an image indicating at least one of the position and the attitude of the moving body, wherein the second display displays the image captured by the camera, and in a case where the circuit corrects the first position and the first attitude based on the second position and the second attitude, the second display highlights the marker used for calculating the second position and the second attitude, in the image.

* * * * *